(12) United States Patent
Sasagawa

(10) Patent No.: US 9,897,796 B2
(45) Date of Patent: Feb. 20, 2018

(54) ENCAPSULATED SPACERS FOR ELECTROMECHANICAL SYSTEMS DISPLAY APPARATUS

(71) Applicant: SnapTrack, Inc., San Diego, CA (US)

(72) Inventor: Teruo Sasagawa, Los Gatos, CA (US)

(73) Assignee: SnapTrack, Inc., San Diego, CA (US)

( * ) Notice: Subject to any disclaimer, the term of this patent is extended or adjusted under 35 U.S.C. 154(b) by 128 days.

(21) Appl. No.: 14/256,528

(22) Filed: Apr. 18, 2014

(65) Prior Publication Data
US 2015/0301332 A1    Oct. 22, 2015

(51) Int. Cl.
*G02B 26/04* (2006.01)
*G09G 3/34* (2006.01)
*G02B 26/02* (2006.01)
*G09F 9/37* (2006.01)

(52) U.S. Cl.
CPC ........... *G02B 26/04* (2013.01); *G02B 26/023* (2013.01); *G09G 3/346* (2013.01); *G09G 3/3433* (2013.01); *G09F 9/372* (2013.01)

(58) Field of Classification Search
CPC ...... G02B 26/02; G02B 26/023; G02B 26/04; G02B 5/005; G09F 9/372; G09G 3/3433; G09G 3/346
USPC ................................................. 359/230–234
See application file for complete search history.

(56) References Cited

U.S. PATENT DOCUMENTS

| | | | |
|---|---|---|---|
| 6,201,633 B1 | 3/2001 | Peeters et al. | |
| 7,042,545 B2 | 5/2006 | Byun et al. | |
| 7,405,852 B2 | 7/2008 | Hagood, IV et al. | |
| 7,468,830 B2 | 12/2008 | Pan | |
| 7,742,215 B2 | 6/2010 | Hagood, IV et al. | |
| 7,839,356 B2 | 11/2010 | Hagood et al. | |
| 7,919,844 B2 | 4/2011 | Ozguz | |

(Continued)

FOREIGN PATENT DOCUMENTS

| | | |
|---|---|---|
| CA | 2803781 A1 | 8/2006 |
| JP | H09189869 A | 7/1997 |

(Continued)

OTHER PUBLICATIONS

Brosnihan T, et al., "Pixtronix Digital Micro Shutter Display Technology—A MEMS Display for Low Power Mobile Multimedia Displays", SPIE, Feb. 16, 2010 (Feb. 16, 2010), XP040518068.

(Continued)

*Primary Examiner* — Marin Pichler
(74) *Attorney, Agent, or Firm* — Weaver Austin Villeneuve & Sampson LLP—QUAL

(57) ABSTRACT

This disclosure provides systems, methods and apparatus for displaying images. A display apparatus includes display elements formed on a transparent substrate. An elevated aperture layer (EAL) is fabricated over the display elements. An opposing substrate is coupled to the transparent substrate, with the display elements and the EAL positioned between the two substrates. To prevent the opposing substrate from coming into contact with the EAL and potentially damaging the EAL or the display elements, a spacer is built from the same materials used to form the display elements and the EAL. The spacer extends to a distance above the transparent substrate beyond upper surface of the EAL and encapsulates layers of polymer material used in creating a mold for the EAL.

10 Claims, 43 Drawing Sheets

(56) References Cited

U.S. PATENT DOCUMENTS

| | | | |
|---|---|---|---|
| 7,932,985 B2 | 4/2011 | Oh | |
| 8,743,446 B2 | 6/2014 | Okamoto et al. | |
| 2002/0060836 A1 | 5/2002 | Uno | |
| 2003/0090609 A1 | 5/2003 | Inoue et al. | |
| 2005/0042792 A1 | 2/2005 | Patel et al. | |
| 2006/0250325 A1 | 11/2006 | Hagood et al. | |
| 2006/0274229 A1 | 12/2006 | Ito et al. | |
| 2006/0281227 A1* | 12/2006 | Yang | B81B 7/0067 |
| | | | 438/118 |
| 2007/0002156 A1* | 1/2007 | Hagood, IV | G02B 26/04 |
| | | | 348/296 |
| 2007/0103635 A1 | 5/2007 | Tawaraya et al. | |
| 2008/0158635 A1* | 7/2008 | Hagood | G02B 26/02 |
| | | | 359/230 |
| 2008/0283175 A1 | 11/2008 | Hagood et al. | |
| 2009/0066904 A1 | 3/2009 | Zhao | |
| 2010/0020382 A1 | 1/2010 | Su et al. | |
| 2010/0027100 A1 | 2/2010 | Lee et al. | |
| 2010/0053115 A1 | 3/2010 | Kim et al. | |
| 2010/0201934 A1 | 8/2010 | Fan et al. | |
| 2010/0265439 A1 | 10/2010 | Ishitobi et al. | |
| 2011/0013131 A1 | 1/2011 | Tanaka et al. | |
| 2011/0069369 A1 | 3/2011 | Park et al. | |
| 2011/0157679 A1 | 6/2011 | Fike, III et al. | |
| 2011/0235147 A1 | 9/2011 | Lee et al. | |
| 2012/0242638 A1 | 9/2012 | Zhong et al. | |
| 2012/0293851 A1 | 11/2012 | Morita et al. | |
| 2012/0300283 A1 | 11/2012 | Fujiyoshi et al. | |
| 2014/0078154 A1 | 3/2014 | Payne et al. | |
| 2014/0268274 A1 | 9/2014 | Brosnihan et al. | |

FOREIGN PATENT DOCUMENTS

| | | |
|---|---|---|
| JP | 2001183683 A | 7/2001 |
| JP | 2005106856 A | 4/2005 |
| JP | 2005122150 A | 5/2005 |
| JP | 2011022232 A | 2/2011 |
| KR | 20100056734 A | 5/2010 |
| KR | 20110049557 A | 5/2011 |
| TW | 554221 B | 9/2003 |
| TW | 201133025 A | 10/2011 |
| WO | 2003044594 A1 | 5/2003 |
| WO | 2008091339 A2 | 7/2008 |
| WO | 2012073867 A1 | 6/2012 |
| WO | 2014043324 | 3/2014 |
| WO | 2014149619 | 9/2014 |

OTHER PUBLICATIONS

International Search Report and Written Opinion—PCT/US2015/020787—ISA/EPO—Jun. 30, 2015.

\* cited by examiner

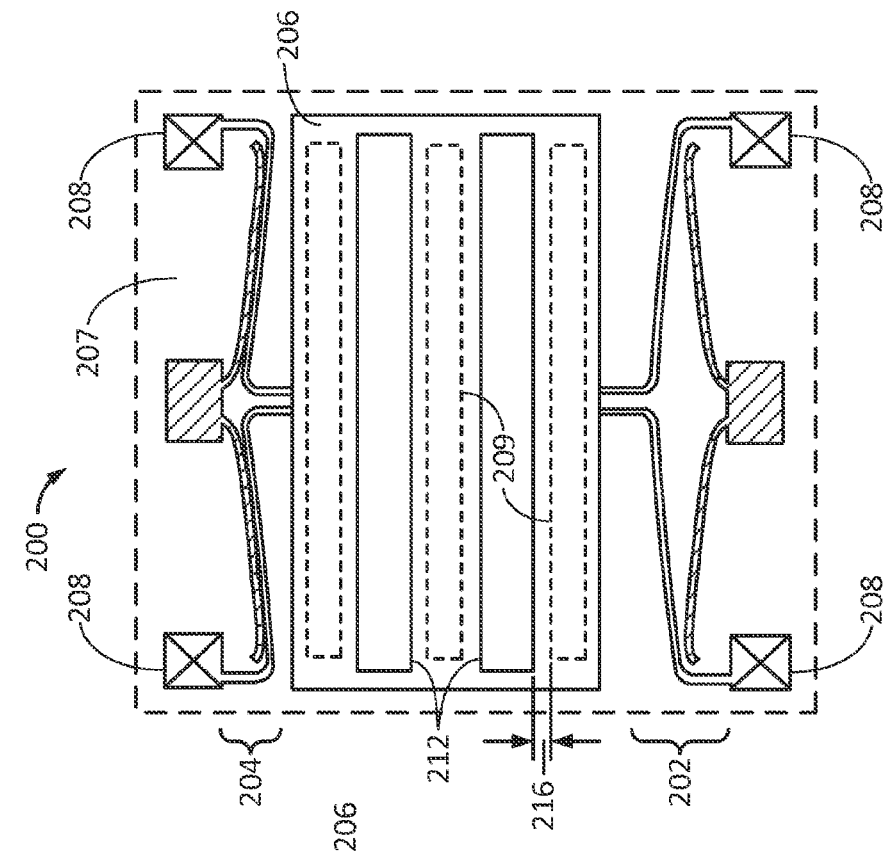
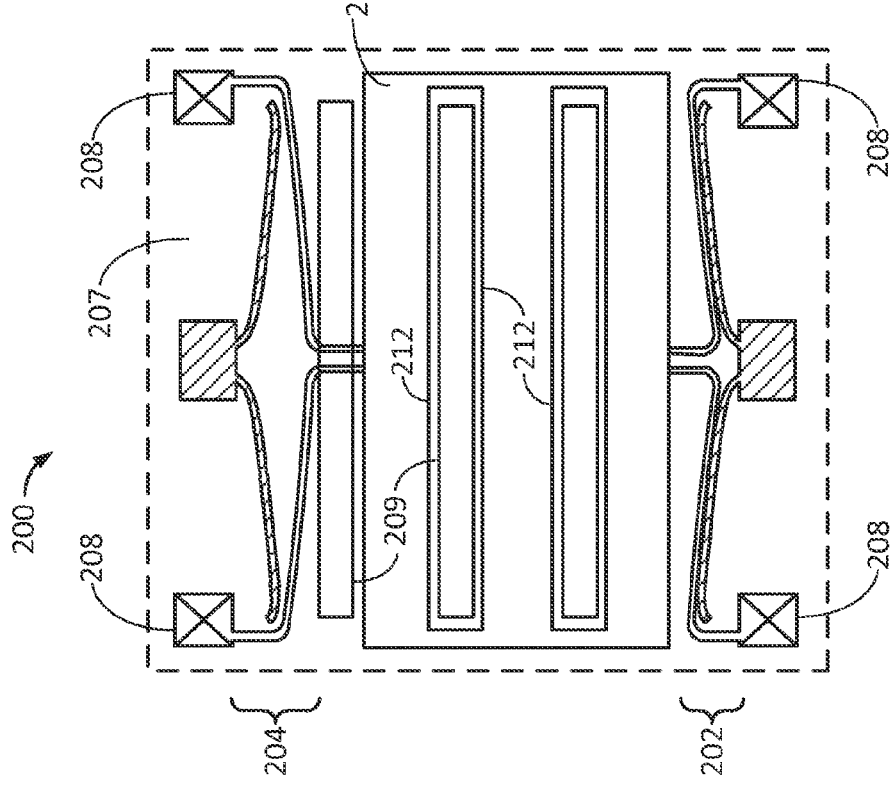

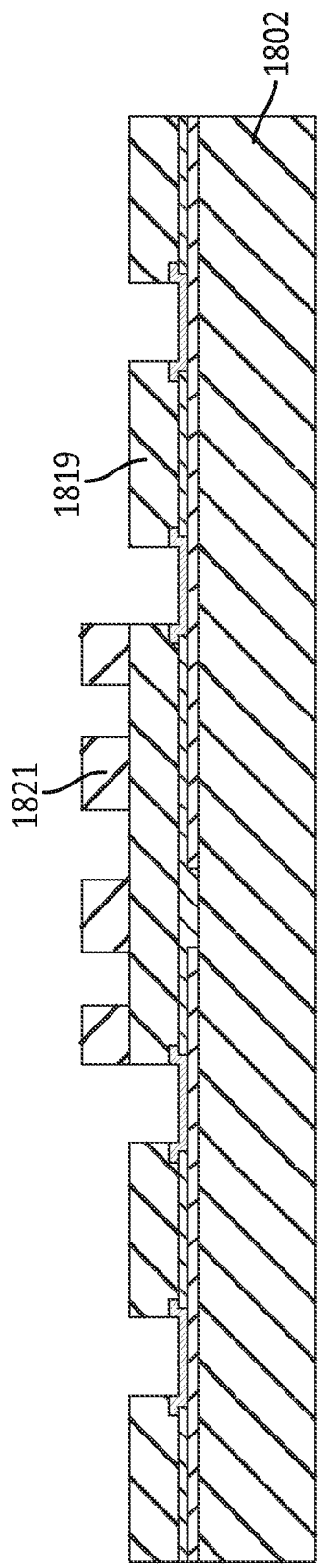
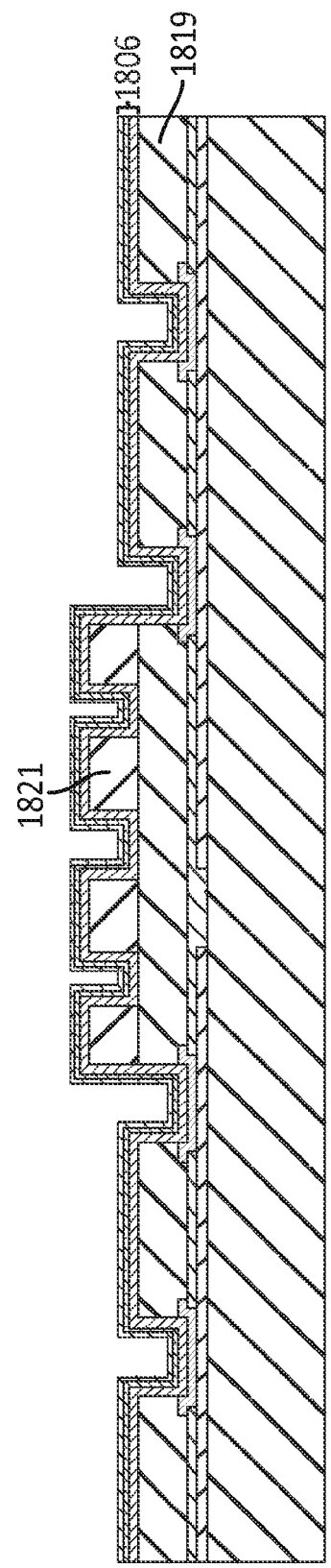
Figure 13D
Figure 13E

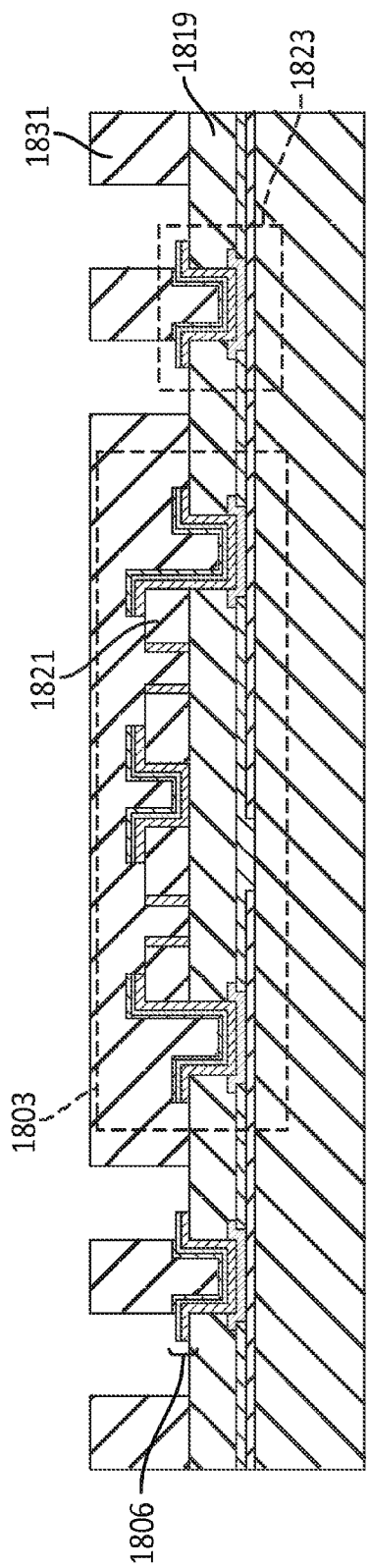
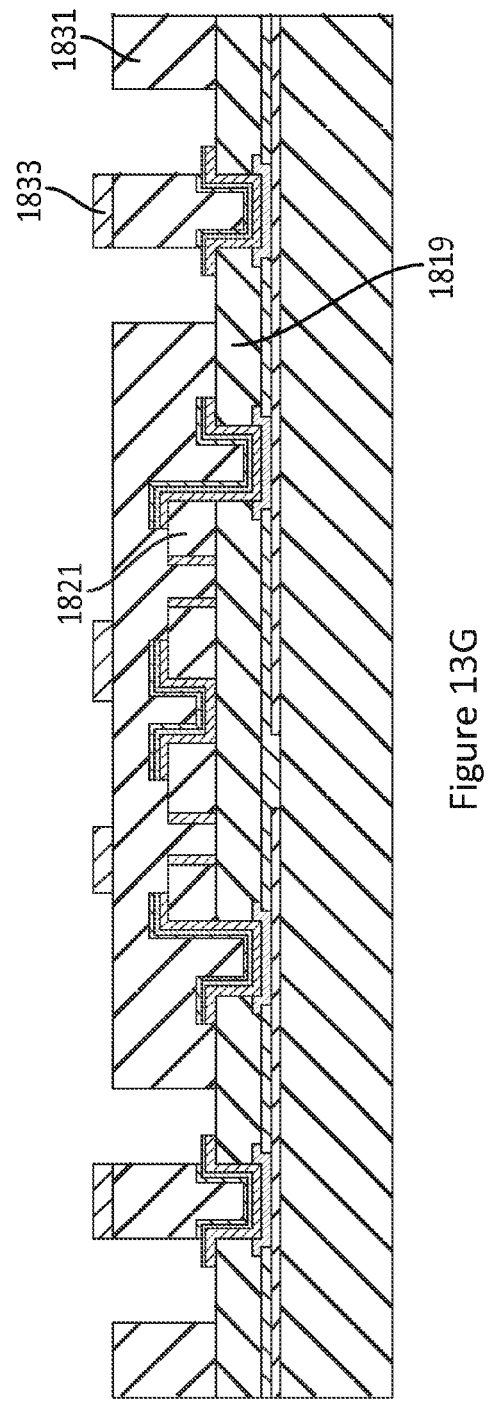
Figure 13F
Figure 13G

ENCAPSULATED SPACERS FOR ELECTROMECHANICAL SYSTEMS DISPLAY APPARATUS

TECHNICAL FIELD

This disclosure relates to the field of electromechanical systems (EMS), and in particular, to an integrated elevated aperture layer for use in a display apparatus.

DESCRIPTION OF THE RELATED TECHNOLOGY

Electromechanical systems (EMS) devices include devices having electrical and mechanical elements, such as actuators, optical components (such as mirrors, shutters, and/or optical film layers) and electronics. EMS devices can be manufactured at a variety of scales including, but not limited to, microscales and nanoscales. For example, microelectromechanical systems (MEMS) devices can include structures having sizes ranging from about a micron to hundreds of microns or more. Nanoelectromechanical systems (NEMS) devices can include structures having sizes smaller than a micron including, for example, sizes smaller than several hundred nanometers. Electromechanical elements may be created using deposition, etching, lithography, and/or other micromachining processes that etch away parts of deposited material layers, or that add layers to form electrical and electromechanical devices.

EMS-based display apparatus have been proposed that include display elements that modulate light by selectively moving a light blocking component into and out of an optical path through an aperture defined through a light blocking layer. Doing so selectively passes light from a backlight or reflects light from the ambient or a front light to form an image.

SUMMARY

The systems, methods and devices of the disclosure each have several innovative aspects, no single one of which is solely responsible for the desirable attributes disclosed herein.

An innovative aspect of the subject matter described in this disclosure can be implemented in an apparatus that includes a first substrate and an electromechanical systems (EMS) light modulator on the first substrate. The light modulator includes a first layer of structural material. The apparatus also includes a spacer on the first substrate, which includes at least two separately deposited layers of polymer material encapsulated between the first layer of structural material and a second layer of structural material. The spacer can have a height above the substrate that exceeds the height of a highest portion of the first layer of structural material.

In some implementations, the second layer of structural material forms an elevated aperture layer (EAL) over the light modulator. In some implementations, the apparatus includes a second substrate positioned opposite the light modulator with respect to the first substrate, and the spacer is sufficiently tall to prevent the second substrate from deforming into the light modulator.

In some implementations, the spacer forms a portion of the light modulator. In some such implementations, the spacer supports the light modulator over the first substrate. In some implementations, the light modulator includes a microelectromechanical systems (MEMS) shutter-based light modulator.

In some implementations, the apparatus further includes a display, a processor that is capable of communicating with the display, where the processor is capable of processing image data, and a memory device that is capable of communicating with the processor. In some such implementations, the display further includes a driver circuit capable of sending at least one signal to the display and a controller capable of sending at least a portion of the image data to the driver circuit. In some implementations, the apparatus further includes an image source module capable of sending the image data to the processor, where the image source module includes at least one of a receiver, transceiver, and transmitter. In some implementations, the display device further includes an input device capable of receiving input data and to communicate the input data to the processor.

Another innovative aspect of the subject matter described in this disclosure can be implemented in a display apparatus, including a first substrate, an EMS light modulator on the first substrate, an EAL on the first substrate extending over the light modulator, and a spacer extending up from the first substrate to a height above the elevated aperture layer. The spacer encapsulates a polymer material between a lower layer of structural material and an upper layer of structural material. In some implementations, the polymer material includes at least two layers of polymer material.

In some implementations, the upper layer of structural material also forms a portion of the EAL. In some implementations, the portion of the spacer formed from the lower layer of structural material physically supports the EAL over the first substrate. In some implementations, the EAL includes corrugations extending away from the first substrate to a height that is above a majority of the EAL, but below the height of the spacer.

Another innovative aspect of the subject matter described in this disclosure can be implemented in a display apparatus including a first substrate, a means for modulating light formed on the first substrate, an EAL supported over the means for modulating light, and a spacing means for preventing a second substrate from coming into contact with the elevated aperture layer. The spacing means is formed from the same materials as the light modulating means and the EAL.

In some implementations, the spacing means encapsulates a means for increasing the resilience of the spacing means to mechanical pressure. In some implementations, the spacing means supports a portion of the light modulator over the substrate. In some implementations, the spacing means supports the EAL over the light modulator.

Details of one or more implementations of the subject matter described in this specification are set forth in the accompanying drawings and the description below. Although the examples provided in this summary are primarily described in terms of MEMS-based displays, the concepts provided herein may apply to other types of displays, such as liquid crystal displays (LCDs), organic light emitting diode (OLED) displays, electrophoretic displays, and field emission displays, as well as to other non-display MEMS devices, such as MEMS microphones, sensors, and optical switches. Other features, aspects, and advantages will become apparent from the description, the drawings, and the claims. Note that the relative dimensions of the following figures may not be drawn to scale.

BRIEF DESCRIPTION OF THE DRAWINGS

FIGS. 2A and 2B show views of an example shutter based light modulator.

FIGS. 13B-13K show cross-sectional views of stages of construction of the example display apparatus shown in FIG. 13A.

Like reference numbers and designations in the various drawings indicate like elements.

DETAILED DESCRIPTION

Figure 1A:
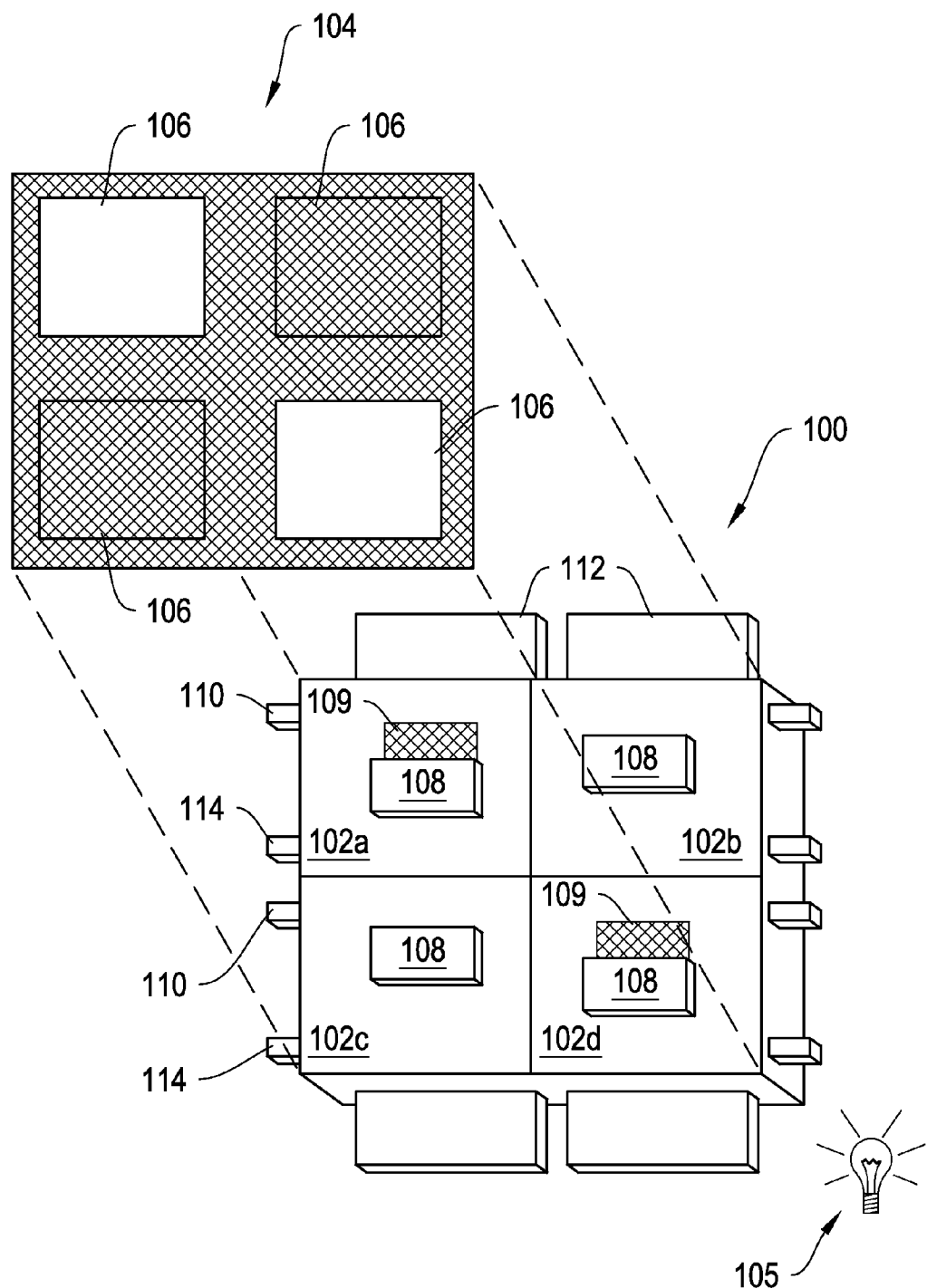
FIG. 1A shows a schematic diagram of an example direct-view MEMS-based display apparatus.

The following description is directed to certain implementations for the purposes of describing the innovative aspects of this disclosure. However, a person having ordinary skill in the art will readily recognize that the teachings herein can be applied in a multitude of different ways. The described implementations may be implemented in any device, apparatus, or system that can be capable of displaying an image, whether in motion (such as video) or stationary (such as still images), and whether textual, graphical or pictorial. More particularly, it is contemplated that the described implementations may be included in or associated with a variety of electronic devices such as, but not limited to: mobile telephones, multimedia Internet enabled cellular telephones, mobile television receivers, wireless devices, smartphones, Bluetooth® devices, personal data assistants (PDAs), wireless electronic mail receivers, hand-held or portable computers, netbooks, notebooks, smartbooks, tablets, printers, copiers, scanners, facsimile devices, global positioning system (GPS) receivers/navigators, cameras, digital media players (such as MP3 players), camcorders, game consoles, wrist watches, clocks, calculators, television monitors, flat panel displays, electronic reading devices (for example, e-readers), computer monitors, auto displays (including odometer and speedometer displays, etc.), cockpit controls and/or displays, camera view displays (such as the display of a rear view camera in a vehicle), electronic photographs, electronic billboards or signs, projectors, architectural structures, microwaves, refrigerators, stereo systems, cassette recorders or players, DVD players, CD players, VCRs, radios, portable memory chips, washers, dryers, washer/dryers, parking meters, packaging (such as in electromechanical systems (EMS) applications including microelectromechanical systems (MEMS) applications, as well as non-EMS applications), aesthetic structures (such as display of images on a piece of jewelry or clothing) and a variety of EMS devices. The teachings herein also can be used in non-display applications such as, but not limited to, electronic switching devices, radio frequency filters, sensors, accelerometers, gyroscopes, motion-sensing devices, magnetometers, inertial components for consumer electronics, parts of consumer electronics products, varactors, liquid crystal devices, electrophoretic devices, drive schemes, manufacturing processes and electronic test equipment. Thus, the teachings are not intended to be limited to the implementations depicted solely in the Figures, but instead have wide applicability as will be readily apparent to one having ordinary skill in the art.

A display apparatus can include display elements formed on a transparent substrate. An elevated aperture layer (EAL) can be fabricated over the display elements to help improve the display's contrast ratio. An opposing substrate is coupled to the transparent substrate, with the display elements and the EAL positioned between the two substrates. To prevent the opposing substrate from coming into contact with the EAL and potentially damaging the EAL or the display elements, a spacer can be built from the same materials used to form the display elements and the EAL to keep the opposing substrate at least a minimum distance away from the top surface of the EAL. To that end, the spacer can extend to a distance above the transparent substrate beyond an upper surface of the EAL. To increase its resilience to mechanical force, the spacer can be fabricated to encapsulate layers of polymer material used in creating a mold for the EAL. In some implementations, a lower portion of the spacers can serve as portions of the display elements. In some implementations, the spacer is distinct from the display elements.

Particular implementations of the subject matter described in this disclosure can be implemented to realize one or more of the following potential advantages. Display apparatus including spacers that couple to the same substrate as an EAL and extend above the EAL allow for the display to be fabricated without opposing spacers on an opposing substrate. As such, the alignment tolerance between opposing substrates is substantially reduced. The number of fabrication stages in making the display apparatus also may be reduced.

By manufacturing the spacers using the same structural material as the EAL and display elements, the spacers can be fabricated using even fewer manufacturing steps. The polymer material encapsulated with such spacers can substantially increase the mechanical strength of the spacers.

In some implementations, the spacers can be integrated with the display element. For example, the lower portions of the spacers can serve as the anchors for suspended elements of the display elements. Such implementations preserve additional substrate real-estate for additional display elements, thereby enabling a greater display pixel-per-inch (PPI) density.

The following description is directed to certain implementations for the purposes of describing the innovative aspects of this disclosure. However, a person having ordinary skill in the art will readily recognize that the teachings herein can be applied in a multitude of different ways. The described implementations may be implemented in any device, apparatus, or system that can be capable of displaying an image, whether in motion (such as video) or stationary (such as still images), and whether textual, graphical or pictorial. More particularly, it is contemplated that the described implementations may be included in or associated with a variety of electronic devices such as, but not limited to: mobile telephones, multimedia Internet enabled cellular telephones, mobile television receivers, wireless devices, smartphones, Bluetooth® devices, personal data assistants (PDAs), wireless electronic mail receivers, hand-held or portable computers, netbooks, notebooks, smartbooks, tablets, printers, copiers, scanners, facsimile devices, global positioning system (GPS) receivers/navigators, cameras, digital media players (such as MP3 players), camcorders, game consoles, wrist watches, clocks, calculators, television monitors, flat panel displays, electronic reading devices (for example, e-readers), computer monitors, auto displays (including odometer and speedometer displays, etc.), cockpit controls and/or displays, camera view displays (such as the display of a rear view camera in a vehicle), electronic photographs, electronic billboards or signs, projectors, architectural structures, microwaves, refrigerators, stereo systems, cassette recorders or players, DVD players, CD players, VCRs, radios, portable memory chips, washers, dryers, washer/dryers, parking meters, packaging (such as in electromechanical systems (EMS) applications including microelectromechanical systems (MEMS) applications, as well as non-EMS applications), aesthetic structures (such as display of images on a piece of jewelry or clothing) and a variety of EMS devices. The teachings herein also can be used in non-display applications such as, but not limited to, electronic switching devices, radio frequency filters, sensors, accelerometers, gyroscopes, motion-sensing devices, magnetometers, inertial components for consumer electronics, parts of consumer electronics products, varactors, liquid crystal devices, electrophoretic devices, drive schemes, manufacturing processes and electronic test equipment. Thus, the teachings are not intended to be limited to the implementations depicted solely in the Figures, but instead have wide applicability as will be readily apparent to one having ordinary skill in the art.

FIG. 1A shows a schematic diagram of an example direct-view MEMS-based display apparatus 100. The display apparatus 100 includes a plurality of light modulators 102a-102d (generally light modulators 102) arranged in rows and columns. In the display apparatus 100, the light modulators 102a and 102d are in the open state, allowing light to pass. The light modulators 102b and 102c are in the closed state, obstructing the passage of light. By selectively setting the states of the light modulators 102a-102d, the display apparatus 100 can be utilized to form an image 104 for a backlit display, if illuminated by a lamp or lamps 105. In another implementation, the apparatus 100 may form an image by reflection of ambient light originating from the front of the apparatus. In another implementation, the apparatus 100 may form an image by reflection of light from a lamp or lamps positioned in the front of the display, i.e., by use of a front light.

In some implementations, each light modulator 102 corresponds to a pixel 106 in the image 104. In some other implementations, the display apparatus 100 may utilize a plurality of light modulators to form a pixel 106 in the image 104. For example, the display apparatus 100 may include three color-specific light modulators 102. By selectively opening one or more of the color-specific light modulators 102 corresponding to a particular pixel 106, the display apparatus 100 can generate a color pixel 106 in the image 104. In another example, the display apparatus 100 includes two or more light modulators 102 per pixel 106 to provide a luminance level in an image 104. With respect to an image, a pixel corresponds to the smallest picture element defined by the resolution of image. With respect to structural components of the display apparatus 100, the term pixel refers to the combined mechanical and electrical components utilized to modulate the light that forms a single pixel of the image.

The display apparatus 100 is a direct-view display in that it may not include imaging optics typically found in projection applications. In a projection display, the image formed on the surface of the display apparatus is projected onto a screen or onto a wall. The display apparatus is substantially smaller than the projected image. In a direct view display, the image can be seen by looking directly at the display apparatus, which contains the light modulators and optionally a backlight or front light for enhancing brightness and/or contrast seen on the display.

Direct-view displays may operate in either a transmissive or reflective mode. In a transmissive display, the light modulators filter or selectively block light which originates from a lamp or lamps positioned behind the display. The light from the lamps is optionally injected into a lightguide or backlight so that each pixel can be uniformly illuminated. Transmissive direct-view displays are often built onto transparent substrates to facilitate a sandwich assembly arrangement where one substrate, containing the light modulators, is positioned over the backlight. In some implementations, the transparent substrate can be a glass substrate (sometimes referred to as a glass plate or panel), or a plastic substrate. The glass substrate may be or include, for example, a borosilicate glass, wine glass, fused silica, a soda lime glass, quartz, artificial quartz, Pyrex, or other suitable glass material.

Each light modulator 102 can include a shutter 108 and an aperture 109. To illuminate a pixel 106 in the image 104, the shutter 108 is positioned such that it allows light to pass through the aperture 109. To keep a pixel 106 unlit, the shutter 108 is positioned such that it obstructs the passage of light through the aperture 109. The aperture 109 is defined by an opening patterned through a reflective or light-absorbing material in each light modulator 102.

The display apparatus also includes a control matrix coupled to the substrate and to the light modulators for controlling the movement of the shutters. The control matrix includes a series of electrical interconnects (such as interconnects 110, 112 and 114), including at least one write-enable interconnect 110 (also referred to as a scan line interconnect) per row of pixels, one data interconnect 112 for each column of pixels, and one common interconnect 114 providing a common voltage to all pixels, or at least to pixels from both multiple columns and multiples rows in the display apparatus 100. In response to the application of an appropriate voltage (the write-enabling voltage, $V_{WE}$), the write-enable interconnect 110 for a given row of pixels prepares the pixels in the row to accept new shutter movement instructions. The data interconnects 112 communicate the new movement instructions in the form of data voltage pulses. The data voltage pulses applied to the data interconnects 112, in some implementations, directly contribute to an electrostatic movement of the shutters. In some other implementations, the data voltage pulses control switches, such as transistors or other non-linear circuit elements that control the application of separate drive voltages, which are typically higher in magnitude than the data voltages, to the light modulators 102. The application of these drive voltages results in the electrostatic driven movement of the shutters 108.

The control matrix also may include, without limitation, circuitry, such as a transistor and a capacitor associated with each shutter assembly. In some implementations, the gate of each transistor can be electrically connected to a scan line interconnect. In some implementations, the source of each transistor can be electrically connected to a corresponding data interconnect. In some implementations, the drain of each transistor may be electrically connected in parallel to an electrode of a corresponding capacitor and to an electrode of a corresponding actuator. In some implementations, the other electrode of the capacitor and the actuator associated with each shutter assembly may be connected to a common or ground potential. In some other implementations, the transistor can be replaced with a semiconducting diode, or a metal-insulator-metal switching element.

Figure 1B:
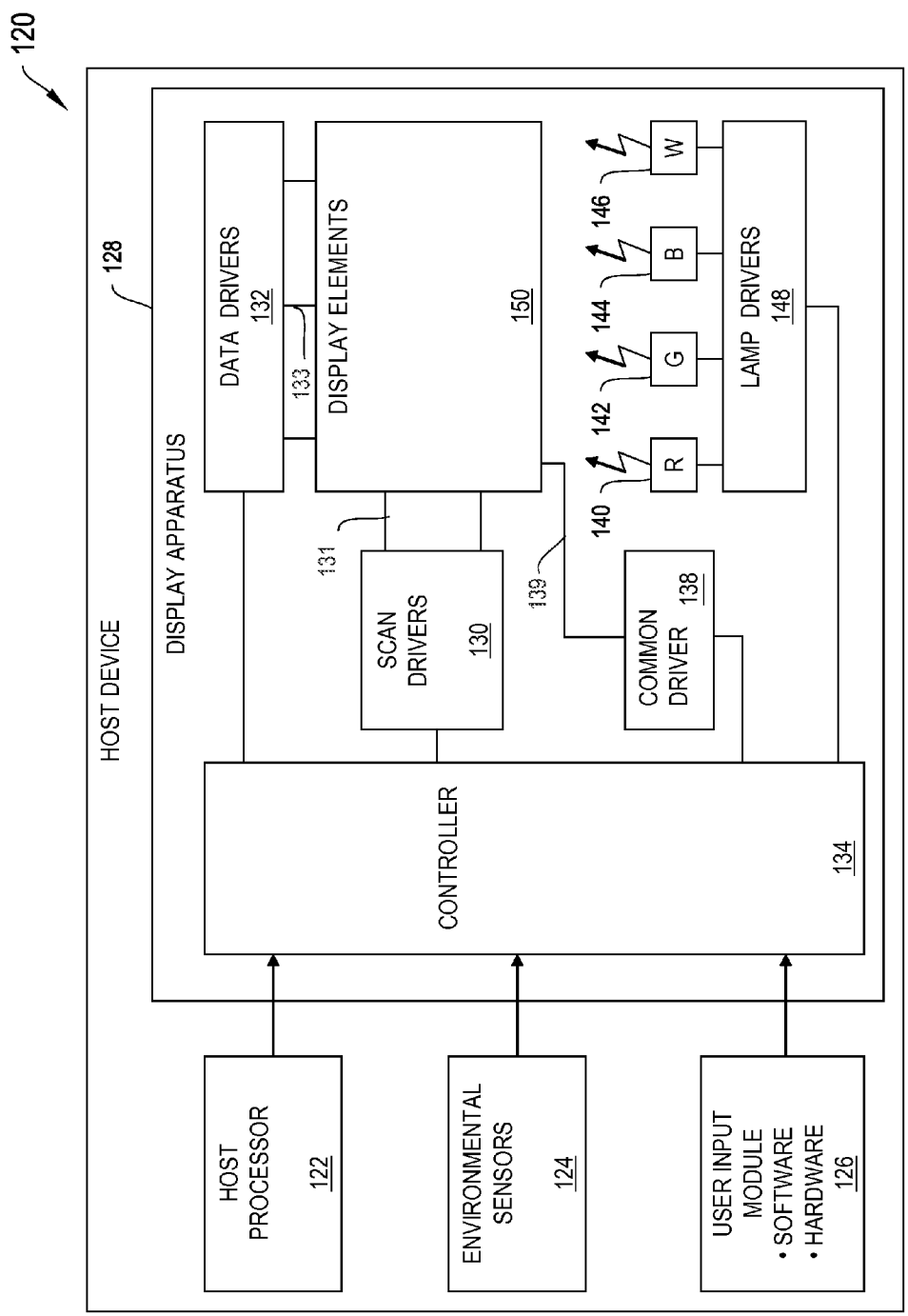
FIG. 1B shows a block diagram of an example host device.

FIG. 1B shows a block diagram of an example host device 120 (i.e., cell phone, smart phone, PDA, MP3 player, tablet, e-reader, netbook, notebook, watch, wearable device, laptop, television, or other electronic device). The host device 120 includes a display apparatus 128 (such as the display apparatus 100 shown in FIG. 1A), a host processor 122, environmental sensors 124, a user input module 126, and a power source.

The display apparatus 128 includes a plurality of scan drivers 130 (also referred to as write enabling voltage sources), a plurality of data drivers 132 (also referred to as data voltage sources), a controller 134, common drivers 138, lamps 140-146, lamp drivers 148 and an array of display elements 150, such as the light modulators 102 shown in FIG. 1A. The scan drivers 130 apply write enabling voltages to scan line interconnects 131. The data drivers 132 apply data voltages to the data interconnects 133.

In some implementations of the display apparatus, the data drivers 132 are capable of providing analog data voltages to the array of display elements 150, especially where the luminance level of the image is to be derived in analog fashion. In analog operation, the display elements are designed such that when a range of intermediate voltages is applied through the data interconnects 133, there results a range of intermediate illumination states or luminance levels in the resulting image. In some other implementations, the data drivers 132 are capable of applying only a reduced set, such as 2, 3 or 4, of digital voltage levels to the data interconnects 133. In implementations in which the display elements are shutter-based light modulators, such as the light modulators 102 shown in FIG. 1A, these voltage levels are designed to set, in digital fashion, an open state, a closed state, or other discrete state to each of the shutters 108. In some implementations, the drivers are capable of switching between analog and digital modes.

The scan drivers 130 and the data drivers 132 are connected to a digital controller circuit 134 (also referred to as the controller 134). The controller 134 sends data to the data drivers 132 in a mostly serial fashion, organized in sequences, which in some implementations may be predetermined, grouped by rows and by image frames. The data drivers 132 can include series-to-parallel data converters, level-shifting, and for some applications digital-to-analog voltage converters.

The display apparatus optionally includes a set of common drivers 138, also referred to as common voltage sources. In some implementations, the common drivers 138 provide a DC common potential to all display elements within the array 150 of display elements, for instance by supplying voltage to a series of common interconnects 139. In some other implementations, the common drivers 138, following commands from the controller 134, issue voltage pulses or signals to the array of display elements 150, for instance global actuation pulses which are capable of driving and/or initiating simultaneous actuation of all display elements in multiple rows and columns of the array.

Each of the drivers (such as scan drivers 130, data drivers 132 and common drivers 138) for different display functions can be time-synchronized by the controller 134. Timing commands from the controller 134 coordinate the illumination of red, green, blue and white lamps (140, 142, 144 and 146 respectively) via lamp drivers 148, the write-enabling and sequencing of specific rows within the array of display elements 150, the output of voltages from the data drivers 132, and the output of voltages that provide for display element actuation. In some implementations, the lamps are light emitting diodes (LEDs).

The controller 134 determines the sequencing or addressing scheme by which each of the display elements can be re-set to the illumination levels appropriate to a new image 104. New images 104 can be set at periodic intervals. For instance, for video displays, color images or frames of video are refreshed at frequencies ranging from 10 to 300 Hertz (Hz). In some implementations, the setting of an image frame to the array of display elements 150 is synchronized with the illumination of the lamps 140, 142, 144 and 146 such that alternate image frames are illuminated with an alternating series of colors, such as red, green, blue and white. The image frames for each respective color are referred to as color subframes. In this method, referred to as the field sequential color method, if the color subframes are alternated at frequencies in excess of 20 Hz, the human visual system (HVS) will average the alternating frame images into the perception of an image having a broad and continuous range of colors. In some other implementations, the lamps can employ primary colors other than red, green, blue and white. In some implementations, fewer than four, or more than four lamps with primary colors can be employed in the display apparatus 128.

In some implementations, where the display apparatus 128 is designed for the digital switching of shutters, such as the shutters 108 shown in FIG. 1A, between open and closed states, the controller 134 forms an image by the method of time division gray scale. In some other implementations, the display apparatus 128 can provide gray scale through the use of multiple display elements per pixel.

In some implementations, the data for an image state is loaded by the controller 134 to the array of display elements 150 by a sequential addressing of individual rows, also referred to as scan lines. For each row or scan line in the sequence, the scan driver 130 applies a write-enable voltage to the write enable interconnect 131 for that row of the array of display elements 150, and subsequently the data driver 132 supplies data voltages, corresponding to desired shutter states, for each column in the selected row of the array. This addressing process can repeat until data has been loaded for all rows in the array of display elements 150. In some implementations, the sequence of selected rows for data loading is linear, proceeding from top to bottom in the array of display elements 150. In some other implementations, the sequence of selected rows is pseudo-randomized, in order to mitigate potential visual artifacts. And in some other implementations, the sequencing is organized by blocks, where, for a block, the data for only a certain fraction of the image is loaded to the array of display elements 150. For example, the sequence can be implemented to address only every fifth row of the array of the display elements 150 in sequence.

In some implementations, the addressing process for loading image data to the array of display elements 150 is separated in time from the process of actuating the display elements. In such an implementation, the array of display elements 150 may include data memory elements for each display element, and the control matrix may include a global actuation interconnect for carrying trigger signals, from the common driver 138, to initiate simultaneous actuation of the display elements according to data stored in the memory elements.

In some implementations, the array of display elements 150 and the control matrix that controls the display elements may be arranged in configurations other than rectangular rows and columns. For example, the display elements can be arranged in hexagonal arrays or curvilinear rows and columns.

The host processor 122 generally controls the operations of the host device 120. For example, the host processor 122 may be a general or special purpose processor for controlling a portable electronic device. With respect to the display apparatus 128, included within the host device 120, the host processor 122 outputs image data as well as additional data about the host device 120. Such information may include data from environmental sensors 124, such as ambient light or temperature; information about the host device 120, including, for example, an operating mode of the host or the amount of power remaining in the host device's power source; information about the content of the image data; information about the type of image data; and/or instructions for the display apparatus 128 for use in selecting an imaging mode.

In some implementations, the user input module 126 enables the conveyance of personal preferences of a user to the controller 134, either directly, or via the host processor 122. In some implementations, the user input module 126 is controlled by software in which a user inputs personal preferences, for example, color, contrast, power, brightness, content, and other display settings and parameters preferences. In some other implementations, the user input module 126 is controlled by hardware in which a user inputs personal preferences. In some implementations, the user may input these preferences via voice commands, one or more buttons, switches or dials, or with touch-capability. The plurality of data inputs to the controller 134 direct the controller to provide data to the various drivers 130, 132, 138 and 148 which correspond to optimal imaging characteristics.

The environmental sensor module 124 also can be included as part of the host device 120. The environmental sensor module 124 can be capable of receiving data about the ambient environment, such as temperature and or ambient lighting conditions. The sensor module 124 can be programmed, for example, to distinguish whether the device is operating in an indoor or office environment versus an outdoor environment in bright daylight versus an outdoor environment at nighttime. The sensor module 124 communicates this information to the display controller 134, so that the controller 134 can optimize the viewing conditions in response to the ambient environment.

FIGS. 2A and 2B show views of an example dual actuator shutter assembly 200. The dual actuator shutter assembly 200, as depicted in FIG. 2A, is in an open state. FIG. 2B shows the dual actuator shutter assembly 200 in a closed state. The shutter assembly 200 includes actuators 202 and 204 on either side of a shutter 206. Each actuator 202 and 204 is independently controlled. A first actuator, a shutter-open actuator 202, serves to open the shutter 206. A second opposing actuator, the shutter-close actuator 204, serves to close the shutter 206. Each of the actuators 202 and 204 can be implemented as compliant beam electrode actuators. The actuators 202 and 204 open and close the shutter 206 by driving the shutter 206 substantially in a plane parallel to an aperture layer 207 over which the shutter is suspended. The shutter 206 is suspended a short distance over the aperture layer 207 by anchors 208 attached to the actuators 202 and 204. Having the actuators 202 and 204 attach to opposing ends of the shutter 206 along its axis of movement reduces out of plane motion of the shutter 206 and confines the motion substantially to a plane parallel to the substrate (not depicted).

In the depicted implementation, the shutter 206 includes two shutter apertures 212 through which light can pass. The aperture layer 207 includes a set of three apertures 209. In FIG. 2A, the shutter assembly 200 is in the open state and, as such, the shutter-open actuator 202 has been actuated, the shutter-close actuator 204 is in its relaxed position, and the centerlines of the shutter apertures 212 coincide with the centerlines of two of the aperture layer apertures 209. In FIG. 2B, the shutter assembly 200 has been moved to the closed state and, as such, the shutter-open actuator 202 is in its relaxed position, the shutter-close actuator 204 has been actuated, and the light blocking portions of the shutter 206 are now in position to block transmission of light through the apertures 209 (depicted as dotted lines).

Each aperture has at least one edge around its periphery. For example, the rectangular apertures 209 have four edges. In some implementations, in which circular, elliptical, oval, or other curved apertures are formed in the aperture layer 207, each aperture may have only a single edge. In some other implementations, the apertures need not be separated or disjointed in the mathematical sense, but instead can be connected. That is to say, while portions or shaped sections of the aperture may maintain a correspondence to each shutter, several of these sections may be connected such that a single continuous perimeter of the aperture is shared by multiple shutters.

In order to allow light with a variety of exit angles to pass through the apertures 212 and 209 in the open state, the width or size of the shutter apertures 212 can be designed to be larger than a corresponding width or size of apertures 209 in the aperture layer 207. In order to effectively block light from escaping in the closed state, the light blocking portions of the shutter 206 can be designed to overlap the edges of the apertures 209. FIG. 2B shows an overlap 216, which in some implementations can be predefined, between the edge of light blocking portions in the shutter 206 and one edge of the aperture 209 formed in the aperture layer 207.

The electrostatic actuators 202 and 204 are designed so that their voltage-displacement behavior provides a bi-stable characteristic to the shutter assembly 200. For each of the shutter-open and shutter-close actuators, there exists a range of voltages below the actuation voltage, which if applied while that actuator is in the closed state (with the shutter being either open or closed), will hold the actuator closed and the shutter in position, even after a drive voltage is applied to the opposing actuator. The minimum voltage needed to maintain a shutter's position against such an opposing force is referred to as a maintenance voltage $V_m$.

Figure 3A:
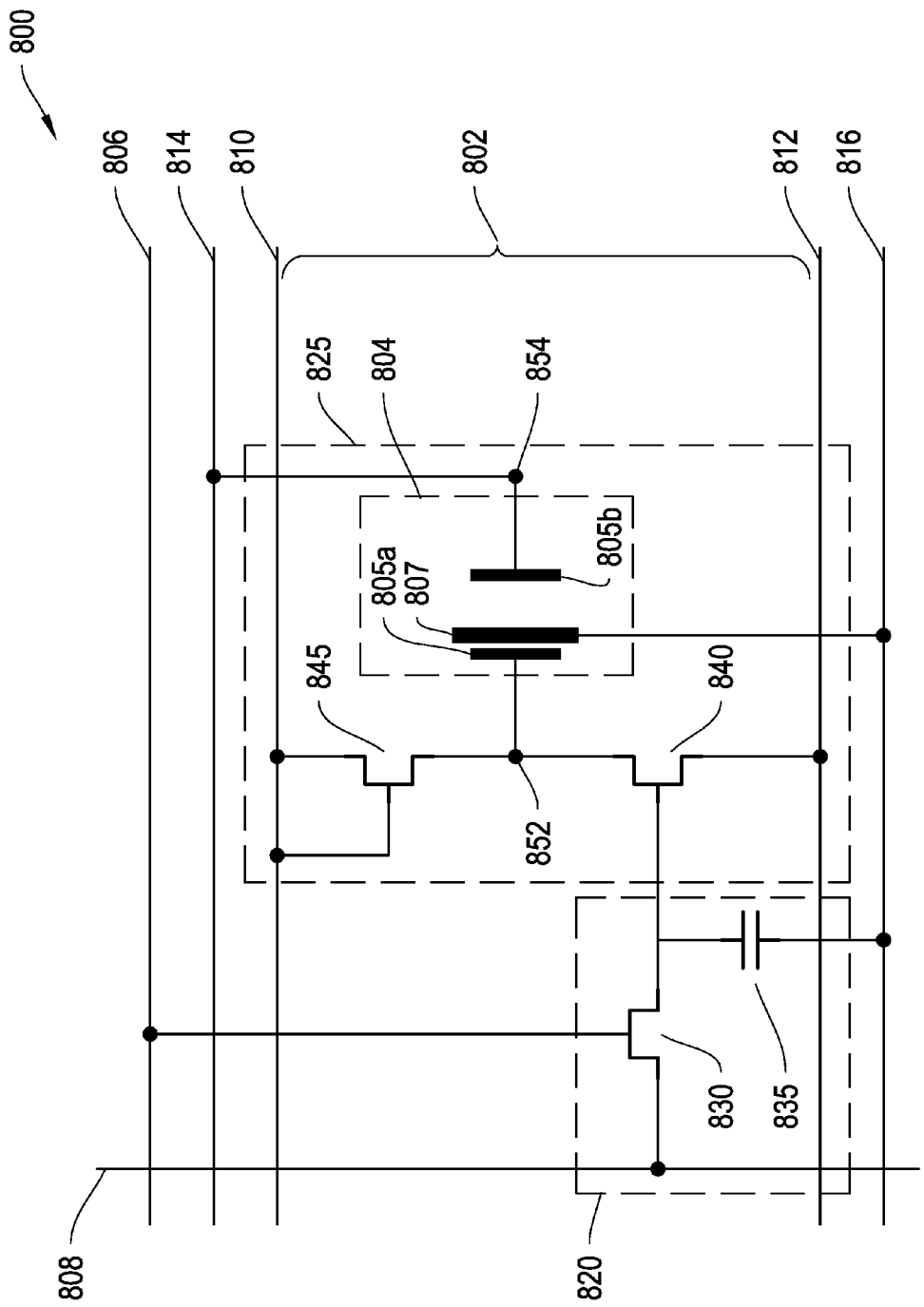
FIGS. 3A and 3B show portions of two example control matrices.
Figure 3B:
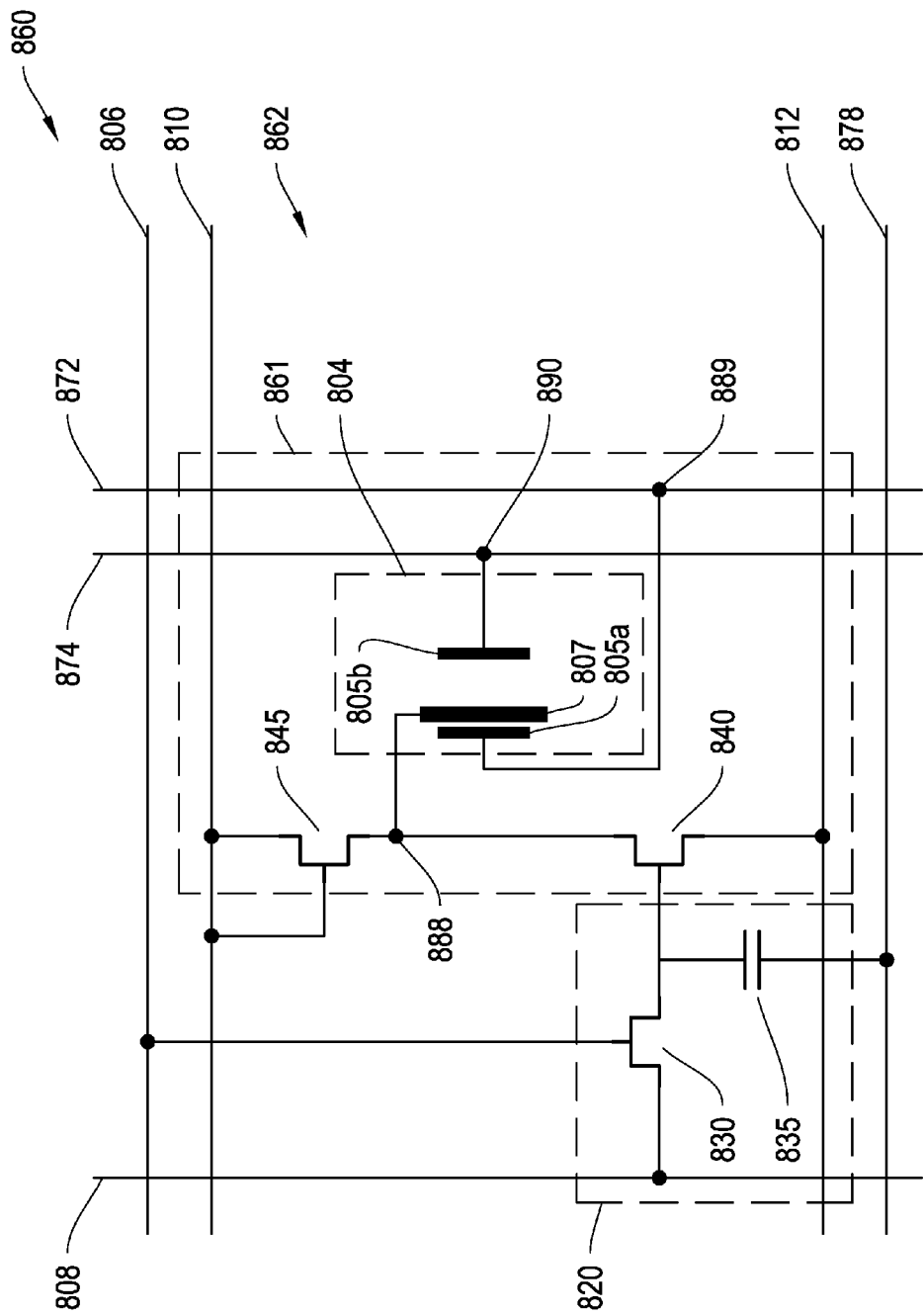

FIGS. 3A and 3B show portions of two example control matrices 800 and 860. As described above, a control matrix is a collection of interconnects and circuitry used to address and actuate the display elements of a display. In some implementations, the control matrix 800 can be implemented for use in the display apparatus 128 shown in FIG. 1B and is formed using thin-film components, such as thin-film transistors (TFTs) and other thin film components.

The control matrix 800 controls an array of pixels 802, a scan-line interconnect 806 for each row of pixels 802, a data interconnect 808 for each column of pixels 802, and several common interconnects that each carry signals to multiple rows and multiple columns of pixels at the same time. The common interconnects include an actuation voltage interconnect 810, a global update interconnect 812, a common drive interconnect 814, and a shutter common interconnect 816.

Each pixel in the control matrix includes a light modulator 804, a data storage circuit 820, and an actuation circuit 825. The light modulator 804 includes a first actuator 805a and a second actuator 805b (generally "actuators 805") for moving a light obstructing component, such as a shutter 807, between at least an obstructive and a non-obstructive state. In some implementations, the obstructive state corresponds to a light absorbing dark state in which the shutter 807 obstructs the path of light from a backlight out towards and through the front of the display to a viewer. The non-obstructive state can correspond to a transmissive or light state, in which the shutter 807 is outside of the path of light, allowing the light emitted by the backlight to be output through the front of the display. In some other implementations, the obstructive state is a reflective state and the non-obstructive state is a light absorbing state.

The data storage circuit 820 also includes a write-enabling transistor 830, and a data storage capacitor 835. The data storage circuit 820 is controlled by the scan-line interconnect 806 and the data interconnect 808. More particularly, the scan-line interconnect 806 selectively allows data to be loaded into the pixels 802 of a row by supplying a voltage to the gates of the write-enabling transistors 830 of the respective pixel actuation circuits 825. The data interconnect 808 provides a data voltage corresponding to the data to be loaded into the pixel 802 of its corresponding column in the row for which the scan-line interconnect 806 is active. To that end, the data interconnect 808 couples the source of the write-enabling transistor 830. The drain of the write-enabling transistor 830 couples to the data storage capacitor 835. If the scan-line interconnect 806 is active, a data voltage applied to the data interconnect 808 passes through the write-enabling transistor 830 and is stored on the data storage capacitor 835.

The pixel actuation circuit 825 includes an update transistor 840 and a charge transistor 845. The gate of the update transistor 840 is coupled to the data storage capacitor 835 and the drain of the write-enable transistor 830. The drain of the update transistor 840 is coupled to the global update interconnect 812. The source of the update transistor 840 is coupled to the drain of the charge transistor 845 and a first active node 852, which is coupled to a drive electrode 809a of the first actuator 805a. The gate and source of the charge transistor 845 are connected to the actuation voltage interconnect 810.

A drive electrode 809b of the second actuator 805b is coupled to the common drive interconnect 814 at a second active node 854. The shutter 807 also is coupled to the shutter common interconnect 816, which in some implementations, is maintained at ground. The shutter common interconnect 816 is configured to be coupled to each of the shutters in the array of pixels 802. In this way, all of the shutters are maintained at the same voltage potential.

The control matrix 800 can operate in three general stages. First, data voltages for pixels in a display are loaded for each pixel one row at a time in a data loading stage. Next, in a precharge stage, the common drive interconnect 814 is grounded and actuation voltage interconnect 810 is brought high. Doing so lowers the voltage on the drive electrode 809b of the second actuators 805b of the pixels and applies a high voltage to the drive electrodes 809a of the first actuators 805a of the pixels 802. This results in all of the shutters 807 moving towards the first actuator 805, if they were not already in that position. Next, in a global update stage, the pixels 802 are moved (if necessary) to the state indicated by the data voltage loaded into the pixels 802 in the data loading stage.

The data loading stage proceeds with applying a write-enabling voltage $V_{we}$ to a first row of the array of pixels 802 via the scan-line interconnect 806. As described above, the application of a write-enabling voltage $V_{we}$ to the scan-line interconnect 806 corresponding to a row turns on the write-enable transistors 830 of all pixels 802 in that row. Then a data voltage is applied to each data interconnect 808. The data voltage can be high, such as between about 3V and about 7V, or it can be low, for example, at or about ground. The data voltage on each data interconnect 808 is stored on the data storage capacitor 835 of its respective pixel in the write-enabled row.

Once all the pixels 802 in the row are addressed, the control matrix 800 removes the write-enabling voltage $V_{we}$ from the scan-line interconnect 806. In some implementations, the control matrix 800 grounds the scan-line interconnect 806. The data loading stage is then repeated for subsequent rows of the array in the control matrix 800. At the end of the data loading sequence, each of the data storage capacitors 835 in the selected group of pixels 802 stores the data voltage which is appropriate for the setting of the next image state.

The control matrix 800 then proceeds with the precharge stage. In the precharge stage, in each pixel 802, the drive electrode 809a of the first actuator 805a is charged to the actuation voltage, and the drive electrode 809b of the second actuator 805b is grounded. If the shutter 807 in the pixel 802 was not already moved towards the first actuator 805a for the previous image, then this process causes the shutter 807 to do so. The precharge stage begins by providing an actuation voltage to the actuation voltage interconnect 810 and providing a high voltage at the global update interconnect 812. The actuation voltage, in some implementations, can be between about 20V and about 50V. The high voltage applied to the global update interconnect 812 can be between about 3V and about 7V. By doing so, the actuation voltage from the actuation voltage interconnect 810 can pass through the charge transistor 845, bringing the first active node 852 and the drive electrode 809a of the first actuator 805a up to the actuation voltage. As a result, the shutter 807 either remains attracted to the first actuator 805a or moves towards the first actuator from the second actuator 805b.

The control matrix 800 then activates the common drive interconnect 814. This brings the second active node 854 and the drive electrode 809b of the second actuator 805b to the actuation voltage. The actuation voltage interconnect 810 is then brought down to a low voltage, such as ground. At this stage, the actuation voltage is stored on the drive electrodes 809a and 809b of both actuators 805. However, as the shutter 807 is already moved towards the first actuator 805a, it remains in that position unless and until the voltage on the drive electrode 809a of the first actuator is brought down. The control matrix 800 then waits a sufficient amount of time for all of the shutters 807 to reliably have reached their positions adjacent the first actuator 805a before proceeding.

Next, the control matrix 800 proceeds with the update stage. In this stage, the global update interconnect 812 is brought to a low voltage. Bringing the global update interconnect 812 down enables the update transistor 840 to respond to the data voltage stored on the data storage capacitor 835. Depending on the voltage of the data voltage stored at the data storage capacitor 835, the update transistor 840 will either switch ON or remain switched OFF. If the data voltage stored at the data storage capacitor 835 is high, the update transistor 840 switches ON, resulting in the voltage at the first active node 852 and on the drive electrode 809a of the first actuator 805a to collapse to ground. As the voltage on the drive electrode 809b of the second actuator 805b remains high, the shutter 807 moves towards the second actuator 805b. Conversely, if the data voltage stored in the data storage capacitor 835 is low, the update transistor 840 remains switched OFF. As a result, the voltage at the first active node 852 and on the drive electrode 809a of the first actuator 805a remains at the actuation voltage level, keeping the shutter in place. After enough time has passed to ensure all shutters 807 have reliably travelled to their intended positions, the display can illuminate its backlight to display the image resulting from the shutter states loaded into the array of pixels 802.

In the process described above, for each set of pixel states the control matrix 800 displays, the control matrix 800 takes at least twice the time needed for the shutter 807 to travel between states in order to ensure the shutter 807 ends up in the proper position. That is, all the shutters 807 are first brought towards the first actuator 805a, requiring one shutter travel time, before they are then selectively allowed to move towards the second actuator 805b, requiring a second shutter travel time. If the global update stage commences too quickly, the shutter 807 may not have enough time to reach the first actuator 805a. As a result, the shutter may move towards the incorrect state during the global update stage.

In contrast to shutter-based display circuits, such as the control matrix 800 shown in FIG. 3A, in which the shutters are maintained at a common voltage and are driven by varying the voltage applied to the drive electrodes 809a and 809b of opposing actuators 805a and 805b, a display circuit in which the shutter is itself coupled to an active node can be implemented. Shutters controlled by such a circuit can be directly driven into their respective desired states without first all having to be moved into a common position, as described with respect to the control matrix 800. As a result, such a circuit requires less time to address and actuate, and reduces the risk of shutters not correctly entering their desired states.

FIG. 3B shows a portion of a control matrix 860. The control matrix 860 is capable of selectively apply actuation voltages to the load electrode 811 of each actuator 805, instead of to the drive electrode 809. The load electrodes 811 are directly coupled to the shutter 807. This is in contrast to the control matrix 800 depicted in FIG. 3A, in which the shutter 807 was kept at a constant voltage.

Similar to the control matrix 800 shown in FIG. 3A, the control matrix 860 can be implemented for use in the display apparatus 128 shown in FIG. 1B. In some implementations, the control matrix 860 also can be implemented for use in the display apparatus shown in FIGS. 4, 5A, 6A, 7, 8 and 11A, 12A, 12F, 13A, and 14A, described below. The structure of the control matrix 860 is described immediately below.

Like the control matrix 800, the control matrix 860 controls an array of pixels 862. Each pixel 862 includes a light modulator 804. Each light modulator includes a shutter 807. The shutter 807 is driven by actuators 805a and 805b between a position adjacent the first actuator 805a and a position adjacent the second actuator 805b. Each actuator 805a and 805b includes a load electrode 811 and a drive electrode 809. Generally, as used herein, a load electrode 811 of an electrostatic actuator corresponds to the electrode of the actuator coupled to the load being moved by the actuator. Accordingly, with respect to the actuators 805a and 805b, the load electrode 811 refers to an electrode of the actuator that couples to the shutter 807. The drive electrode 809 refers to the electrode paired with and opposing the load electrode 811 to form the actuator.

The control matrix 860 includes a data loading circuit 820 similar to that of the control matrix 800. The control matrix 860, however, includes different common interconnects than the control matrix 800 and a significantly different actuation circuit 861.

The control matrix 860 includes three common interconnects which were not included in the control matrix 800 of FIG. 3A. Specifically, the control matrix 860 includes a first actuator drive interconnect 872, a second actuator drive interconnect 874, and a common ground interconnect 878. In some implementations, the first actuator drive interconnect 872 is maintained at a high voltage and the second actuator drive interconnect 874 is maintained at a low voltage. In some other implementations, the voltages are reversed, i.e., the first actuator drive interconnect is maintained at a low voltage and the second actuator drive interconnect 874 is maintained at a high voltage. While the following description of the control matrix 860 assumes a constant voltage being applied to the first and second actuator drive interconnects 872 and 874 (as set forth above), in some other implementations, the voltages on the first actuator drive interconnect 872 and the second actuator drive interconnects 874, as well as the input data voltage, are periodically reversed to avoid charge build-up on the electrodes of the actuators 805 and 805b.

The common ground interconnect 878 serves merely to provide a reference voltage for data stored on the data storage capacitor 835. In some implementations, the control matrix 860 can forego the common ground interconnect 878, and instead have the data storage capacitor coupled to the first or second actuator drive interconnect 872 and 874. The function of the actuator drive interconnects 872 and 874 is described further below.

Like the control matrix 800, the actuation circuit 861 of the control matrix 860 includes an update transistor 840 and a charge transistor 845. In contrast, however, the charge transistor 845 and the update transistor 840 are coupled to the load electrode 811 of the first actuator 805a of the light modulator 804, instead of the drive electrode 809a of the first actuator 805a. As a result, when the charge transistor 845 is activated, an actuation voltage is stored on the load electrodes 811 of both of the actuators 805a and 805b, as well as on the shutter 807. Thus, the update transistor 840, instead of selectively discharging the drive electrodes 809a of the first actuator 805a, based on image data stored on the storage capacitor 835, selectively discharges the load electrodes 811 of the actuators 805a and 805b and the shutter 807, removing the potential on the components.

As indicated above, the first actuator drive interconnect 872 is maintained at a high voltage and the second actuator drive interconnect 874 is maintained at a low voltage. Accordingly, while an actuation voltage is stored on the shutter 807 and the load electrodes 811 of the actuators 805a and 805b, the shutter 807 moves to the second actuator 805b, whose drive electrode 809b is maintained at a low voltage. When the shutter 807 and the load electrodes 811 of the actuators 805a and 805b are brought low, the shutter 807 moves towards the first actuator 805a, whose drive electrode 809a is maintained at a high voltage.

The control matrix 860 can operate in two general stages. First, data voltages for pixels 862 in a display are loaded for each pixel 862, one or more rows at a time, in a data loading stage. The data voltages are loaded in a manner similar to that described above with respect to FIG. 3A. In addition, the global update interconnect 812 is maintained at a high voltage potential to prevent the update transistor 840 from switching ON during the data loading stage.

After the data loading stage is complete, the shutter actuation stage begins by providing an actuation voltage to the actuation voltage interconnect 810. By providing the actuation voltage to the actuation voltage interconnect 810, the charge transistor 845 is switched ON allowing the current to flow through the charge transistor 845, bringing the shutter 807 up to about the actuation voltage. After a sufficient period of time has passed to allow the actuation voltage to be stored on the shutter 807, the actuation voltage interconnect 810 is brought low. The amount of time needed for this to occur is substantially less than the time needed for a shutter 807 to change states. The update interconnect 812 is brought low immediately thereafter. Depending on the data voltage stored at the data storage capacitor 835, the update transistor 840 will either remain OFF or will switch ON.

If the data voltage is high, the update transistor 840 switches ON, discharging the shutter 807 and the load electrodes 811 of the actuators 805a and 805b. As a result, the shutter is attracted to the first actuator 805a. Conversely, if the data voltage is low, the update transistor 840 remains OFF. As a result, the actuation voltage remains on the shutter and the load electrodes 811 of the actuators 805a and 805b. The shutter, as a result is attracted to the second actuator 805b.

Due to the architecture of the actuation circuit 861, it is permissible for the shutter 807 to be in any state, even an indeterminate state, when the update transistor 840 is turned ON. This enables the immediate switching of the update transistor 840 as soon as the actuation voltage interconnect 810 is brought low. In contrast to the operation of the control matrix 800, with the control matrix 860, no time needs to be set aside to allow the shutter 807 to move to any particular state. Moreover, because the initial state of the shutter 807 has little to no impact on its final state, the risk of a shutter 807 entering the wrong state is substantially reduced.

Shutter assemblies employing control matrices similar to the control matrix 800 depicted in FIG. 3A face the risk of their respective shutters being drawn towards an opposing substrate due to charge build up on the substrate. If the charge build-up is sufficiently large, the resulting electrostatic forces can draw the shutter into contact with the opposing substrate, where it can sometimes permanently adhere due to stiction. To reduce this risk, a substantially continuous conductive layer can be deposited across the surface of the opposing substrate to dissipate the charge that might otherwise build up. In some implementations, such a conductive layer can be electrically coupled to the shutter common interconnect 816 of the control matrix 800 (as shown in FIG. 3A) to help keep the shutters 807 and the conductive layer at a common potential.

Shutter assemblies employing control matrices similar to the control matrix 860 of FIG. 3B bear additional risk of shutter stiction to an opposing substrate. The risk to such shutter assemblies, cannot, however, be mitigated by use of a similar substantially continuous conductive layer being deposited on the opposing substrate. In using a control matrix similar to the control matrix 860, shutters are driven to different voltages at different times. Thus at any given time, if the opposing substrate were kept at a common potential, some shutters would experience little electrostatic force, while others would experience large electrostatic forces.

Thus, to implement a display apparatus using a control matrix similar to the control matrix 860 shown in FIG. 3B, the display apparatus can incorporate a pixilated conductive layer. Such a conductive layer is divided into multiple electrically isolated regions, with each region corresponding to, and being electrically coupled to, the shutter of a vertically adjacent shutter assembly. One display apparatus architecture suitable for use with a control matrix similar to the control matrix 860 depicted in FIG. 3B is shown in FIG. 4.

Figure 4:
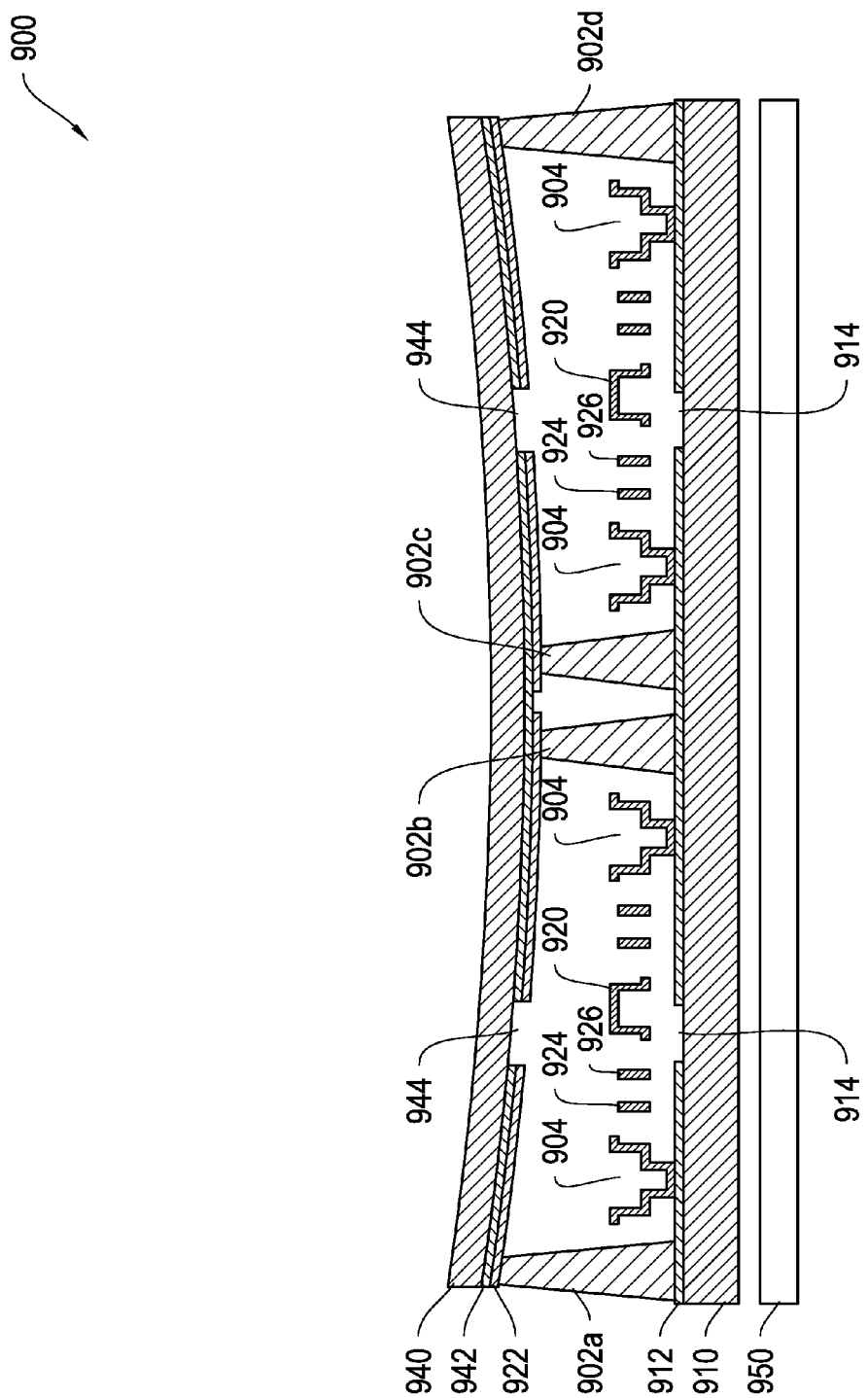
FIG. 4 shows a cross-sectional view of an example display apparatus incorporating flexible conductive spacers.

FIG. 4 shows a cross-sectional view of an example display apparatus 900 incorporating flexible conductive spacers. The display apparatus 900 is built in a MEMS-up configuration. That is, an array of shutter-based display elements that includes a plurality of shutters 920 is fabricated on a transparent substrate 910 positioned towards the rear of the display apparatus 900 and faces up towards a cover sheet 940 that forms the front of the display apparatus 900. The transparent substrate 910 is coated with a light absorbing layer 912 through which rear apertures 914 corresponding to the overlying shutters 920 are formed. The transparent substrate 910 is positioned in front of a backlight 950. Light emitted by the backlight 950 passes through the apertures 914 to be modulated by the shutters 920.

The display elements include anchors 904 configured to support one or more electrodes, such as drive electrodes 924 and load electrodes 926 that make up the actuators of the display apparatus 900.

The display apparatus 900 also includes a cover sheet 940 on which a conductive layer 922 is formed. The conductive layer 922 is pixilated to form a plurality of electrically isolated conductive regions that correspond to respective ones of the underlying shutters 920. Each of the electrically isolated conductive regions formed on the cover sheet 940 is vertically adjacent to an underlying shutter 920 and is electrically coupled thereto. The cover sheet 940 further includes a light blocking layer 942 through which a plurality of front apertures 944 are formed. The front apertures 944 are aligned with the rear apertures 914 formed through the light absorbing layer 912 on the transparent substrate 910 opposite the cover sheet 940.

The cover sheet 940 can be a flexible substrate (such as glass, plastic, polyethylene terephthalate (PET), polyethylene napthalate (PEN), or polyimide) that is capable of deforming from a relaxed state towards the transparent substrate 910 when the fluid contained between the cover sheet 940 and the transparent substrate 910 contracts at lower temperatures, or in response to an external pressure, such as a user's touch. At normal or high temperatures, the cover sheet 940 is capable of returning to its relaxed state. Deformation in response to temperature changes helps prevent bubble formation within the display apparatus 900 at low temperatures, but poses challenges with respect to maintaining an electrical connection between the electrically isolated regions of the conductive layer 922 and their corresponding shutters 920. Specifically, to accommodate the deformation of the cover sheet 940, the display apparatus must include an electrical connection that can likewise deform vertically with the cover sheet 940.

Accordingly, the cover sheet 940 is supported over the transparent substrate 910 by flexible conductive spacers 902a-902d (generally "flexible conductive spacers 902"). The flexible conductive spacers 902 can be made from a polymer and coated with an electrically conductive layer. The flexible conductive spacers 902 are formed on the transparent substrate 910 and electrically couple a corresponding shutter 920 to a corresponding conductive region on the cover sheet 940. In some implementations, the flexible conductive spacers 902 can be sized to be slightly taller than the cell gap, i.e., the distance between the cover sheet 940 and the transparent substrate 910 at their edges. The flexible conductive spacers 902 are configured to be compressible such that they can be compressed by the cover sheet 940 when the cover sheet 940 deforms towards the transparent substrate 910 and then return to their original states when the cover sheet 940 returns to its relaxed state. In this way, each of the flexible conductive spacers 902 maintains an electrical connection between a conductive region on the cover sheet 940 and a corresponding shutter 920, even as the cover sheet deforms and relaxes. In some implementations, the flexible conductive spacers 902 can be taller than the cell gap by about 0.5 to about 5.0 micrometers (microns).

FIG. 4 shows the display apparatus 900 can be operated in a low temperature environment, for example at around 0° C. At such temperatures, the cover sheet 940 can deform towards the transparent substrate 910, as is depicted in FIG. 4. Due to the deformation, the flexible conductive spacers 902b and 902c are more compressed than the flexible conductive spacers 902a and 902d. Under higher temperature conditions, such as room temperature, the cover sheet 940 can return to its relaxed state. As the cover sheet 940 returns to its relaxed state, the flexible conductive spacers 902 also return to their original states, while maintaining an electrical connection with a corresponding conductive region of the light blocking layer 942 formed on the cover sheet 940.

The distance between the front apertures 944 and their corresponding rear apertures 914 can affect display characteristics of the display apparatus. In particular, a larger distance between the front apertures 944 and corresponding rear apertures 914 can adversely affect the viewing angle of the display. Although reducing the distance between the front apertures and corresponding rear apertures is desirable, doing so is challenging due to the deformable nature of the coversheet 940 on which the front light blocking layer 942 is formed. Specifically, the distance is set to be large enough such that the cover sheet 940 can deform without coming into contact with the shutters 920, anchors 904 or drive or load electrodes 924 and 926. While this maintains the physical integrity of the display, it is non-ideal with regards to the optical performance of the display.

Instead of using flexible conductive spacers, such as the flexible conductive spacers 902 shown in FIG. 4, to maintain an electrical connection between the conductive regions formed on the cover sheet and the underlying shutters, a pixilated conductive layer can be positioned between the shutters of a display apparatus and a cover sheet. This layer can be fabricated on the same substrate as the shutter assemblies that include the shutters. By relocating the conductive layer off of the coversheet, the coversheet can deform freely without impacting the electrical connection between the conductive layer and the shutters.

In some implementations, this intervening conductive layer takes the form of or is included as part of an elevated aperture layer (EAL). An EAL includes apertures formed through it across its surface corresponding to rear apertures formed in a rear light blocking layer deposited on the underlying substrate. The EAL can be pixilated to form electrically isolated conductive regions similar to the pixilated conductive layer formed on the cover sheet 940 shown in FIG. 4. Use of an EAL can both obviate the need to maintain an electrical connection with surfaces deposited on the deformable cover sheet and position a front set of apertures closer to the rear set of apertures, improving image quality.

Relocating the front apertures to an EAL, which does not need to deform, enables the front apertures to be located closer to the rear apertures, thereby enhancing a display's viewing angle characteristics. Moreover, since the front apertures are no longer a part of the cover sheet, the cover sheet can be spaced further away from the transparent substrate without affecting the contrast ratio or viewing angle of the display.

Figure 5A:
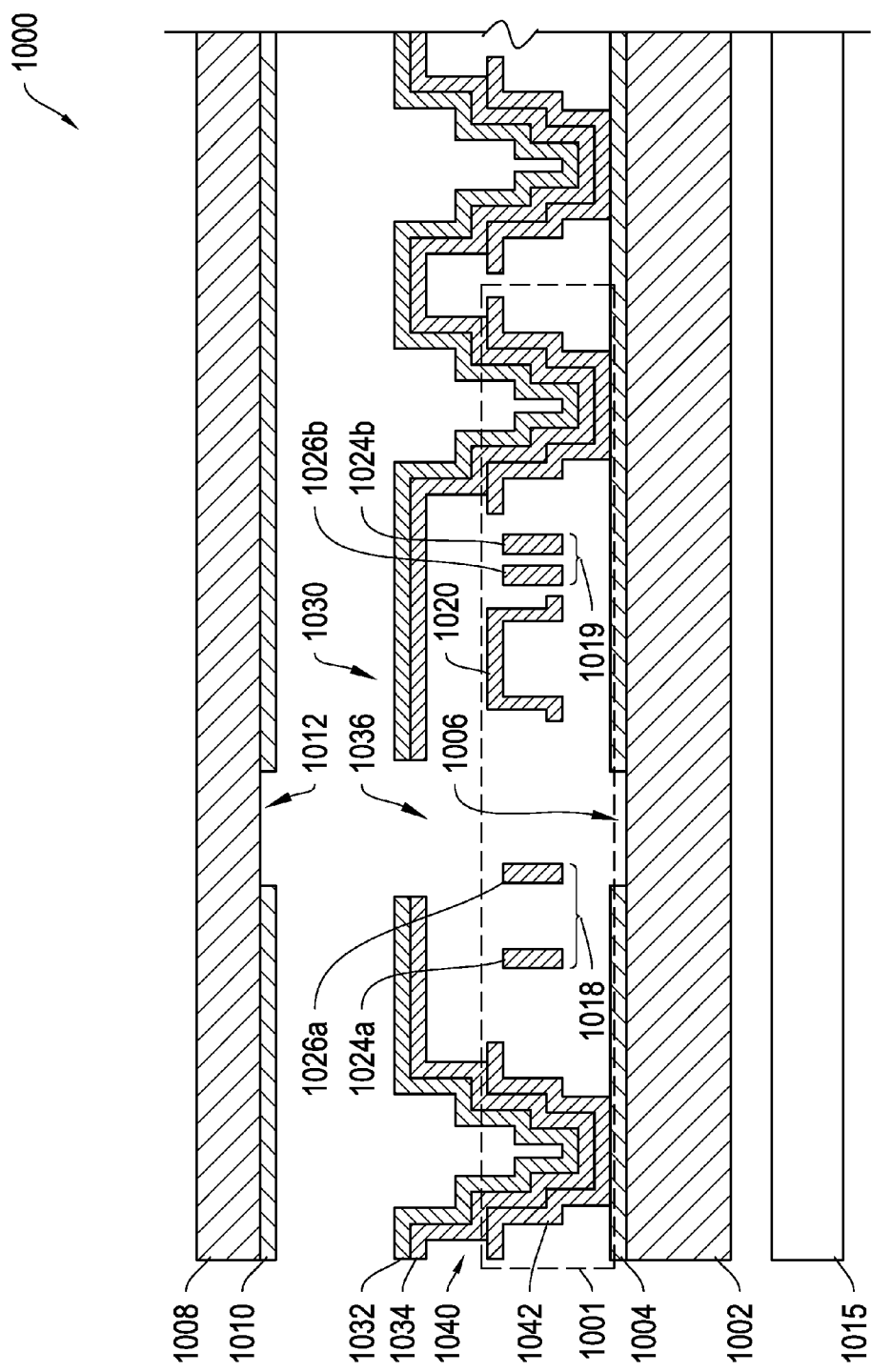
FIG. 5A shows a cross-sectional view of an example display apparatus incorporating an integrated elevated aperture layer (EAL).

FIG. 5A shows a cross-sectional view of an example display apparatus 1000 incorporating an EAL 1030. The display apparatus 1000 is built in a MEMS-up configuration. That is, an array of shutter-based display elements is fabricated on a transparent substrate 1002 positioned towards the rear of the display apparatus 1000. FIG. 5A shows one such shutter-based display element, i.e., a shutter assembly 1001. The transparent substrate 1002 is coated with a light blocking layer 1004 through which rear apertures 1006 are formed. The light blocking layer 1004 can include a reflective layer facing a backlight 1015 is positioned behind the substrate 1002 and a light absorbing layer facing away from the backlight 1015. Light emitted by the backlight 1015 passes through the rear apertures 1006 to be modulated by the shutter assemblies 1001.

Each of the shutter assemblies 1001 includes a shutter 1020. As shown in FIG. 5A, the shutter 1020 is a dual-actuated shutter. That is, the shutter 1020 can be driven in one direction by a first actuator 1018 and driven to a second direction by a second actuator 1019. The first actuator 1018 includes a first drive electrode 1024a and a first load electrode 1026a that together are configured to drive the shutter 1020 in a first direction. The second actuator 1019 includes a second drive electrode 1024b and a second load electrode 1026*b* that together are configured to drive the shutter 1020 in a second direction opposite the first direction.

A plurality of anchors 1040 are built on the transparent substrate 1002 and support the shutter assemblies 1001 over the transparent substrate 1002. The anchors 1040 also support the EAL 1030 over the shutter assemblies. As such, the shutter assemblies are disposed between the EAL 1030 and the transparent substrate 1002. In some implementations, the EAL 1030 is separated from the underlying shutter assemblies by a distance of about 2 to about 5 microns.

The EAL 1030 includes a plurality of aperture layer apertures 1036 that are formed through the EAL 1030. The aperture layer apertures 1036 are aligned with the rear apertures 1006 formed through the light blocking layer 1004. The EAL 1030 can include one or more layers of material. As shown in FIG. 5A, the EAL 1030 includes a layer of conductive material 1034 and a light absorbing layer 1032 formed on top of the layer of conductive material 1034. The light absorbing layer 1032 can be an electrically insulating material, such as a dielectric stack capable of causing destructive interference or an insulating polymer matrix, which in some implementations incorporates light absorbing particles. In some implementations, the insulating polymer matrix can be mixed with light absorbing particles. In some implementations, the layer of conductive material 1034 can be pixilated to form a plurality of electrically isolated conductive regions. Each of the electrically isolated conductive regions can correspond to an underlying shutter assembly and can be electrically coupled to underlying shutter 1020 via the anchor 1040. As such, the shutter 1020 and the corresponding electrically isolated conductive region formed on the EAL 1030 can be maintained at the same voltage potential. Maintaining the isolated conductive regions and their respective corresponding shutters at a common voltage enables the display apparatus 1000 to include a control matrix, such as the control matrix 860 depicted in FIG. 3B, in which different voltages are applied to different shutters, without substantially increasing the risk of shutter stiction. In some implementations, the conductive material is or can include aluminum (Al), copper (Cu), nickel (Ni), chromium (Cr), molybdenum (Mo), titanium (Ti), tantalum (Ta), niobium (Nb), neodymium (Nd), or alloys thereof, or semiconducting materials such as diamond-like carbon, silicon (Si), germanium (Ge), gallium arsenide (GaAs), cadmium telluride (CdTe) or alloys thereof. In some implementations employing semiconductor layers, the semiconductors are doped with impurities such as phosphorus (P), arsenic (As), boron (B), or Al.

The EAL 1030 faces up towards a cover sheet 1008 that forms the front of the display apparatus 1000. The cover sheet 1008 can be a glass, plastic or other suitable substantially transparent substrate that is coated with one or more layers of anti-reflective and/or light absorbing material. In some implementations, a light blocking layer 1010 is coated on a surface of the cover sheet 1008 facing the EAL 1030. In some implementations, the light blocking layer 1010 is formed from a light absorbing material. A plurality of front apertures 1012 are formed through the light blocking layer 1010. The front apertures 1012 are aligned with the aperture layer apertures 1036 and the rear apertures 1006. In this way, light from the backlight 1015 that passes through the aperture layer apertures 1036 formed in the EAL 1030 also can pass through the overlying front apertures 1012 to form an image.

The cover sheet 1008 is supported over the transparent substrate 1002 via an edge seal (not depicted) formed along the perimeter of the display apparatus 1000. The edge seal is configured to seal a fluid between the cover sheet 1008 and the transparent substrate 1002 of the display apparatus 1000. In some implementations, the cover sheet 1008 also can be supported by spacers (not depicted) that are formed on the transparent substrate 1002. The spacers may be configured to allow the cover sheet 1008 to deform towards the EAL 1030. Further, the spacers may be tall enough to prevent the cover sheet from deforming enough to come into contact with the aperture layer. In this way, damage to the EAL 1030 caused by the cover sheet 1008 impacting the EAL 1030 can be avoided. In some implementations, the cover sheet 1008 is separated from the EAL by a gap of at least about 20 microns when the cover sheet 1008 is in the relaxed state. In some other implementations, the gap is between about 2 microns and about 30 microns. In this way, even if the cover sheet 1008 is caused to deform due to the contraction of the fluid contained in the display apparatus 1000 or the application of external pressure, the cover sheet 1008 will have a decreased likelihood of coming in to contact with the EAL 1030.

Figure 5B:
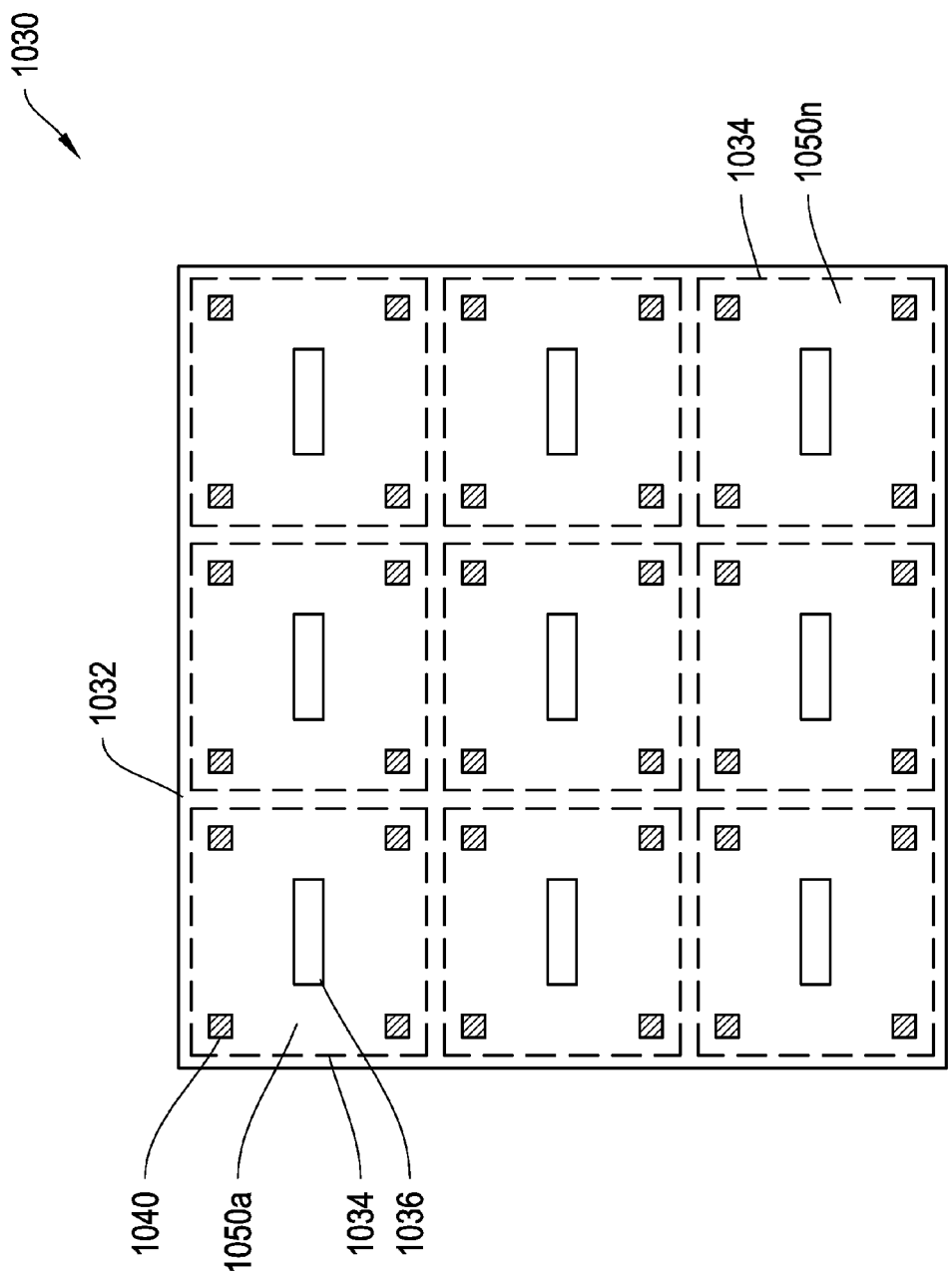
FIG. 5B shows a top view of an example portion of the EAL shown in FIG. 5A.

FIG. 5B shows a top view of an example portion of the EAL 1030 shown in FIG. 5A. FIG. 5B shows the light absorbing layer 1032 and the layer of conductive material 1034. The layer of conductive material 1034 is shown in broken lines as it is positioned below the light absorbing layer 1032. The layer of conductive material 1034 is pixilated to form a plurality of electrically isolated conductive regions 1050*a*-1050*n* (generally referred to as conductive regions 1050). Each of the conductive regions 1050 corresponds to a particular shutter assembly 1001 of the display apparatus 1000. A set of aperture layer apertures 1036 can be formed through the light absorbing layer 1032 such that each aperture layer aperture 1036 aligns with a respective rear aperture 1006 formed in the rear light blocking layer 1004. In some implementations, for example when the layer of conductive material 1034 is formed from a non-transparent material, the aperture layer apertures 1036 are formed through the light absorbing layer 1032 and through the layer of conductive material 1034. Further, each of the conductive regions 1050 is supported by four anchors 1040 at about the corners of the respective conductive region 1050. In some other implementations, the EAL 1030 can be supported by fewer or more anchors 1040 per conductive region 1050.

In some implementations, the display apparatus 1000 can include slotted shutters, such as the shutter 206 shown in FIGS. 2A and 2B In some such implementations, the EAL 1030 may include multiple aperture layer apertures for each of the slotted shutters.

In some other implementations, the EAL 1030 can be implemented using a single layer of light blocking conductive material. In such implementations, each electrically isolated conductive region 1050 can stand above its corresponding shutter assembly 1001 physically separated from its adjacent conductive regions 1050. By way of example, from a top view, the EAL 1030 may appear similar to an array of tables, with the layer of conductive material 1034 forming the table tops, and the anchors 1040 forming the legs of the respective tables.

As described above, incorporating an EAL is particularly beneficial in display apparatus that utilize control matrices similar to the control matrix 860 of FIG. 3B in which drive voltages are selectively applied to display apparatus shutters. Use of an EAL still provides a number of advantages for display apparatus that incorporate control matrices in which all shutters are maintained at a common voltage. For example, in some such implementations, the EAL need not be pixilated, and the entire EAL can be maintained at the same common voltage as the shutters.

Figure 6A:
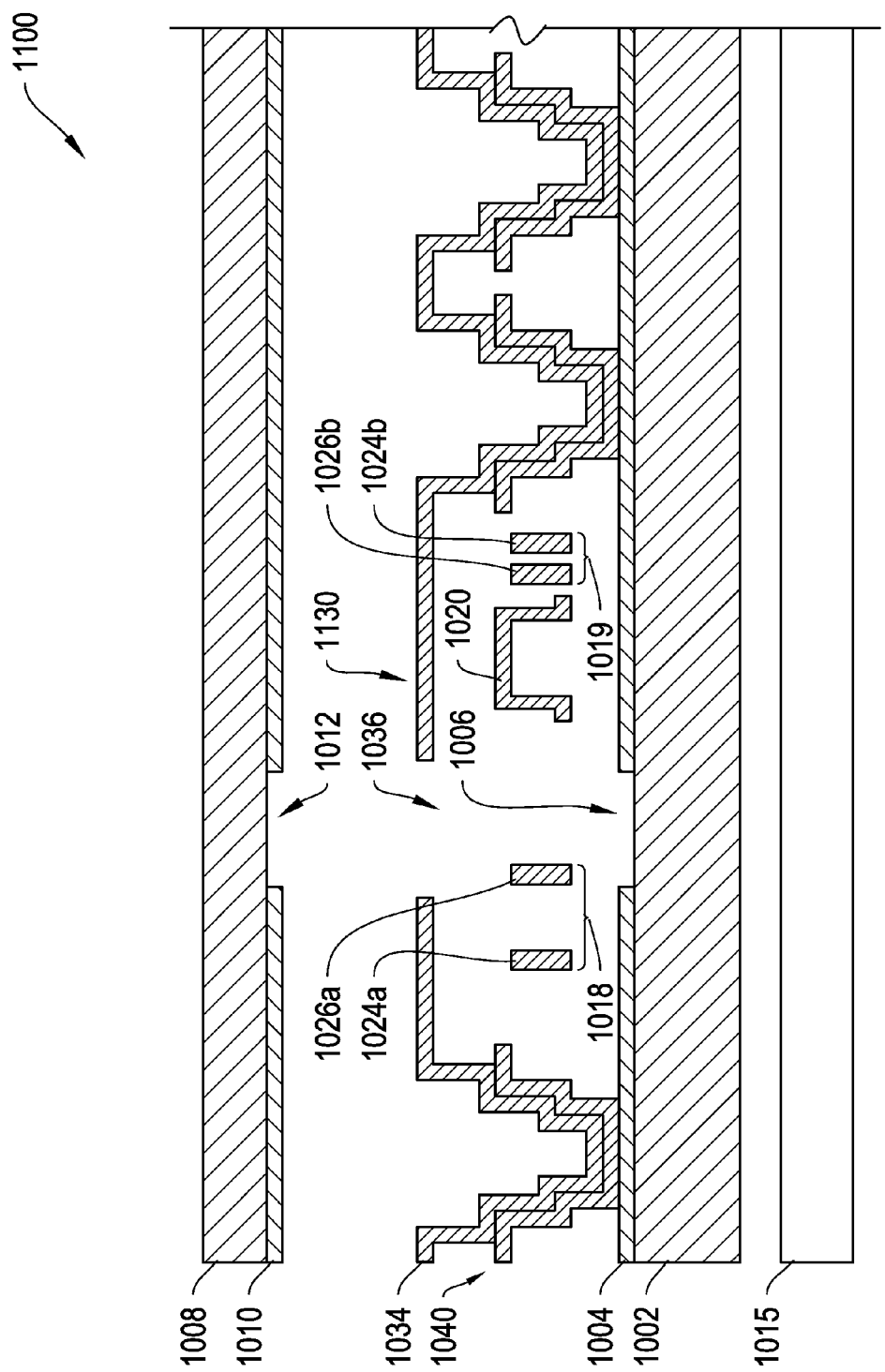
FIG. 6A shows a cross-sectional view of an example display apparatus incorporating an integrated EAL.

FIG. 6A shows a cross-sectional view of an example display apparatus 1100 incorporating an EAL 1130. The display apparatus 1100 is substantially similar to the display apparatus 1000 shown in FIG. 5A except that the EAL 1130 of the display apparatus 1100 is not pixilated to form electrically isolated conductive regions, such as the electrically isolated conductive regions 1050 shown in FIG. 5B.

The EAL 1130 defines a plurality of aperture layer apertures 1136 that correspond to underlying rear apertures 1006 formed through a light blocking layer 1004 on a transparent substrate 1002. The EAL 1130 can include a layer of light blocking material such that light from the backlight 1015 directed towards the aperture layer aperture 1136 passes through, while light that inadvertently bypasses modulation by the shutter 1020 or that rebounds off the shutter 1020 is blocked. As a result, only light that is modulated by the shutter and passes through the aperture layer apertures 1036 contributes to an image, enhancing the contrast ratio of the display apparatus 1100.

Figure 6B:
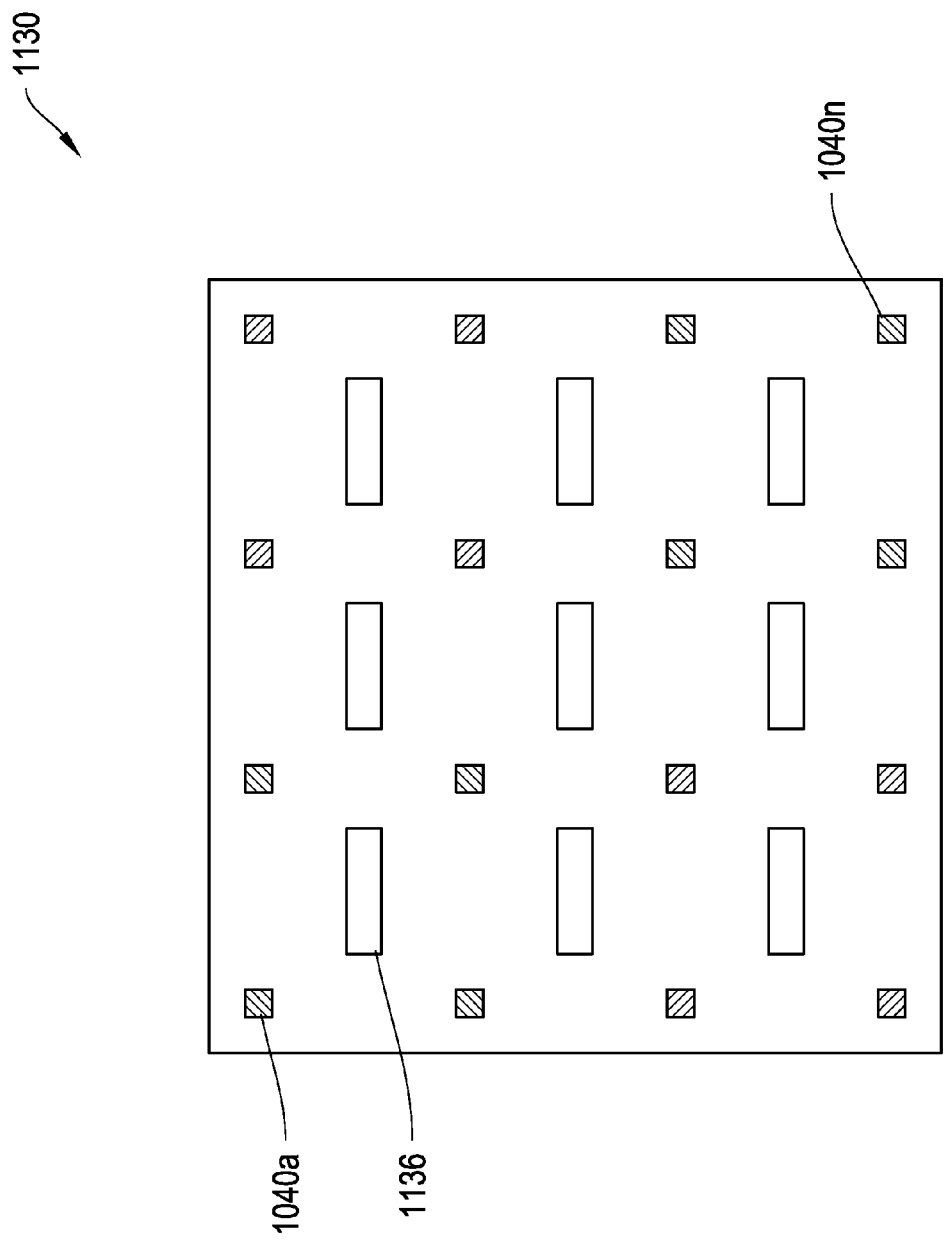
FIG. 6B shows a top view of an example portion of the EAL shown in FIG. 6A.

FIG. 6B shows a top view of an example portion of the EAL 1130 shown in FIG. 6A. As described above, the EAL 1130 is similar to the EAL 1030 shown in FIG. 5A except that the EAL 1130 is not pixelated. That is, the EAL does not include electrically isolated conductive regions.

Figure 7:
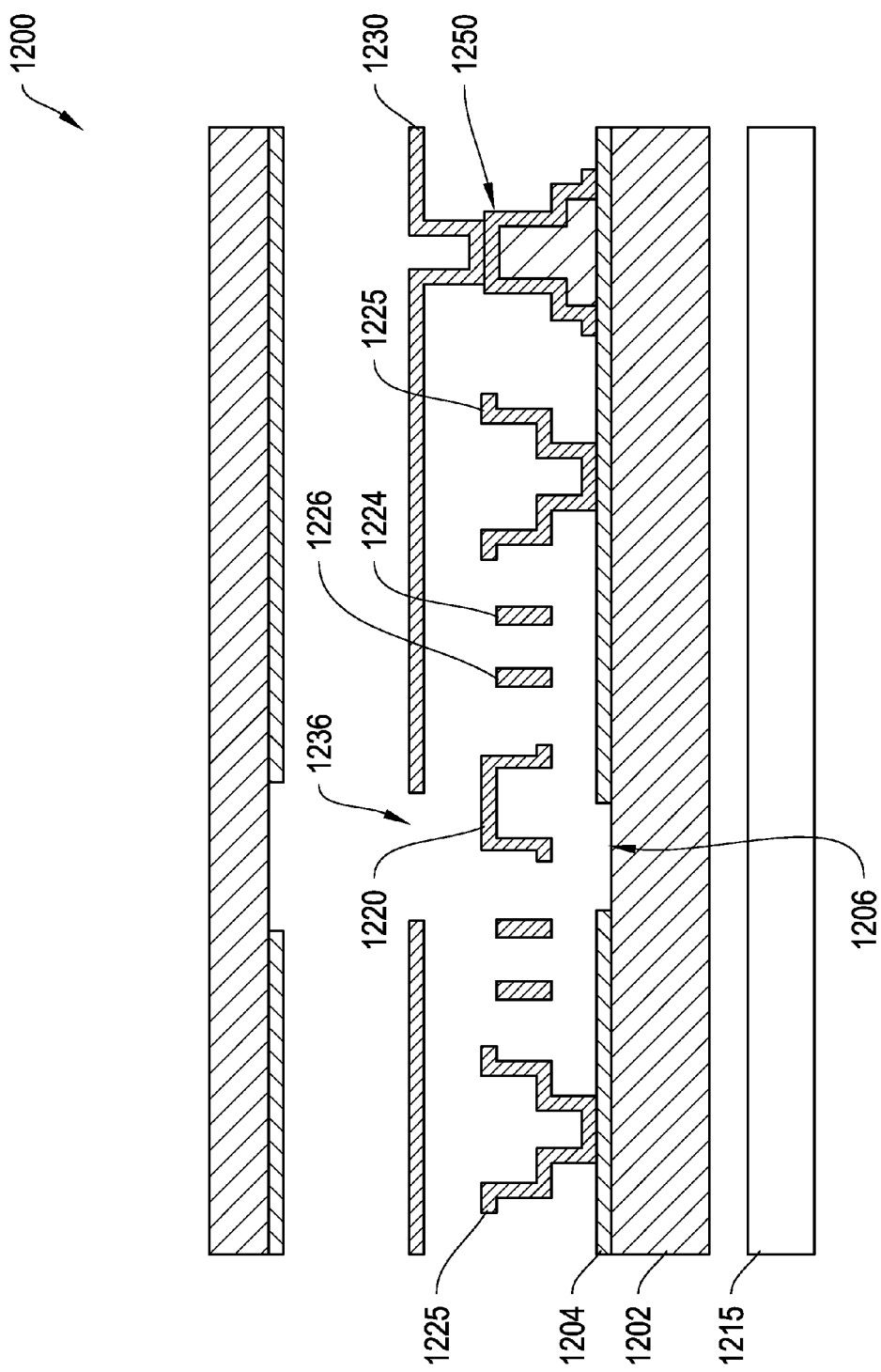
FIG. 7 shows a cross-sectional view of an example display apparatus incorporating an EAL.

FIG. 7 shows a cross-sectional view of an example display apparatus 1200 incorporating an EAL 1230. The display apparatus 1200 is substantially similar to the display apparatus 1100 shown in FIG. 6A in that the display apparatus 1200 includes an array of shutter-based display elements that includes a plurality of shutters 1220 fabricated on a transparent substrate 1202 positioned towards the rear of the display apparatus 1200. The transparent substrate 1202 is coated with a light blocking layer 1204 through which rear apertures 1206 are formed. The transparent substrate 1202 is positioned in front of a backlight 1215. Light emitted by the backlight 1215 passes through the rear apertures 1206 to be modulated by the shutters 1220.

The display apparatus 1200 also includes the EAL 1230, which is similar to the EAL 1130 shown in FIG. 6A. The EAL 1230 includes a plurality of aperture layer apertures 1236 that are formed through the EAL 1230 and correspond to respective underlying shutters 1220. The EAL 1230 is formed on the transparent substrate 1202 and supported over the transparent substrate 1202 and the shutters 1220.

The display apparatus 1200 differs from the display apparatus 1100, however, in that the EAL 1230 is supported over the transparent substrate 1202 using anchors 1250 that do not support the underlying shutter assemblies. Rather, the shutter assemblies are supported by anchors 1225 that are separate from the anchors 1250.

The display apparatus shown in FIGS. 5A, 6A, and 7 incorporate an EAL in a MEMS-up configuration. Display apparatus in the MEMS-down configuration also can incorporate a similar EAL.

Figure 8:
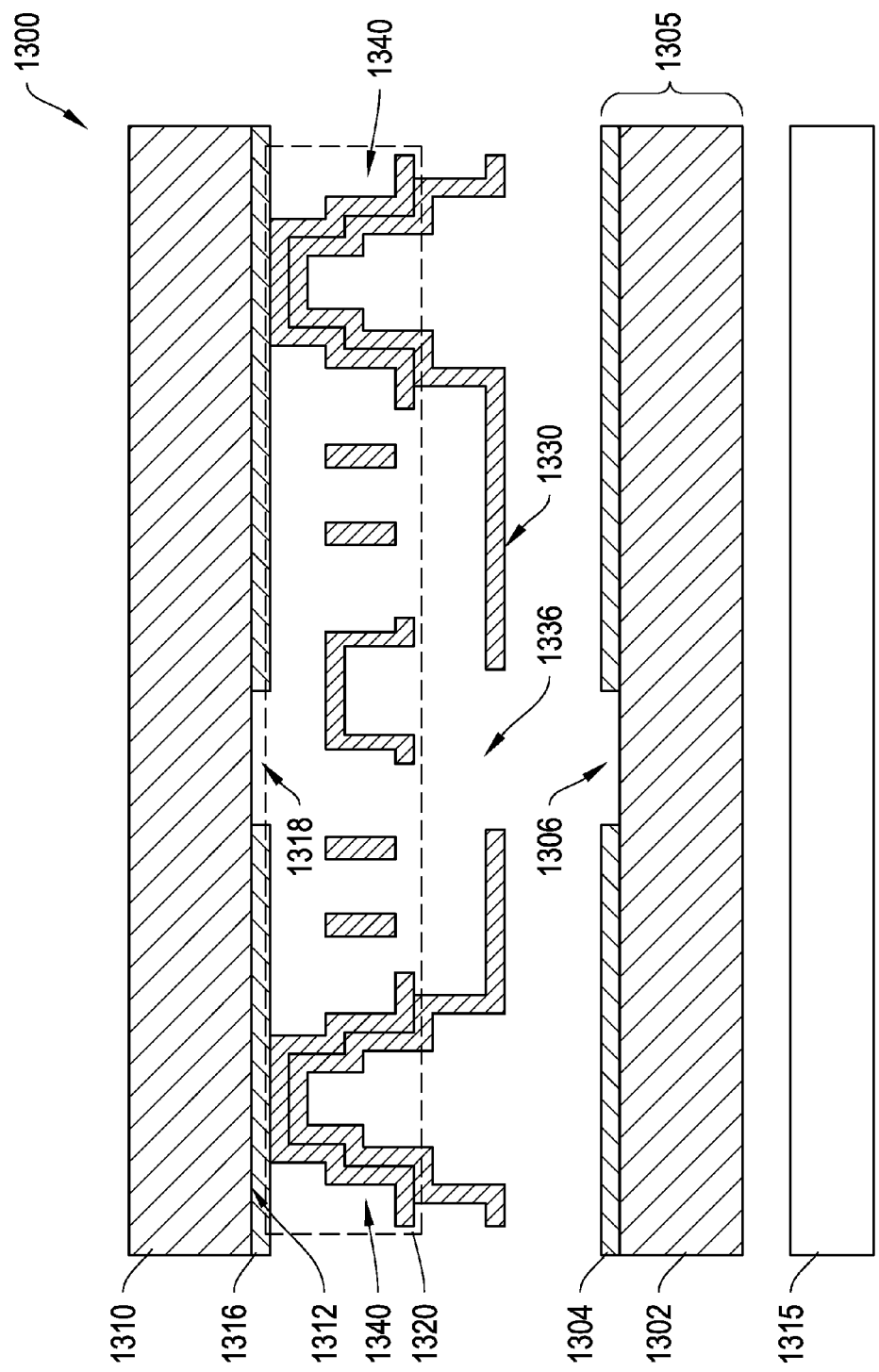
FIG. 8 shows a cross-sectional view of a portion of an example MEMS-down display apparatus.

FIG. 8 shows a cross-sectional view of a portion of an example MEMS-down display apparatus. The display apparatus 1300 includes a substrate 1302 having a reflecting aperture layer 1304 through which apertures 1306 are formed. In some implementations, a light absorbing layer is deposited on top of the reflecting aperture layer 1304. Shutter assemblies 1320 are disposed on a front substrate 1310 separate from the substrate 1302 on which the reflective aperture layer 1304 is formed. The substrate 1302 on which the reflective aperture layer 1304 is formed, defining a plurality of apertures 1306, is also referred to herein as the aperture plate. In the MEMS-down configuration, the front substrate 1310 that carries the MEMS-based shutter assemblies 1320 takes the place of the cover sheet 1008 of the display apparatus 1000 shown in FIG. 5A and is oriented such that the MEMS-based shutter assemblies 1320 are positioned on a rear surface 1312 of the front substrate 1310, that is, the surface that faces away from the viewer and toward a backlight 1315. A light blocking layer 1316 can be formed on the rear surface 1312 of the front substrate 1310. In some implementations, the light blocking layer 1316 is formed from a light absorbing, or dark, metal. In some other implementations, the light blocking layer is formed from a non-metal light absorbing material. A plurality of apertures 1318 are formed through the light blocking layer 1316.

The MEMS-based shutter assemblies 1320 are positioned directly opposite to, and across a gap from, the reflective aperture layer 1304. The shutter assemblies 1320 are supported from the front substrate 1310 by a plurality of anchors 1340.

The anchors 1340 also can be configured to support an EAL 1330. The EAL defines a plurality of aperture layer apertures 1336 that are aligned with the apertures 1318 formed through the light blocking layer 1316 and the apertures 1306 formed through the light reflecting aperture layer 1304. Similar to the EAL 1030 shown in FIG. 5A, the EAL 1330 also can be pixilated to form electrically isolated conductive regions. In some implementations, the EAL 1330, other than with respect to its position on the substrate 1319, can be structurally substantially similar to the EAL 1130 shown in FIG. 6A.

In some other implementations, the reflecting aperture layer 1304 is deposited on the rear surface of the EAL 1330 instead of on the substrate 1302. In some such implementations, the substrate 1302 can be coupled to the front substrate 1310 substantially without alignment. In some other of such implementations, for example, in some implementations in which etch holes are formed through the EAL, a reflective aperture layer may still be applied on the substrate 1302. However, this reflective aperture layer need only block light that would pass through the etch holes, and therefore can include relatively large apertures. Such large apertures would result in significant increases in the alignment tolerance between the substrates 1302 and the 1310.

Figure 9:
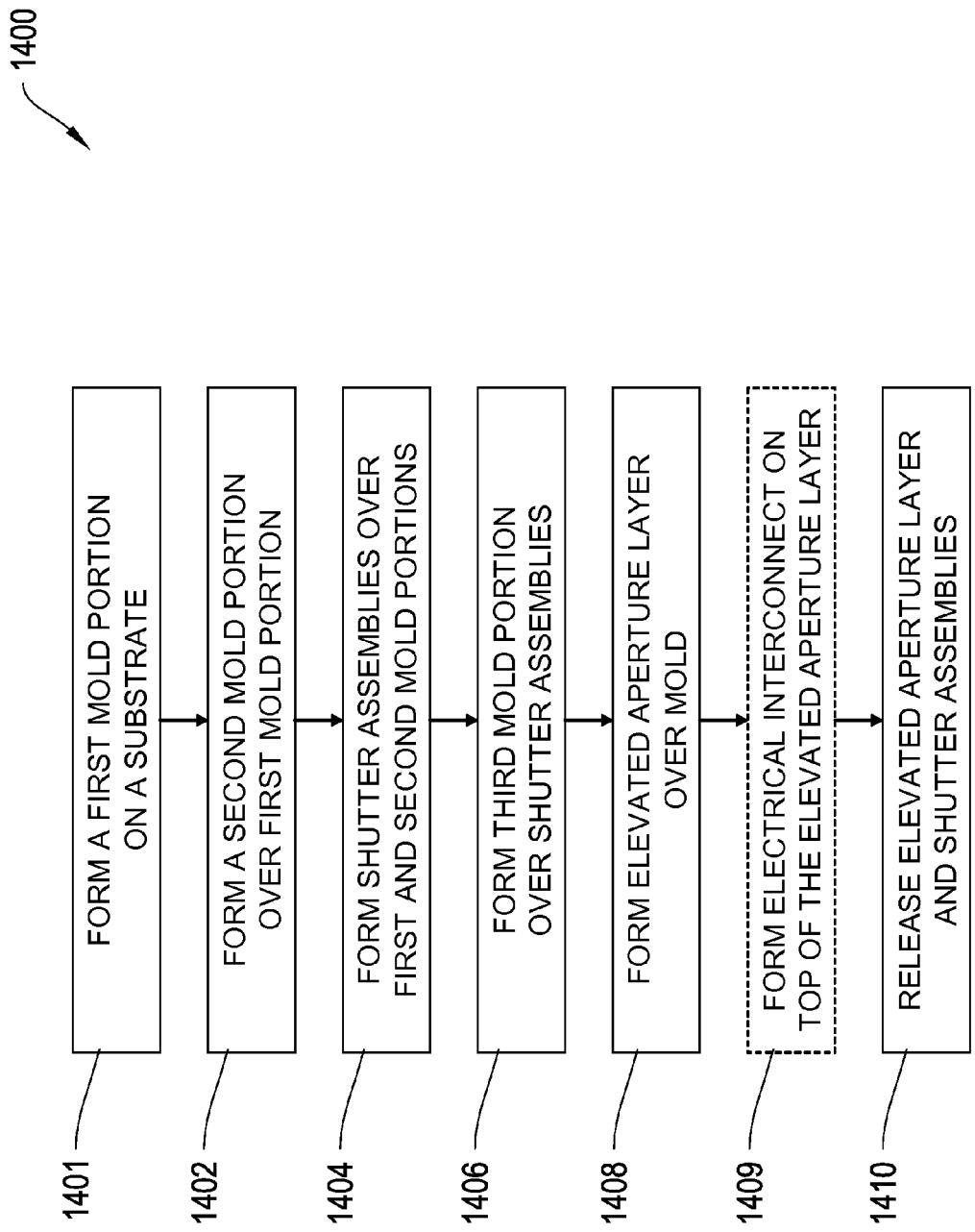
FIG. 9 shows a flow diagram of an example process for manufacturing a display apparatus.

FIG. 9 shows a flow diagram of an example process 1400 for manufacturing a display apparatus. The display apparatus can be formed on a substrate and includes an anchor that supports an EAL that is formed above a shutter assembly that is also supported by the anchor. In brief overview, the process 1400 includes forming a first mold portion on a substrate (stage 1401). A second mold portion is formed over the first mold portion (stage 1402). Shutter assemblies are then formed using the mold (stage 1404). A third mold portion is then formed over the shutter assemblies and the first and second mold portions (stage 1406), followed by the formation of an EAL (stage 1408). The shutter assemblies and the EAL are then released (stage 1410). Each of these process stages as well as further aspects of the manufacturing process 1400 are described below in relation to FIGS. 10A-10I and FIGS. 11A-11D. In some implementations, an additional processing stage is carried out between the formation of the EAL (stage 1408) and the release of the EAL and the shutter assemblies (stage 1410). More particularly, in some implementations, one or more electrical interconnects are formed on top of the EAL (stage 1409) before the release stage (stage 1410).

FIGS. 10A-10I show cross-sectional views of stages of construction of an example display apparatus according to the manufacturing process 1400 shown in FIG. 9. This process yields a display apparatus formed on a substrate and that includes an anchor that supports an integrated EAL that is formed above a shutter assembly also supported by the anchor. In the process shown in FIGS. 10A-10I, the display apparatus is formed on a mold made from a sacrificial material.

Figure 10A:
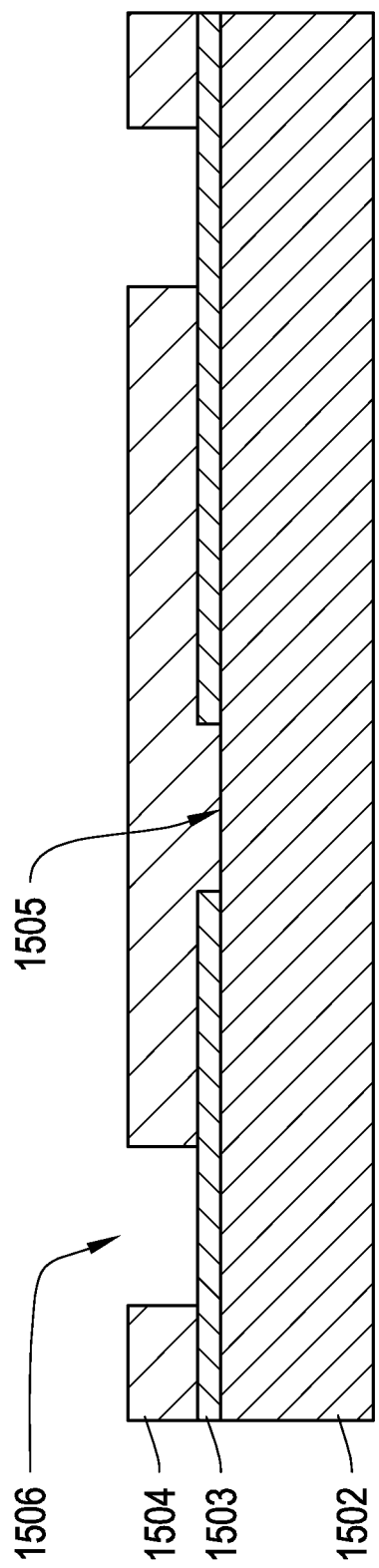
FIGS. 10A-10I show cross-sectional views of stages of construction of an example display apparatus according to the manufacturing process shown in FIG. 9.

Referring to FIGS. 9 and 10A-10I, the process 1400 for forming a display apparatus begins, as shown in FIG. 10A, with the formation of a first mold portion on top of a substrate (stage 1401). The first mold portion is formed by depositing and patterning of a first sacrificial material 1504 on top of a light blocking layer 1503 of an underlying substrate 1502. The first layer of sacrificial material 1504 can be or can include polyimide, polyamide, fluoropolymer, benzocyclobutene, polyphenylquinoxylene, parylene, polynorbornene, polyvinyl acetate, polyvinyl ethylene, and phenolic or novolac resins, or any of the other materials identified herein as suitable for use as a sacrificial material. Depending on the material selected for use as the first layer of sacrificial material 1504, the first layer of sacrificial material 1504 can be patterned using a variety of photo-lithographic techniques and processes such as by direct photo-patterning (for photosensitive sacrificial materials) or chemical or plasma etching through a mask formed from a photolithographically patterned resist.

Additional layers, including layers of material forming a display control matrix may be deposited below the light blocking layer 1503 and/or between the light blocking layer 1503 and the first sacrificial material 1504. The light blocking layer 1503 defines a plurality of rear apertures 1505. The pattern defined in the first sacrificial material 1504 creates recesses 1506 within which anchors for shutter assemblies will eventually be formed.

The process of forming the display apparatus continues with forming a second mold portion (stage 1402). The second mold portion is formed from depositing and patterning a second sacrificial material 1508 on top of the first mold portion formed from the first sacrificial material 1504. The second sacrificial material can be the same type of material as the first sacrificial material 1504.

Figure 10B:
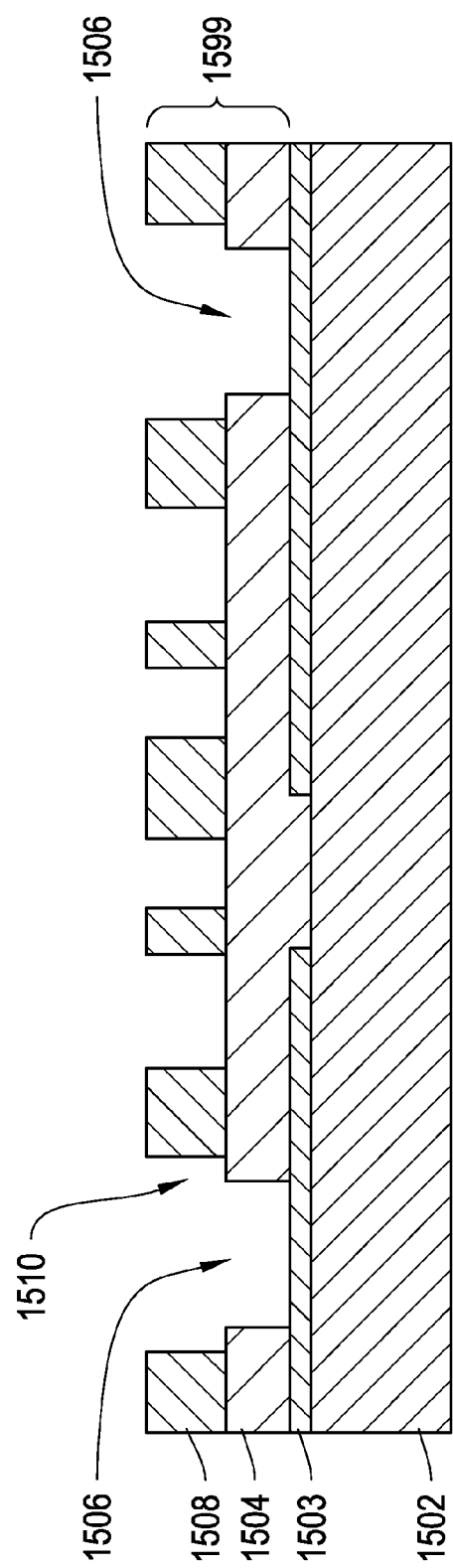

FIG. 10B shows the shape of a mold 1599, including the first and second mold portions, after the patterning of the second sacrificial material 1508. The second sacrificial material 1508 is patterned to form a recess 1510 to expose the recess 1506 formed in the first sacrificial material 1504. The recess 1510 is wider than the recess 1506 such that a step like structure is formed in the mold 1599. The mold 1599 also includes the first sacrificial material 1504 with its previously defined recesses 1506.

Figure 10C:
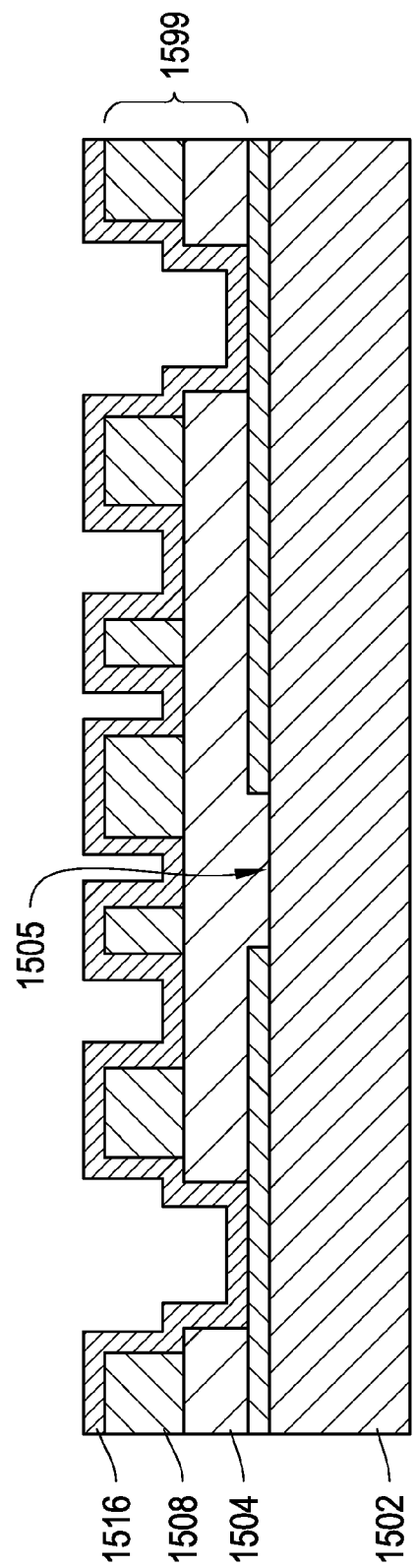
Figure 10D:
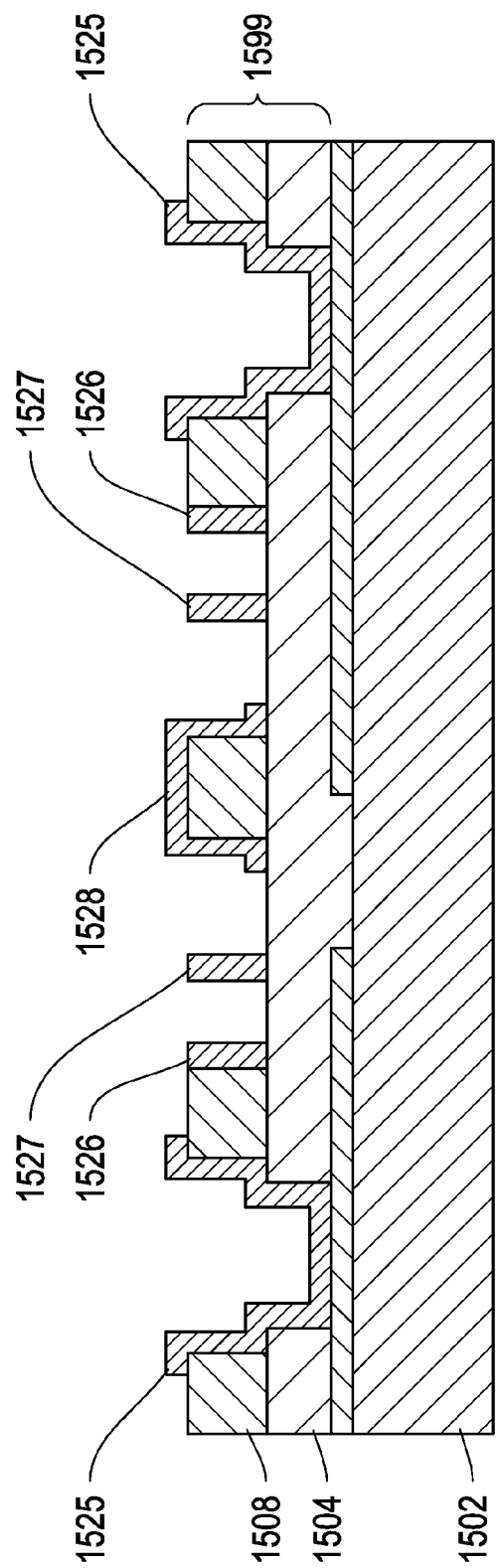

The process of forming the display apparatus continues with the formation of shutter assemblies using the mold (stage 1404), as shown in FIGS. 10C and 10D. The shutter assemblies are formed by depositing structural materials 1516 onto the exposed surfaces of the mold 1599, as shown in FIG. 10C, followed by patterning the structural material 1516, resulting in structure shown in FIG. 10D. The structural material 1516 can include one or more layers including mechanical as well conductive layers. Suitable structural materials 1516 include metals such as Al, Cu, Ni, Cr, Mo, Ti, Ta, Nb, Nd, or alloys thereof; dielectric materials such as aluminum oxide ($Al_2O_3$), silicon oxide ($SiO_2$), tantalum pentoxide ($Ta_2O_5$), or silicon nitride ($Si_3N_4$); or semiconducting materials such as diamond-like carbon, Si, Ge, GaAs, CdTe or alloys thereof. In some implementations, the structural material 1516 includes a stack of materials. For example, a layer of conductive structural material may be deposited between two non-conductive layers. In some implementations, a non-conductive layer is deposited between two conductive layers. In some implementations, such a "sandwich" structure helps to ensure that stresses remaining after deposition and/or stresses that are imposed by temperature variations will not cause bending, warping or other deformation of the structural material 1516. The structural material 1516 is deposited to a thickness of less than about 2 microns. In some implementations, the structural material 1516 is deposited to have a thickness of less than about 1.5 microns.

After deposition, the structural material 1516 (which may be a composite of several materials as described above) is patterned, as shown in FIG. 10D. First, a photoresist mask is deposited on the structural material 1516. The photoresist is then patterned. The pattern developed into the photoresist is designed such that structural material 1516, after a subsequent etch stage, remains to form a shutter 1528, anchors 1525, and drive and load beams 1526 and 1527 of two opposing actuators. The etch of the structural material 1516 can be an anisotropic etch and can carried out in a plasma atmosphere with a voltage bias applied to the substrate, or to an electrode in proximity to the substrate.

Figure 10E:
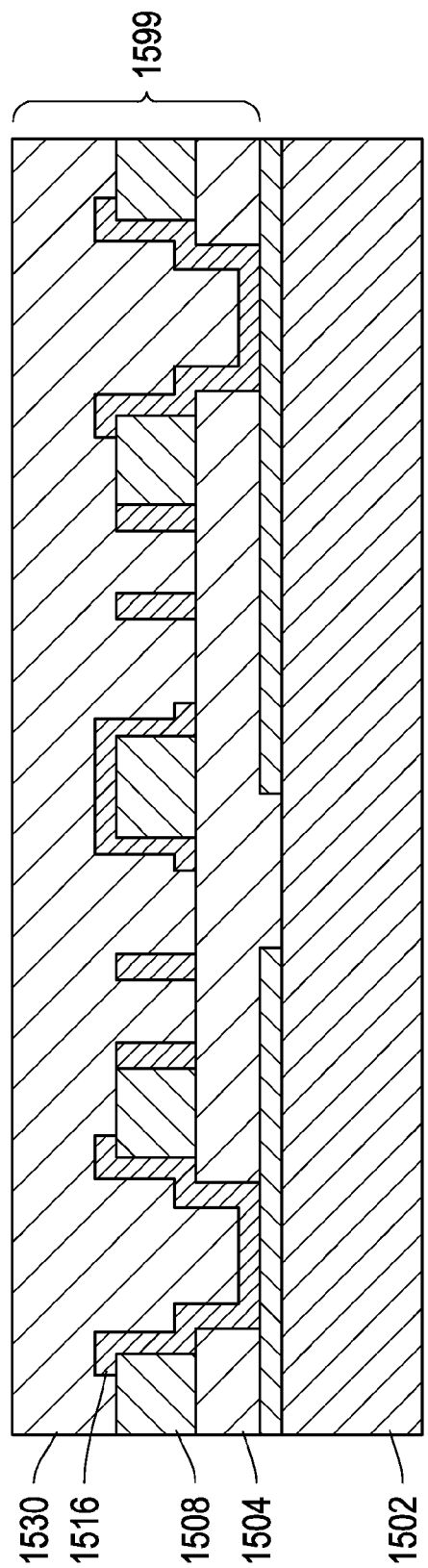
Figure 10F:
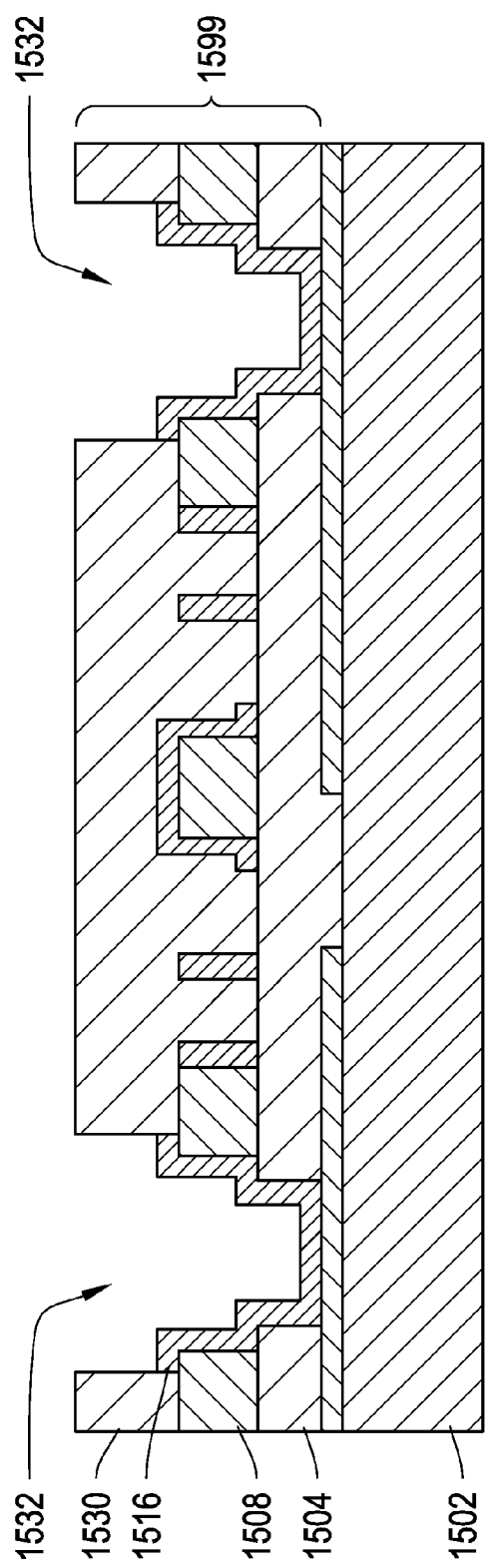

Once the shutter assemblies of the display apparatus are formed, the manufacturing process continues with fabricating the EAL of the display. The process of forming the EAL begins with the formation of a third mold portion on top of the shutter assemblies (stage 1406). The third mold portion is formed from a third sacrificial material layer 1530. FIG. 10E shows the shape of the mold 1599 (including the first, second, and third mold portions) that is created after depositing the third sacrificial material layer 1530. FIG. 10F shows the shape of the mold 1599 that is created after patterning the third sacrificial material layer 1530. In particular, the mold 1599 shown in FIG. 10F includes recesses 1532 where a portion of the anchor will be formed for supporting the EAL over the underlying shutter assemblies. The third sacrificial material layer 1530 can be or include any of the sacrificial materials disclosed herein.

Figure 10G:
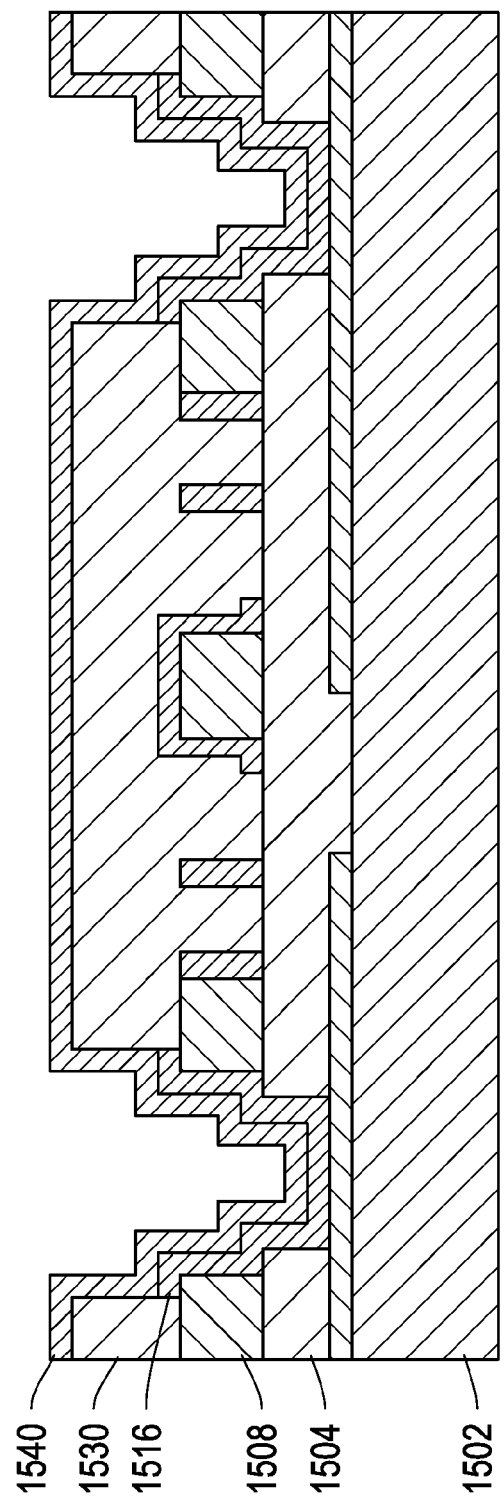

The EAL is then formed, as shown in FIG. 10G (stage 1408). First one or more layers of aperture layer material 1540 are deposited on the mold 1599. In some implementations, the aperture layer material can be or can include one or more layers of a conductive material, such as a metal or conductive oxide, or a semiconductor. In some implementations, the aperture layer can be made of or include a polymer that is non-conductive. Some examples of suitable materials were provided above with respect to FIG. 5A.

Figure 10H:
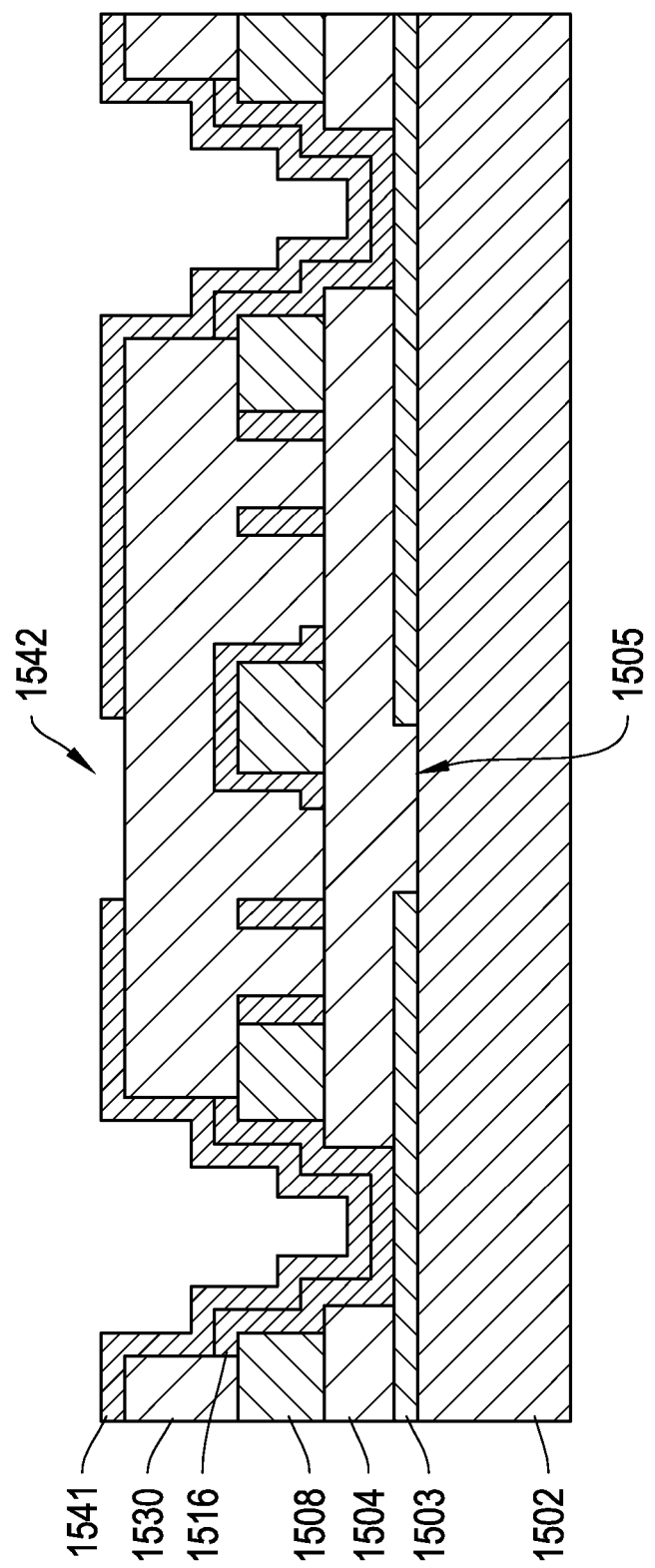
Figure 10I:
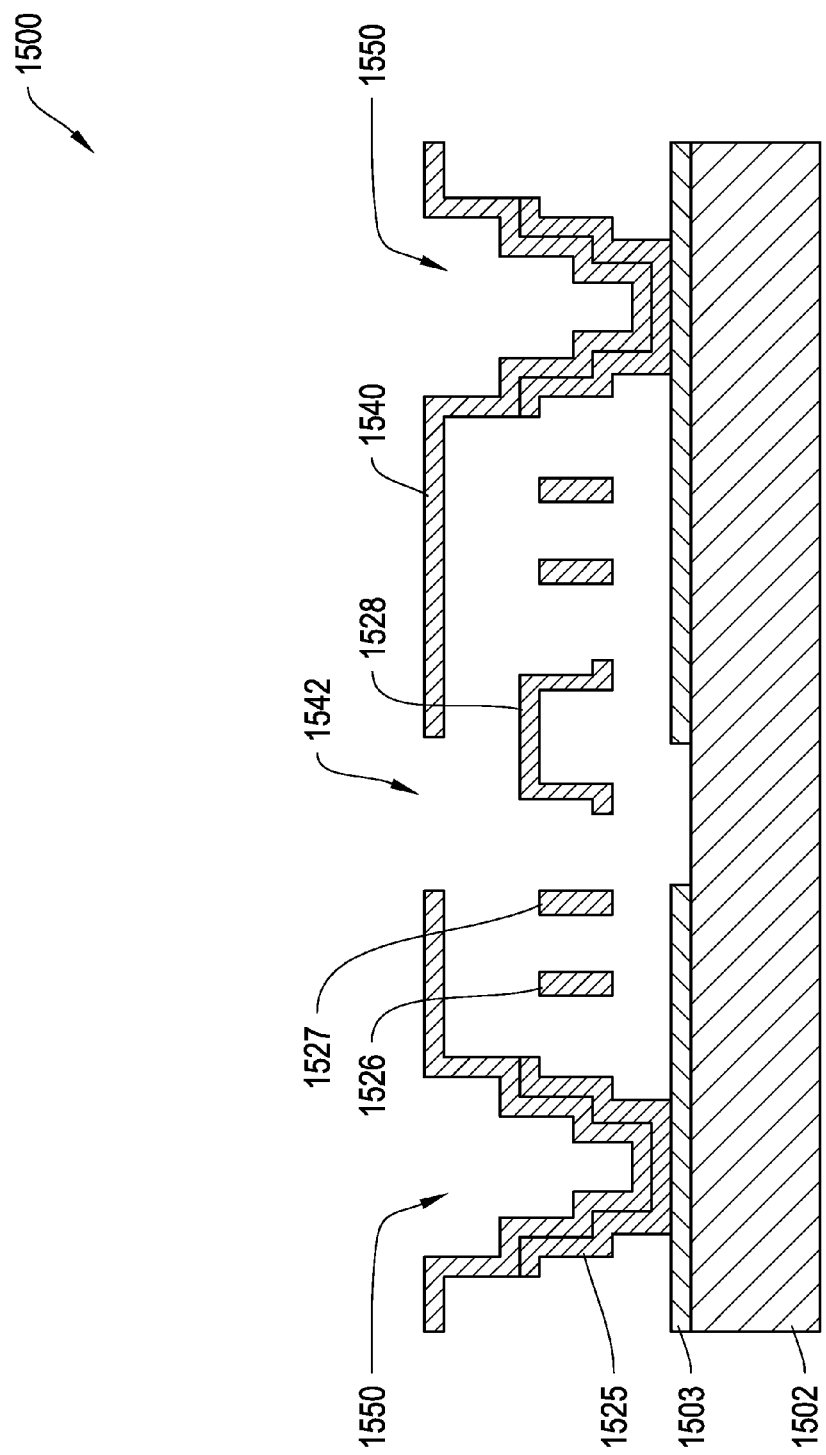

Stage 1408 continues with etching the deposited aperture layer material 1540 (shown in FIG. 10G), resulting in an EAL 1541, as shown in FIG. 10H. The etch of the aperture layer material 1540 can be an anisotropic etch and can be carried out in a plasma atmosphere with a voltage bias applied to the substrate, or to an electrode in proximity to the substrate. In some implementations, the application of the anisotropic etch is performed in a manner similar to the anisotropic etch described with respect to FIG. 10D. In some other implementations, depending on the type of material used to form the aperture layer, the aperture layer may be patterned and etched using other techniques. Upon applying the etch, an aperture layer aperture 1542 is formed in a portion of the EAL 1541 aligned with an aperture 1505 formed through the light blocking layer 1503.

The process of forming the display apparatus 1500 is completed with the removal of the mold 1599 (stage 1410). The result, shown in FIG. 10I, includes anchors 1525 that support the EAL 1541 over the underlying shutter assemblies that include shutters 1528 also supported by the anchors 1525. The anchors 1525 are formed from portions of the layers of structural material 1516 and aperture layer material 1540 left behind after the above-described patterning stages.

In some implementations, the mold is removed using standard MEMS release methodologies, including, for example, exposing the mold to an oxygen plasma, wet chemical etching, or vapor phase etching. However, as the number of sacrificial layers used to form the mold increase to create an EAL, the removal of the sacrificial materials can become a challenge, since a large volume of material may need to be removed. Moreover, the addition of the EAL substantially obstructs direct access to the material by a release agent. As a result, the release process can take longer. While most, if not all, of the structural materials selected for use in a final display assembly are selected to be resistant to the release agent, prolonged exposure to such an agent may still cause damage to various materials. Accordingly, in some other implementations, a variety of alternative release techniques may be employed, some of which are further described below.

In some implementations, the challenge of removing sacrificial materials is addressed by forming etch holes through the EAL. Etch holes increase the access a release agent has to the underlying sacrificial material. The etch holes can be formed in an area that lies outside the light blocking region of the EAL. In some implementations, the size of the etch holes is sufficiently large to allow a fluid (such as a liquid, gas, or plasma) etchant to remove the sacrificial material that forms the mold, while remaining sufficiently small that it does not adversely affect optical performance.

In some other implementations, a sacrificial material is used that is capable of decomposing by sublimating from solid to gas, without requiring the use of a chemical etchant. In some such implementations, the sacrificial material can sublimate by baking a portion of the display apparatus that is formed using a mold. In some implementations, the sacrificial material can be composed of or include norbornene or a norbornene derivative. In some such implementations employing norbornene or a norbornene derivatives in the sacrificial mold, the portion of the display apparatus that includes the shutter assemblies, the EAL and their supporting mold can be baked at temperatures in a range of about 400° C. for about 1 hours. In some other implementations, the sacrificial material can be composed of or can include any other sacrificial material that sublimates at temperatures below about 500° C., such as polycarbonates, which can decompose at temperatures between about 200-300° C. (or lower temperatures in the presence of an acid.

In some other implementations, a multi-phase release process is employed. For example, in some such implementations, the multi-phase release process includes a liquid etch followed by a dry plasma etch. In general, even though the structural and electrical components of the display apparatus are selected to be resistant to the etching agents used to effectuate the release process, prolonged exposure to certain etchants, particularly, dry plasma etchants, can still damage such components. Thus, it is desirable to limit the time the display apparatus is exposed to a dry plasma etch. Liquid etchants, however, tend to be less effective at fully releasing a display apparatus. Employing a multi-phase release process effectively addresses both concerns. First, a liquid etch removes portions of the mold directly accessible through the aperture layer apertures and any etch holes formed in the EAL, creating cavities under the EAL in the mold material. Thereafter, a dry plasma etch is applied. The initial formation of the cavities increases the surface area the dry plasma etch can interact with, expediting the release process, thereby limiting the amount of time the display apparatus is exposed to the plasma.

As described herein, the manufacturing process 1400 is carried out in conjunction with the formation of shutter-based light modulators. In some other implementations, the process for manufacturing an EAL can be carried out with the formation of other types of display elements, including light emitters, such as OLEDs, or other light modulators.

Figure 11A:
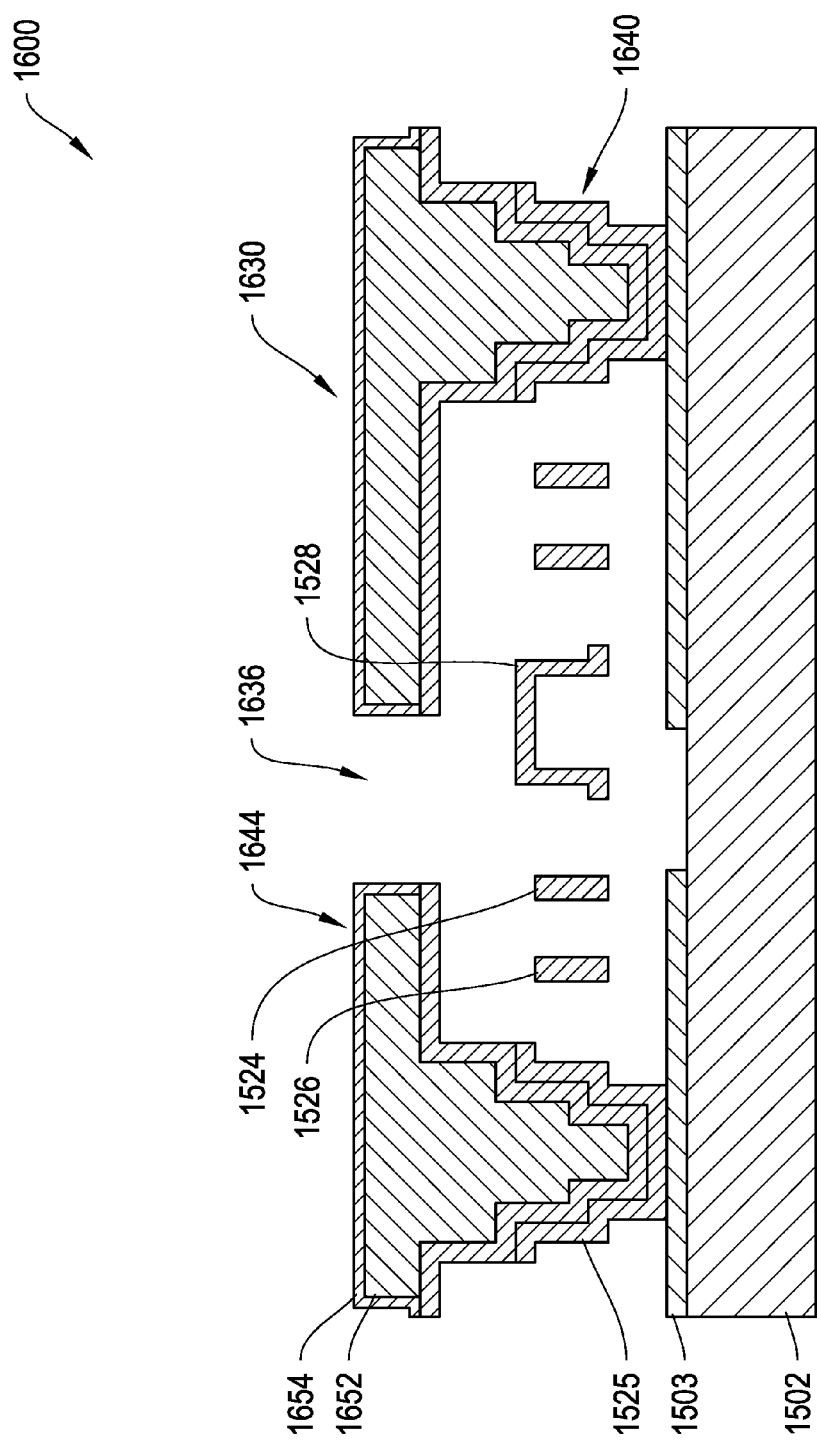
FIG. 11A shows a cross-sectional view of an example display apparatus incorporating an encapsulated EAL.

FIG. 11A shows a cross-sectional view of an example display apparatus 1600 incorporating an encapsulated EAL. The display apparatus 1600 is substantially similar to the display apparatus 1500 shown in FIG. 10I in that the display apparatus 1600 also includes a display apparatus that includes anchors 1640 supporting an EAL 1630 over underlying shutters 1528, which are also supported by the anchors 1640. However, the display apparatus 1600 differs from the display apparatus 1500 shown in FIG. 10I in that the EAL 1630 includes a layer of polymer material 1652 that is encapsulated by structural material 1656. In some implementations, the structural material 1656 may be metal. By encapsulating the polymer material 1652 with structural material 1656, the EAL 1630 is structurally resilient to external forces. As such, the EAL 1630 can serve as a barrier to protect underlying shutter assemblies. Such additional resilience may be particularly desirable in products that suffer increased levels of abuse, such as devices geared for children, the construction industry, and the military, or other users of ruggedized equipment.

Figure 11B:
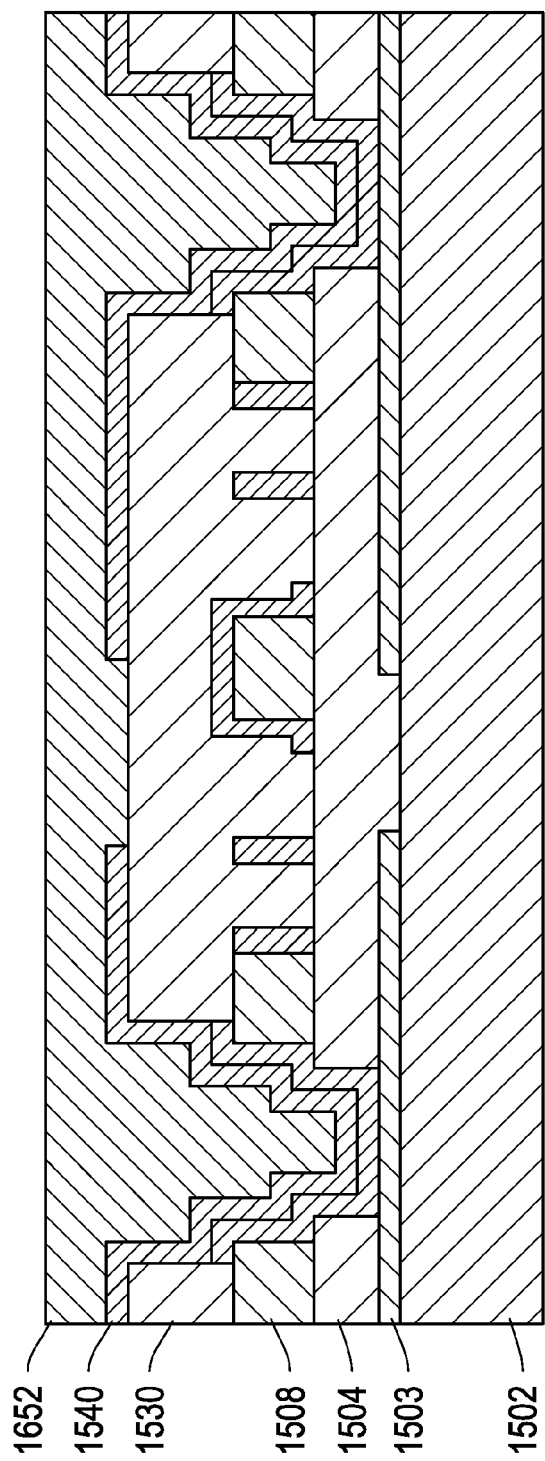
FIGS. 11B-11D show cross-sectional views of stages of construction of the example display apparatus shown in FIG. 11A.
Figure 11C:
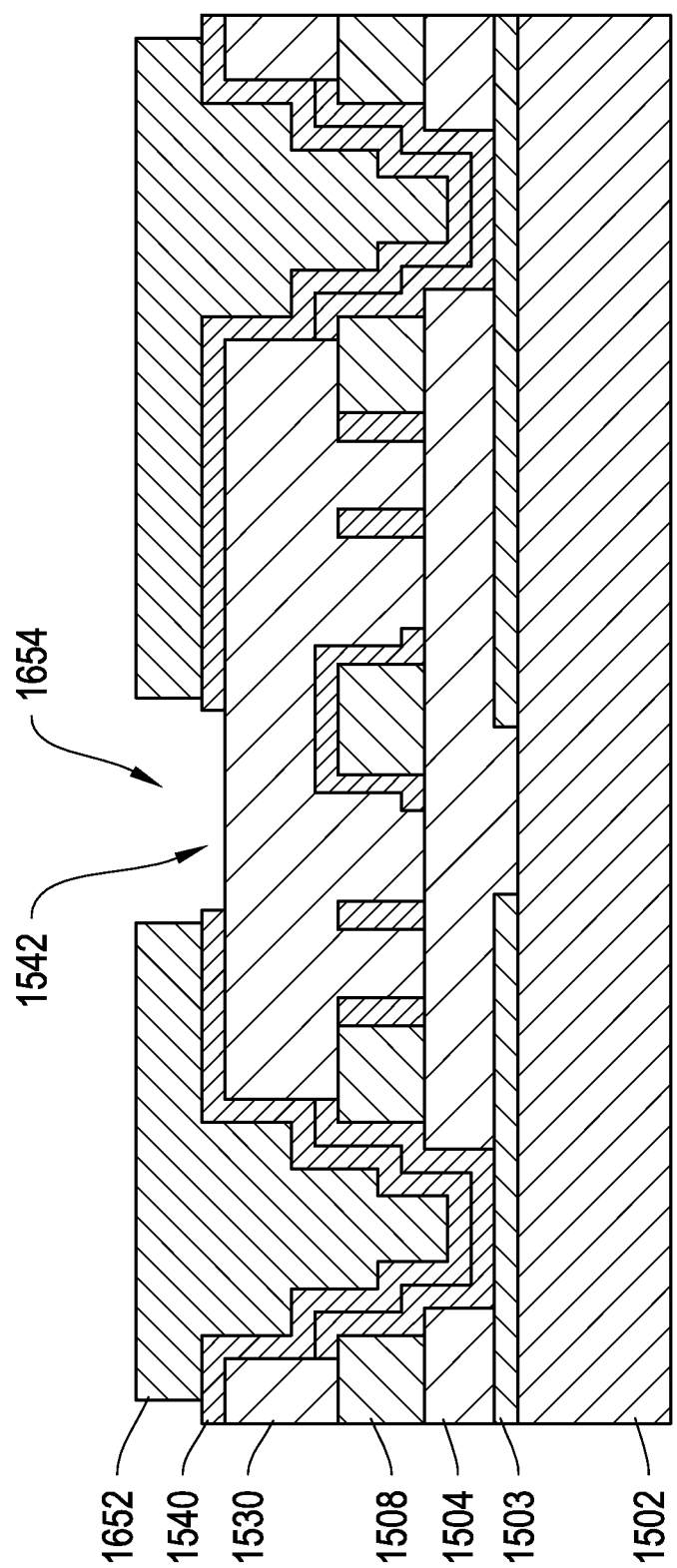
Figure 11D:
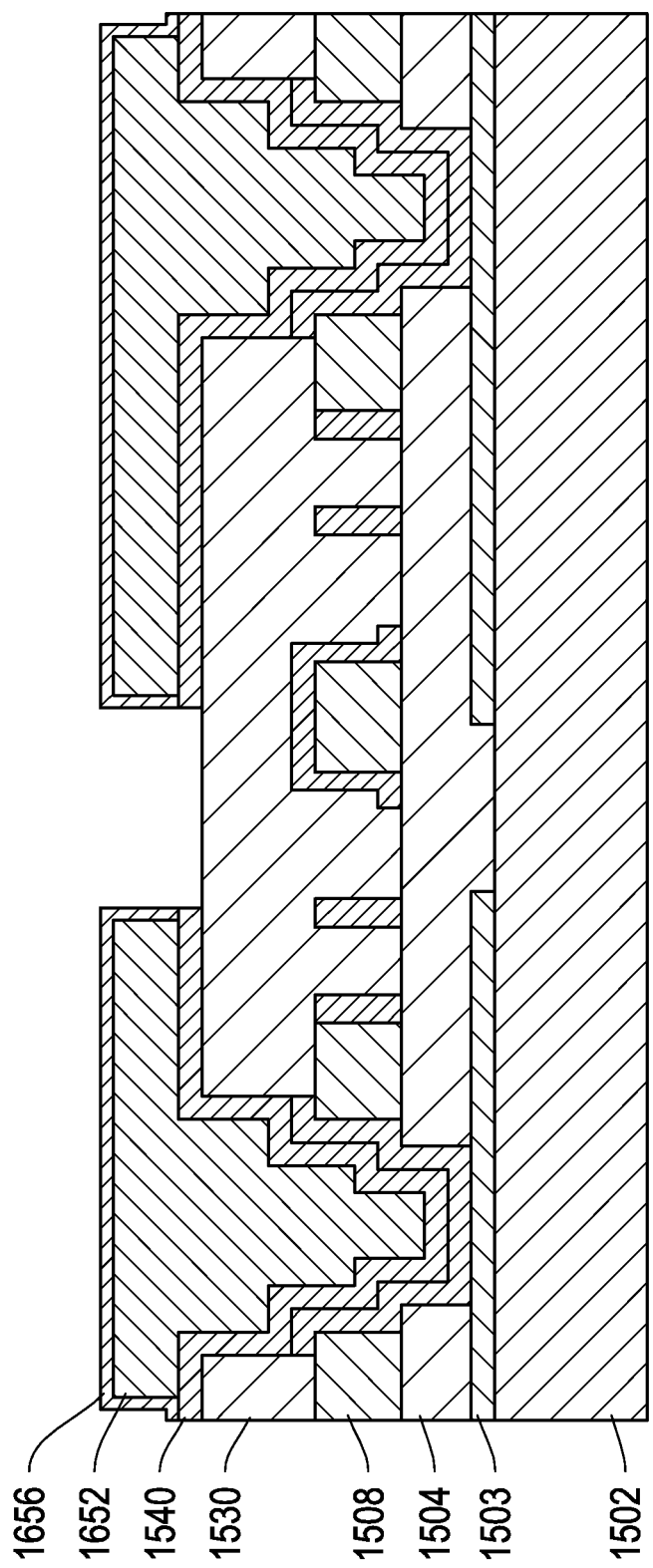

FIGS. 11B-11D show cross-sectional views of stages of construction of the example display apparatus 1600 shown in FIG. 11A. The manufacturing process used to form the display apparatus 1600 incorporating an encapsulated EAL begins with forming a shutter assembly and the EAL in a manner similar to that described above with respect to FIGS. 9 and 10A-10I. After depositing and patterning the aperture layer material 1540 as described above with respect to stage 1408 of the process 1400, shown in FIG. 9 and FIGS. 10G and 10H, the process of forming the encapsulated EAL continues with the deposition of a polymer material 1652 on top of the EAL 1541, as shown in FIG. 11B. The deposited polymer material 1652 is then patterned to form an opening 1654 aligned with the aperture 1542 formed in the aperture layer material 1540. The opening 1654 is made wide enough to expose a portion of the underlying aperture layer material 1540 surrounding aperture 1542. The result of this process stage is shown in FIG. 11C.

The process of forming the EAL continues with the deposition and patterning of a second layer of aperture layer material 1656 on top of the patterned polymer material 1652, as shown in FIG. 11D. The second layer of aperture layer material 1656 can be the same material as the first aperture layer material 1540, or it can be some other structural material suitable for encapsulating the polymer material 1652. In some implementations, the second layer of aperture layer material 1656 can be patterned by applying an anisotropic etch. As shown in FIG. 11D, the polymer material 1652 remains encapsulated by the second layer of aperture layer material 1656.

The process of forming the EAL and the shutter assembly is completed with the removal of the remainder of the mold formed from the first, second, and third layers of sacrificial material 1504, 1508, and 1530. The result is shown in FIG. 11A. The process of removing sacrificial material is similar to that described above with respect to FIG. 10I. The anchors 1640 support the shutter assembly over the underlying substrate 1502 and support the encapsulated aperture layer 1630 over the underlying shutter assembly.

Added EAL resilience can alternatively be obtained by introducing stiffening ribs into the surface of the EAL. The inclusion of stiffening ribs in the EAL can be in addition to, or instead of the EAL utilizing the encapsulation of a polymer layer.

Figure 12A:
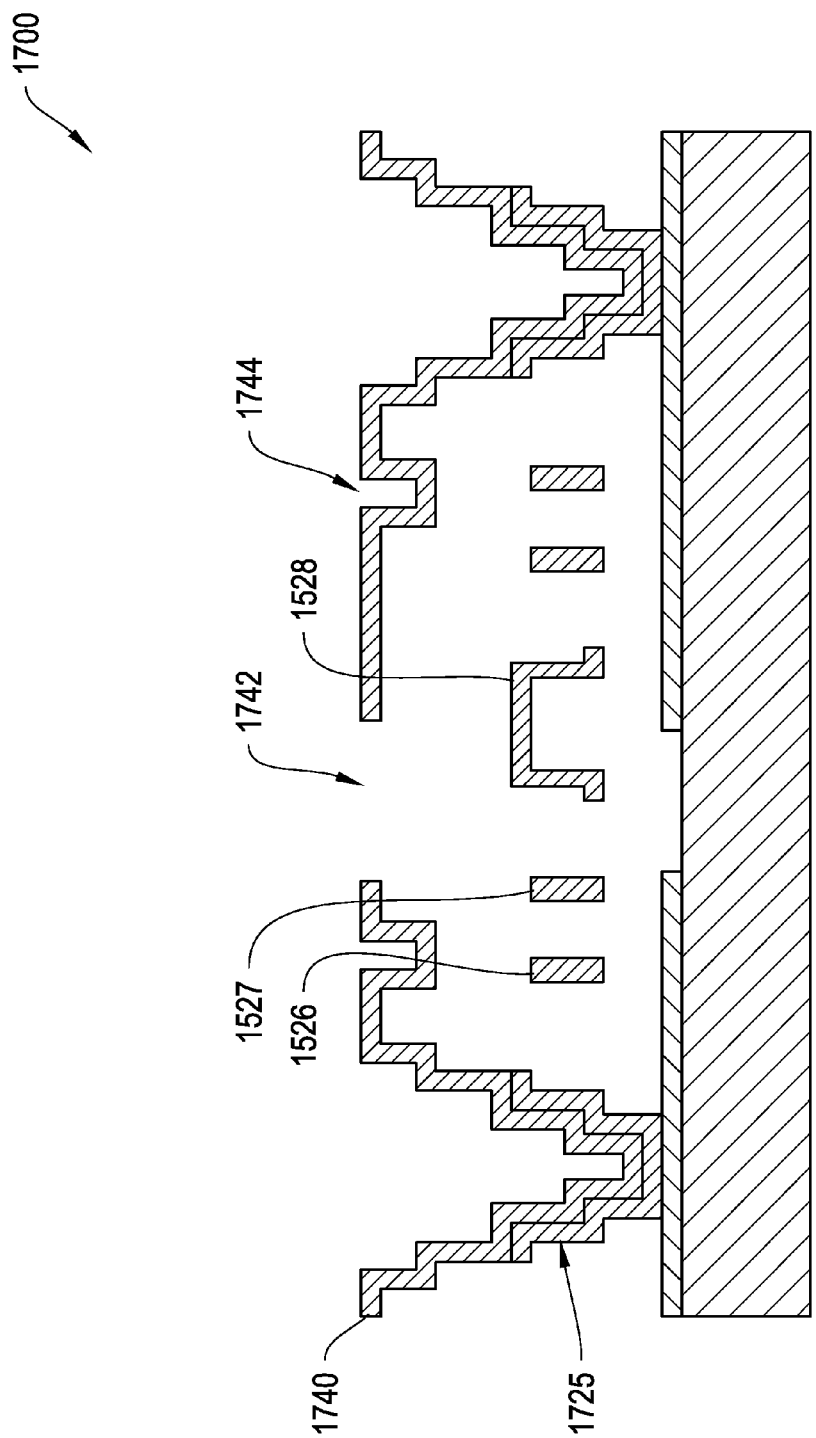
FIG. 12A shows a cross-sectional view of an example display apparatus incorporating a ribbed EAL.

FIG. 12A shows a cross-sectional view of an example display apparatus 1700 incorporating a ribbed EAL 1740. The display apparatus 1700 is similar to the display apparatus 1500 shown in FIG. 10I in that the display apparatus 1700 also includes an EAL 1740 that is supported over a substrate 1702 and underlying shutters 1528 by a plurality of anchors 1725. However, the display apparatus 1700 differs from the display apparatus 1500 in that the EAL 1740 includes ribs 1744 for strengthening the EAL 1740. By forming ribs within the EAL 1740, the EAL 1740 can become more structurally resilient to external forces. As such, the EAL 1740 can serve as a barrier to protect the display element, including the shutters 1528.

Figure 12B:
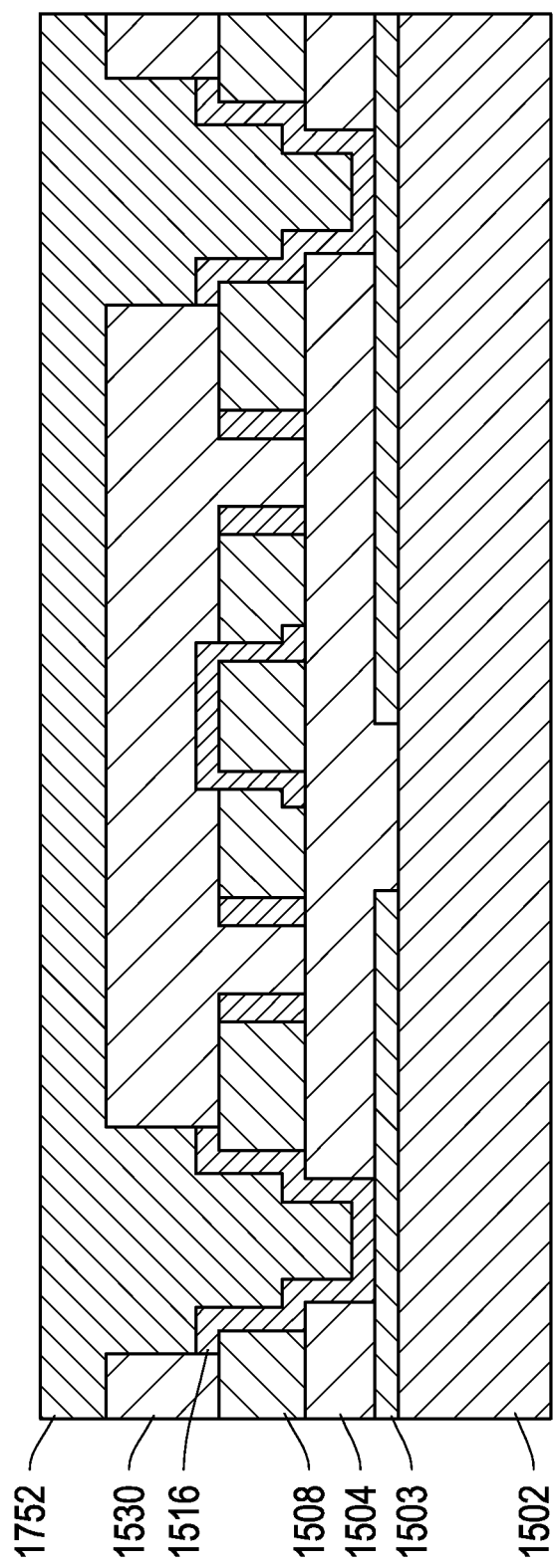
FIGS. 12B-12E show cross-sectional views of stages of construction of the example display apparatus shown in FIG. 12A.
Figure 12C:
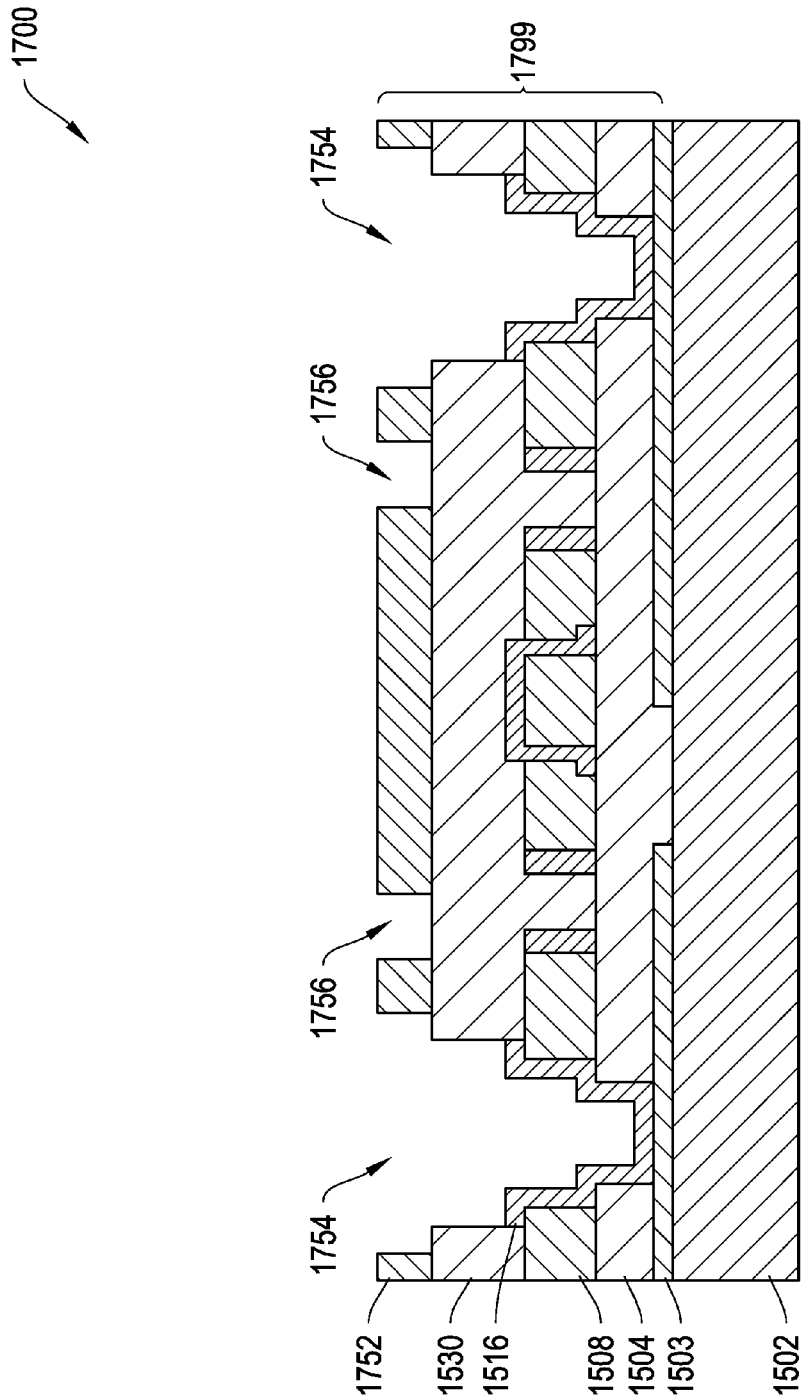
Figure 12D:
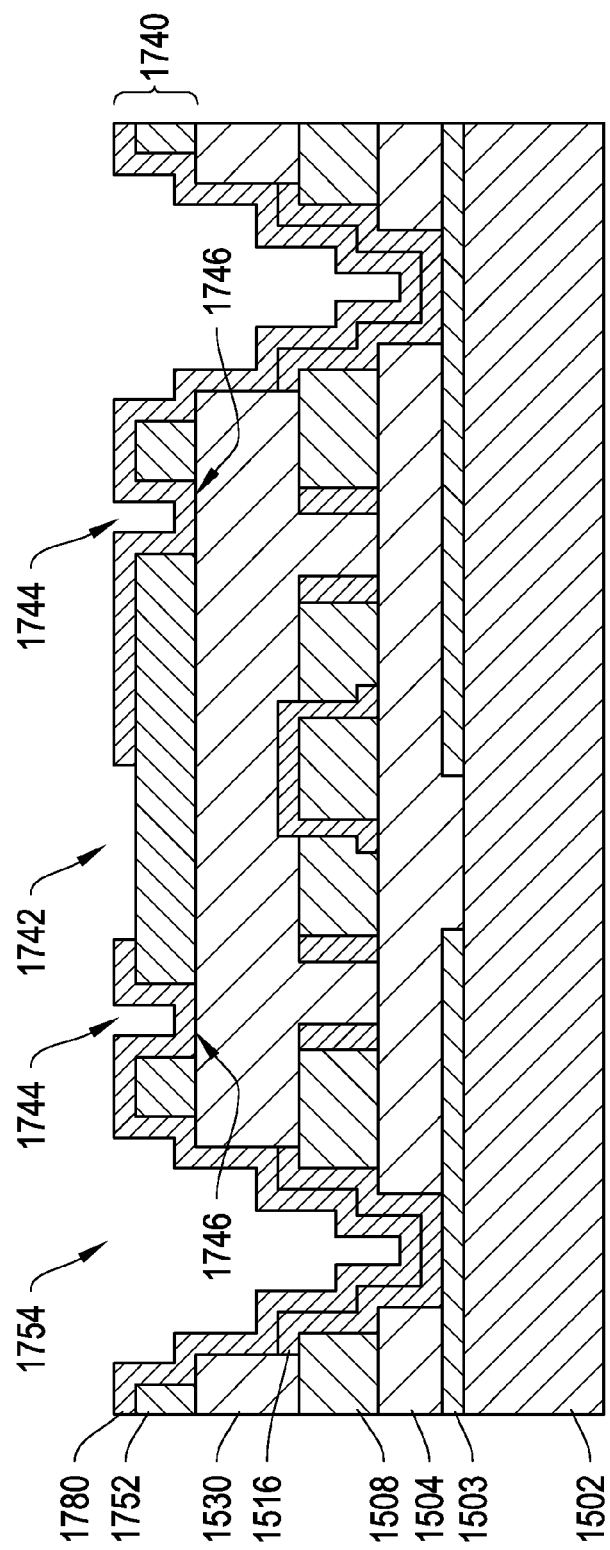

FIGS. 12B-12D show cross-sectional views of stages of construction of the example display apparatus 1700 shown in FIG. 12A. The display apparatus 1700 includes anchors 1725 for supporting a ribbed EAL 1740 over a plurality of shutters 1528 that are also supported by the anchors 1725. The manufacturing process used to form such a display apparatus begins with forming a shutter assembly and an EAL in a manner similar to that described above with respect to FIGS. 10A-10I. After depositing and patterning the third sacrificial material layer 1530 as described above with respect to FIG. 10G, however, the process of forming the ribbed EAL 1740 continues with the deposition of a fourth sacrificial layer 1752 as shown in FIG. 12B. The fourth sacrificial layer 1752 is then patterned to form a plurality of recesses 1756 for forming the ribs that will eventually be formed in the elevated aperture. The shape of a mold 1799 that is created after patterning of the fourth sacrificial layer 1752 is shown in FIG. 12C. The mold 1799 includes the first sacrificial material 1504, the second sacrificial material 1508, the patterned layer of structural material 1516, the third sacrificial material layer 1530 and the fourth sacrificial layer 1752.

The process of forming the ribbed EAL 1740 continues with the deposition of a layer of aperture layer material 1780 onto all of the exposed surfaces of the mold 1799. Upon depositing the layer of aperture layer material 1780, the layer of aperture layer material 1780 is patterned to form openings that serves as the aperture layer apertures (or "EAL apertures") 1742, as shown in FIG. 12D.

The process of forming the display apparatus that includes the ribbed EAL 1740 is completed with the removal of the remainder of the mold 1799, i.e., the remainder of the first, second, third, and fourth layers of sacrificial material 1504, 1508, 1530, and 1752. The process of removing the mold 1799 is similar to that described with respect to FIG. 10I. The resulting display apparatus 1700 is shown in FIG. 12A.

Figure 12E:
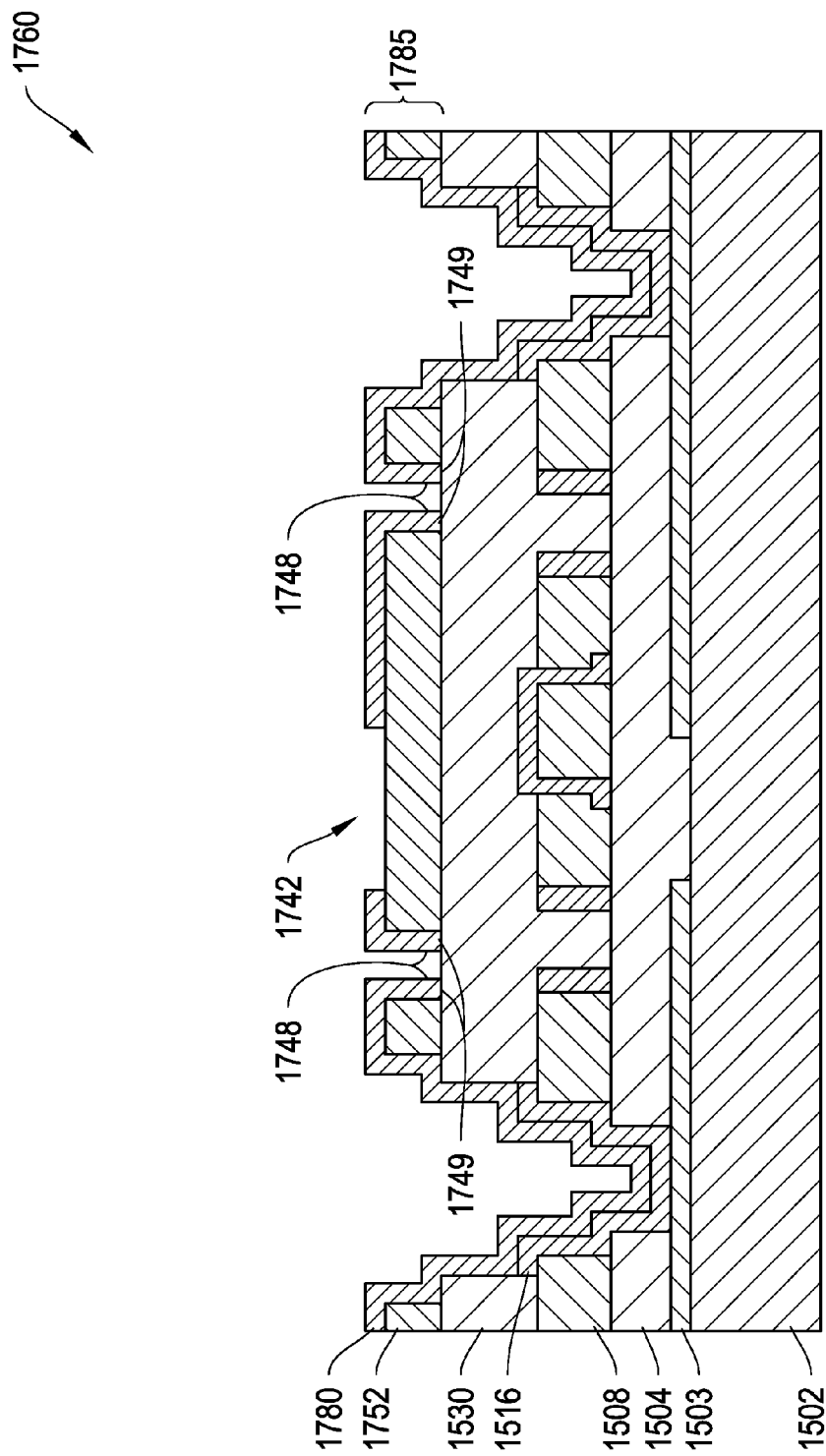

FIG. 12E shows a cross-sectional view of an example display apparatus 1760 incorporating an EAL 1785 having anti-stiction bumps. The display apparatus 1760 is substantially similar to the display apparatus 1700 shown in FIG. 12A but differs from the EAL 1740 in that the EAL 1785 includes a plurality of anti-stiction bumps in regions where the ribs 1744 of the EAL 1740 are formed.

The anti-stiction bumps can be formed using a fabrication process similar to the fabrication process used to fabricate the display apparatus 1700. When patterning the layer of aperture layer material 1780 to form openings for the EAL apertures 1742 as shown in FIG. 12D, the layer of aperture layer material 1780 is also patterned to remove the aperture layer material that forms a base portion 1746 (shown in FIG. 12D) of the ribs 1744. What remains are the sidewalls 1748 of the ribs 1744. The bottom surfaces 1749 of the sidewalls 1748 can serve as the anti-stiction bumps. By having anti-stiction bumps formed at the bottom surface of the EAL 1785, the shutters are prevented from sticking to the EAL 1785.

Figure 12F:
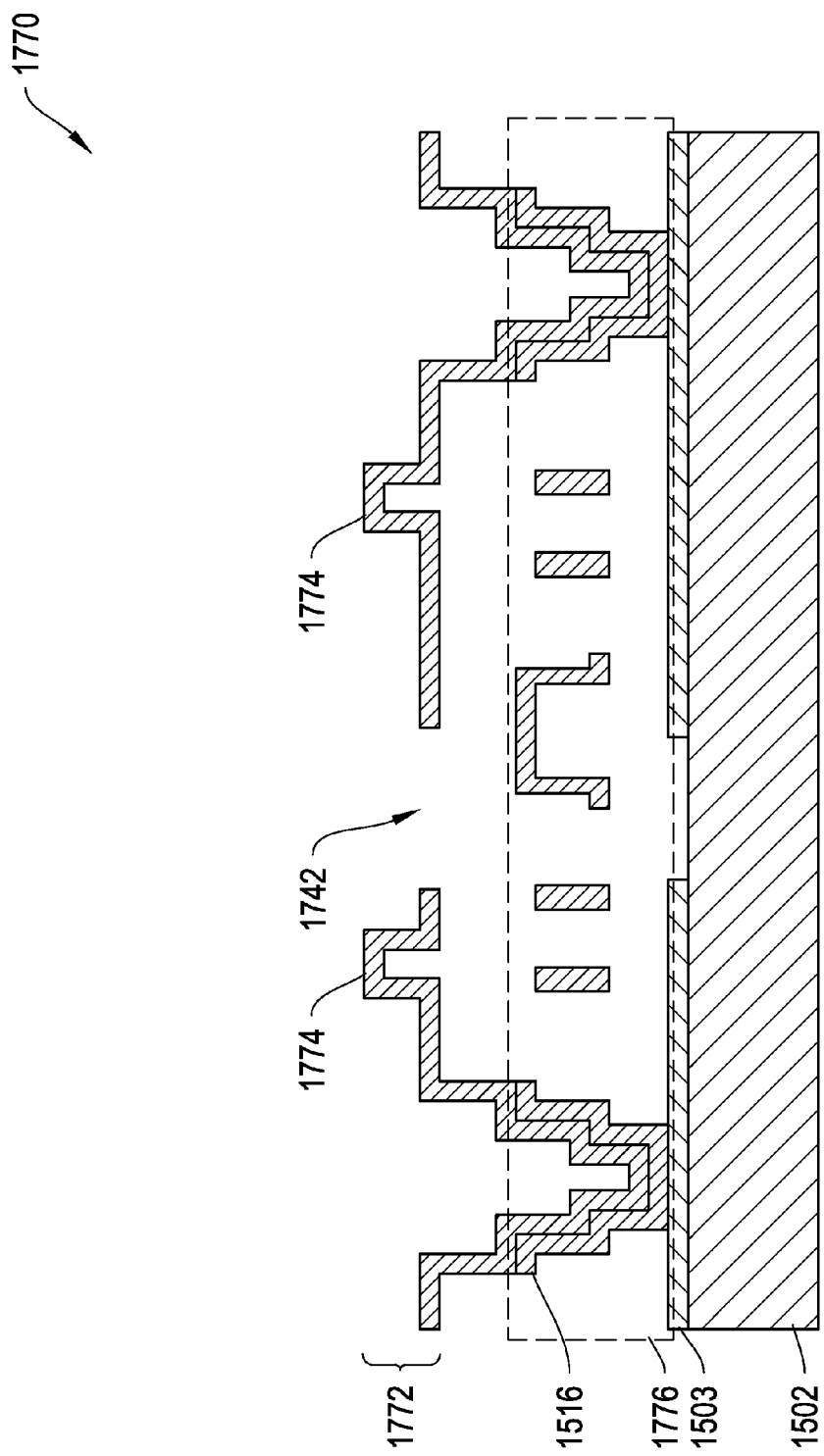
FIG. 12F shows a cross-sectional view of an example display apparatus.

FIG. 12F shows a cross sectional view of another example display apparatus 1770. The display apparatus 1770 is similar to the display apparatus 1700 shown in FIG. 12A in that it includes a ribbed EAL 1772. In contrast to the display apparatus 1700, the ribbed EAL 1772 of the display apparatus 1770 includes ribs 1774 that extend upwards away from a shutter assembly underlying the ribbed EAL 1772.

The process for fabricating the ribbed EAL 1772 is similar to the process used to fabricate the ribbed EAL 1740 of the display apparatus 1700. The only difference is in the patterning of the fourth sacrificial layer 1752 deposited on the mold 1799. In generating the ribbed EAL 1740, the majority of the fourth sacrificial layer 1752 is left as part of the mold, and recesses 1756 are formed within it to form a mold for the ribs 1744 (as shown in FIG. 12C). In contrast, in forming the EAL 1772, the majority of the fourth sacrificial layer 1752 is removed, leaving mesas over which the ribs 1774 are then formed.

Figure 13A:
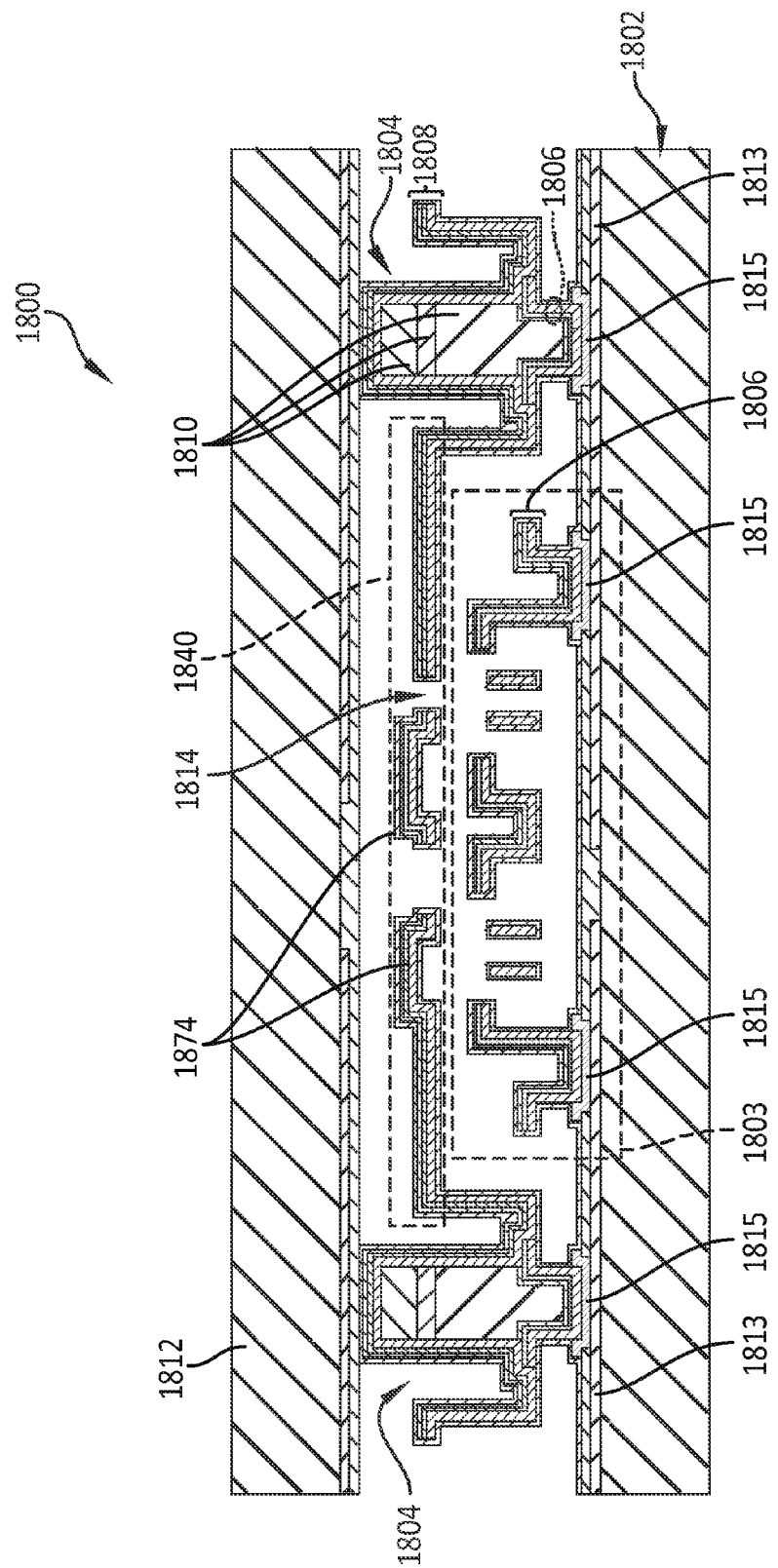
FIG. 13A shows a cross-sectional view of an example display apparatus incorporating an EAL supported by an extended encapsulated spacer.

FIG. 13A shows a cross-sectional view of an example display apparatus 1800 incorporating an EAL 1840 supported by an extended encapsulated spacer 1804. The display apparatus 1800 is similar to the display apparatus 1700 shown in FIG. 12A in that the display apparatus 1800 also includes an EAL 1840 that is supported over a substrate 1802 and underlying an a shutter assembly 1803. Like the display apparatus 1700, the EAL 1840 of the display apparatus 1800 also includes ribs 1874 to stiffen the EAL.

However, the display apparatus 1800 differs from the display apparatus 1700 in that the EAL 1840 is supported over the substrate 1802 by extended encapsulated spacers 1804. The extended encapsulated spacers 1804, unlike the anchors 1725, are formed from two layers of structural material 1806 and 1808 encapsulating several layers of polymer 1810. Each layer of structure material 1806 and 1808 can itself be formed from multiple layers of material, such as a-Si, a metal (such as Ti or Al) and/or a dielectric. In contrast, the anchors 1725 of the display apparatus 1700 shown in FIG. 12C are open at the top, and do not encapsulate any polymer material.

In addition, the extended encapsulated spacers 1804 extend to a height over the substrate that is beyond the height of the stiffening ribs 1874. Due to their extra height and their encapsulation of polymer material, the extended encapsulated spacers 1804 can not only serve as anchors for the EAL 1840, but also can serve as spacers, preventing an opposing substrate, such an aperture plate 1812 from coming into contact with the EAL 1840 due to the deformation of the EAL 1840 or the aperture plate 1812. The aperture plate 1812 can be similar to the substrate 1302 shown in FIG. 8, on which a reflective aperture layer 1304 is formed, defining a plurality of apertures 1306. The extended height of the extended encapsulated spacers 1804 ensures the aperture plate 1812 will contact the spacers before the EAL 1840, and the encapsulated polymer gives the extended encapsulated spacers 1804 additional strength, enabling them to bear the load imposed by such contact.

Furthermore, the EAL 1840 includes one or more release holes 1814. The release hole(s) 1814 are holes through the EAL outside of the image forming optical path of the display apparatus 1800. The release hole(s) 1814 allow a release agent (i.e., the etchant used to remove the sacrificial mold on which portions of the display apparatus 1800 are fabricated) to pass through the EAL 1840, facilitating the release of the shutter assembly 1803. The release hole can be approximately about 1 to about 15 microns across, for example, about 3 to about 5 microns across, and may be distributed around the perimeter of the EAL 1840.

As indicated above, the display apparatus 1800 includes a shutter assembly 1803, which is formed on a transparent substrate 1802. A control matrix including a plurality of electrical interconnects, transistors, capacitors, and other electronic components can be formed on the substrate 1802 below the shutter assembly. FIG. 13A shows two interconnects 1813 and several contact pads 1815 that couple the control matrix to the shutter assembly 1803.

Figure 13B:
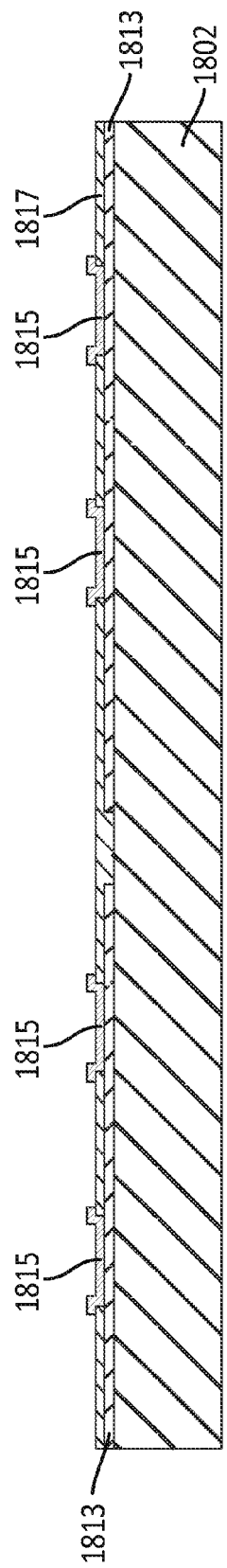

FIGS. 13B-13K show cross-sectional views of stages of construction of the example display apparatus 1800 shown in FIG. 13A. FIG. 13B shows a cross-sectional view of a first stage of construction of the display apparatus 1800. At this stage, the control matrix has been formed on the substrate 1802. As such, Figure 13B shows the two interconnects 1813 as well as the four contact pads 1815 shown in FIG. 13A. The interconnects can be formed by depositing a conductor such as Al over the surface of the substrate 1802, after which the Al is patterned to yield a layer of interconnects. In some implementations, the interconnects are formed by multiple layers of conductors deposited on top of one another. For example, the interconnects can be formed from a layer of Al and one or more layers of Ti, Mo, Titanium Nitride (TiNx), Molybdenum Nitride (MoNx), Ta. A layer of dielectric 1817 is deposited over the patterned interconnects, electrically isolating them from subsequent layers. Openings are then patterned through the dielectric layer to allow the interconnects to form electrical connections to subsequently deposited structures at desired locations. The contact pads are formed by a layer of ITO deposited over the patterned dielectric layer, with portions of the ITO layer making contact with layer of Al exposed through the openings. In some implementations, the contact pads are instead formed by a single layer or multiple layers of one or more of Ti, Mo, MoNx, TiNx, Ta or other conductor. The ITO is then patterned to leave the contact pads 1815.

Figure 13C:
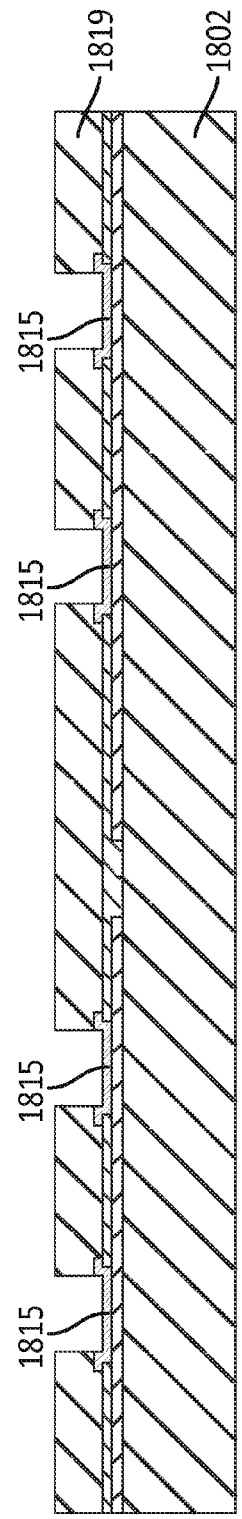

FIG. 13C shows a cross-sectional view of a second stage of manufacturing the display apparatus 1800 shown in FIG. 13A. FIG. 13 shows the results of the deposition and photo patterning of a first mold layer 1819. The first mold layer 1819 can be formed from any of the sacrificial materials described above. In some implementations, the sacrificial material can be or can include a photosensitive resin, allowing the fold mold layer 1819 to be directly photopatterned. The first mold layer 1819 is patterned to make openings over the contact pads 1815 such that the lower portions of the shutter assembly 1803 and the extended encapsulated spacers 1804 can be formed in electrical contact with the contact pads 1815. After patterning, the remainder of the first mold layer is cured.

FIG. 13D shows a cross sectional view of a subsequent stage of manufacture of the display apparatus 1800. In the stage shown in FIG. 13D, a second mold layer 1821 has been deposited over the patterned first mold layer 1819. The second mold layer has been patterned to form a mold for portions of anchors included in the shutter assembly 1803, the shutter assembly actuators, and the shutter assembly shutter. The second mold layer 1821 can be formed from or include the same material used to form the first mold layer 1819 and can be patterned in a similar fashion.

FIG. 13E shows another stage of the manufacture of the display apparatus 1800. FIG. 13E shows the results of the deposition of a first layer of structural material 1806 over the first and second mold layers 1819 and 1821. The first layer of structural material 1806 shown in FIG. 13E includes three layers of materials deposited on top of one another, namely a-Si, Ti, and SiNx. In some other implementations, any of the other materials described above as being suitable for use in a layer of structural material may be used instead of a-Si, Ti and SiNx. For example and without limitation, in some embodiments, the first layer of structural material 1806 is formed from SiNx/Al/SiNx, SiO2/Al/SiO2, SiNx/Ti/SiNx, SiNx/Ti/Al/SiNx, AlOx/Al/AlOx, or AlOx/Ti/AlOx.

After deposition, the first layer of structure material 1806 is etched to define the components of the shutter assembly 1803 and a lower portion 1823 of the extended encapsulated spacers 1804. The etch can be carried out as described above in relation to stage 1404 of the method 1400 shown in FIG. 9. The etching can be carried out in multiple phases. For example, in a first phase, the overall structure of the shutter assemble 1803 is defined. In subsequent etching phases, portions of the SiNx and Ti layers are etched away from the actuators and portions of the SiNx layer are etched away from the outer edges of the lower portion 1823 of the extended encapsulated spacers 1804. Removing the dielectric and metal layers from the actuators makes the actuator beams thinner and more compliant, reducing the voltage needed for actuation. Removing the material from the outer edges of the lower portion 1823 of the extended encapsulated spacers 1804 facilitates electrical conduction between the remainder of the lower portion 1823 and the second layer of structural material 1810 (which will form an upper portion 1829 of the extended encapsulated spacer 1804 as well as the EAL 1840) on top of the lower portion 1823.

Figure 13H:
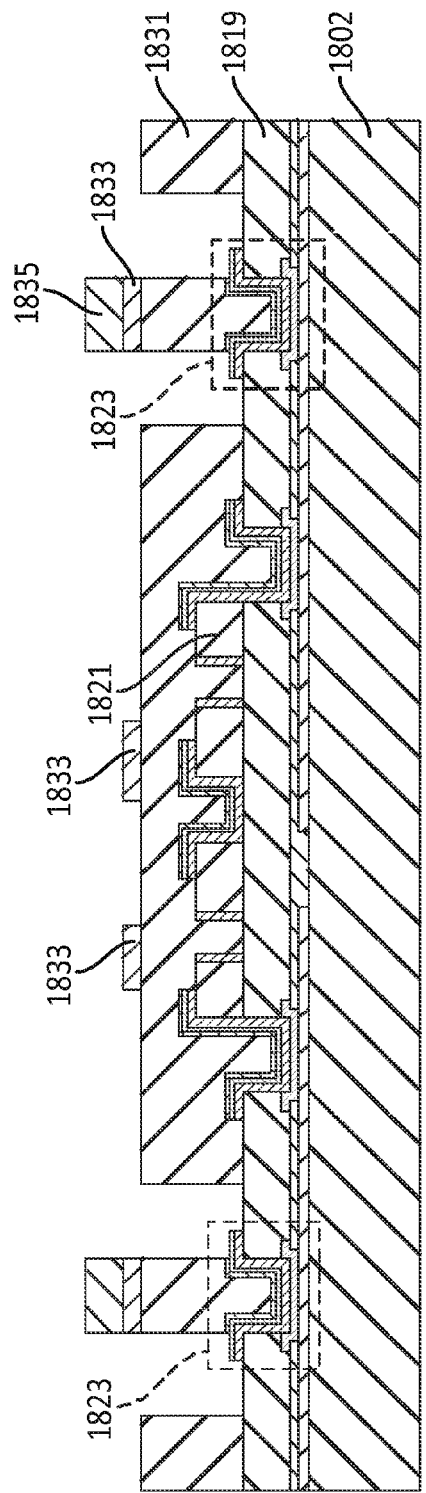
Figure 13I:
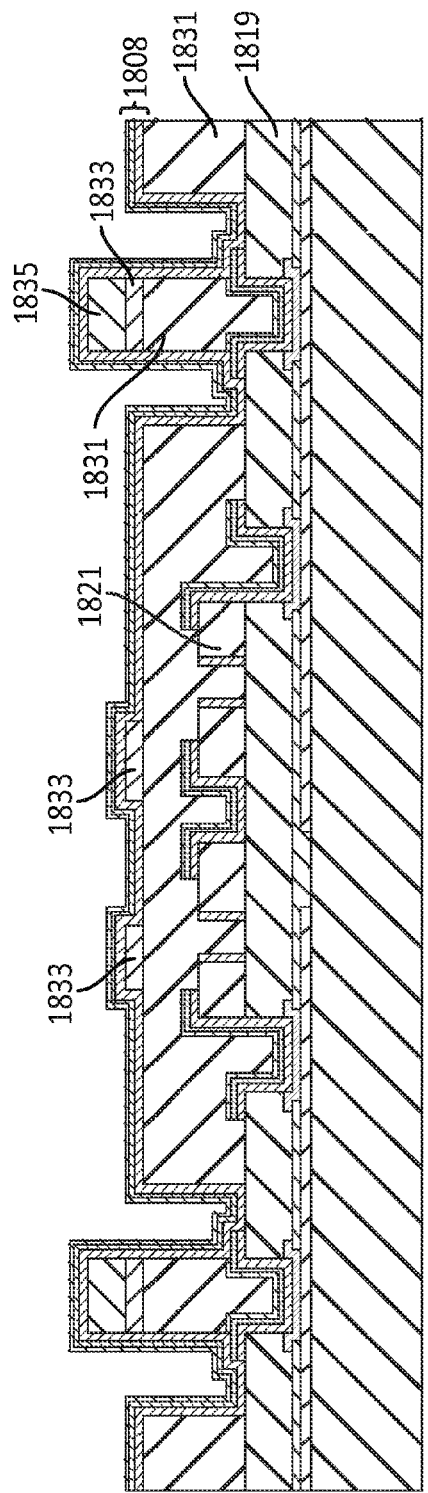
Figure 13J:
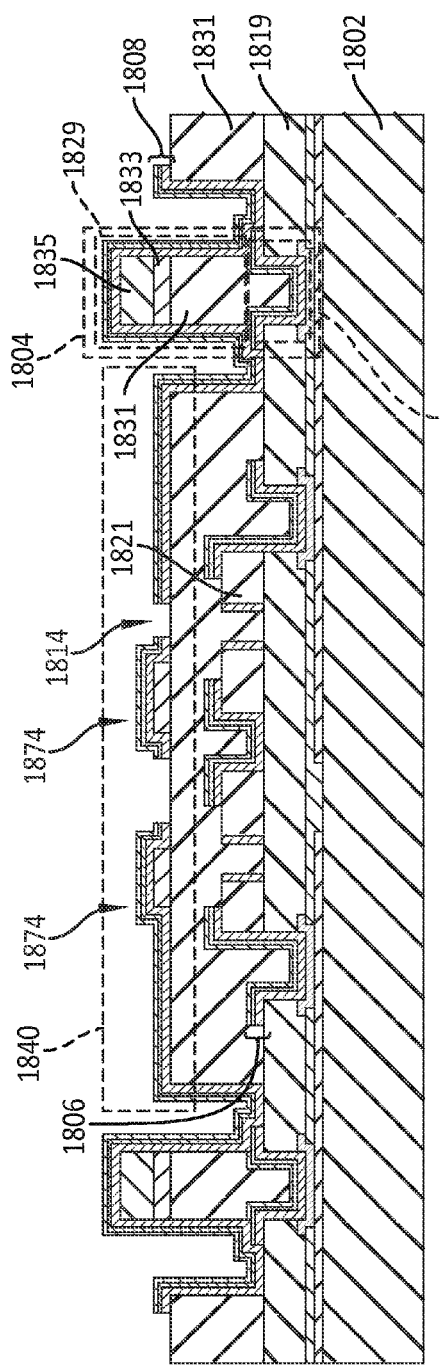

After the first layer of structural material 1806 is patterned, a third mold layer 1831 is deposited over the resulting structure, and is subsequently patterned. The result of these steps is shown in FIG. 13F. Thereafter, fourth and fifth mold layers 1833 and 1835 are deposited and patterned, as shown in FIGS. 13G and 13H. Portions of the third and fourth mold layers 1831 and 1833 that remain after the patterning process serve as a mold for the EAL 1840. Additional portions of the third and fourth mold layers 1831 and 1833 remain to be encapsulated within the extended encapsulated spacer 1804. After patterning, the portions of the fifth mold layer 1835 that remain are located on top of the stack of remaining mold layer material that sits atop the lower portion 1823 of the extended encapsulated spacer 1804. After the second layer of structural material 1808 is deposited and patterned to form the upper portion 1829 of the extended encapsulated spacer 1804 and the EAL 1840 (as shown in FIGS. 13I and 13J), the retained portions of the fifth mold layer 1835 serve to raise the top of the extended encapsulated spacers 1804 to a height over the substrate 1802 that exceeds the height of the EAL ribs 1874. Like the first layer of structural material 1806, the second layer of structural material 1808 can be formed from layers of a-Si, Ti, and SiNx, or one or a combination of any of the other materials identified above as being suitable for a layer of structural material.

Figure 13K:
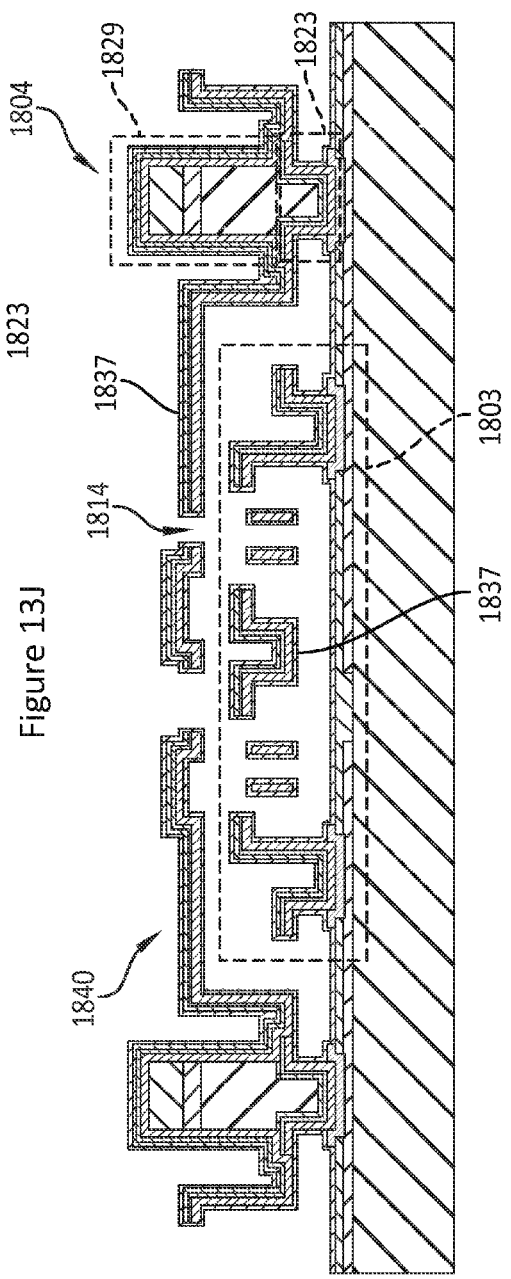

After the second layer of structural material 1808 is patterned, as shown in FIG. 13J, the shutter assembly 1803 and the EAL 1840 are released by removing the remaining portion of the first through fifth mold layers 1819, 1821, 1831, 1833 and 1835. As indicated above, the release process is facilitated by the release holes 1814 etched through the EAL 1840. While the majority of the remaining mold material is removed, the mold material from the third, fourth, and fifth mold layers encapsulated between the lower portion 1823 and the upper portion 1829 of the extended encapsulated spacers 1804 are left behind within the spacers, providing them additional strength and resilience. After the release process is completed, a passivation layer 1837 is deposited over all of the exposed surfaces of the display apparatus, such as using an ALD, CVD, or PECVD process. The result is shown in FIG. 13K. Subsequently, the substrate 1802 is joined to the aperture plate 1812, yielding the display apparatus 1800 shown in FIG. 13A.

Figure 14A:
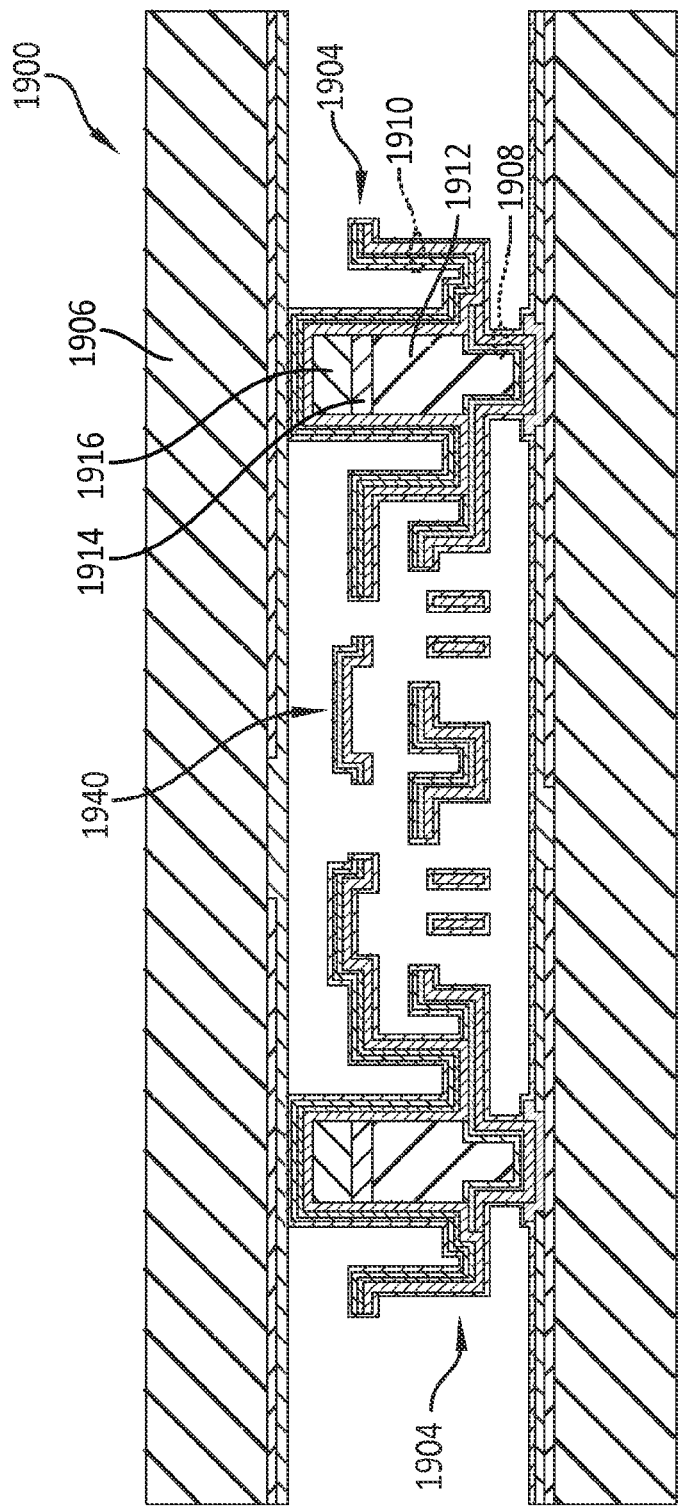
FIG. 14A shows a cross-sectional view of another example display apparatus including extended encapsulated spacers.

FIG. 14A shows a cross-sectional view of another example display apparatus 1900 including extended encapsulated spacers 1904. The display apparatus 1900 is similar to the display apparatus 1800, other than the fact that the extended encapsulated spacers 1904 shown in FIG. 14 serve as anchors to an EAL 1940, shutter assembly anchors, as well as spacers to prevent an aperture plate 1906 from coming into contact with EAL 1940. Like the extended encapsulated spacers 1804 shown in FIG. 13A, the extended encapsulated spacers 1904 shown in FIG. 14A are formed from two layers of structural material 1908 and 1910, which encapsulate several layers of polymer mold material 1912, 1914, and 1916, used in the formation of the display apparatus 1900. While for clarity of illustration the two layers of structural material 1908 and 1910 are shown as unitary layers, as discussed above with the first and second layers of structural material 1806 and 1808 shown in FIG. 13A, the two layers of structural material 1908 and 1910 can be formed from two or more layers of structural material selected from any of the materials set forth above as being suitable for such layers, including semiconductors, metals, and/or dielectrics.

Figure 14B:
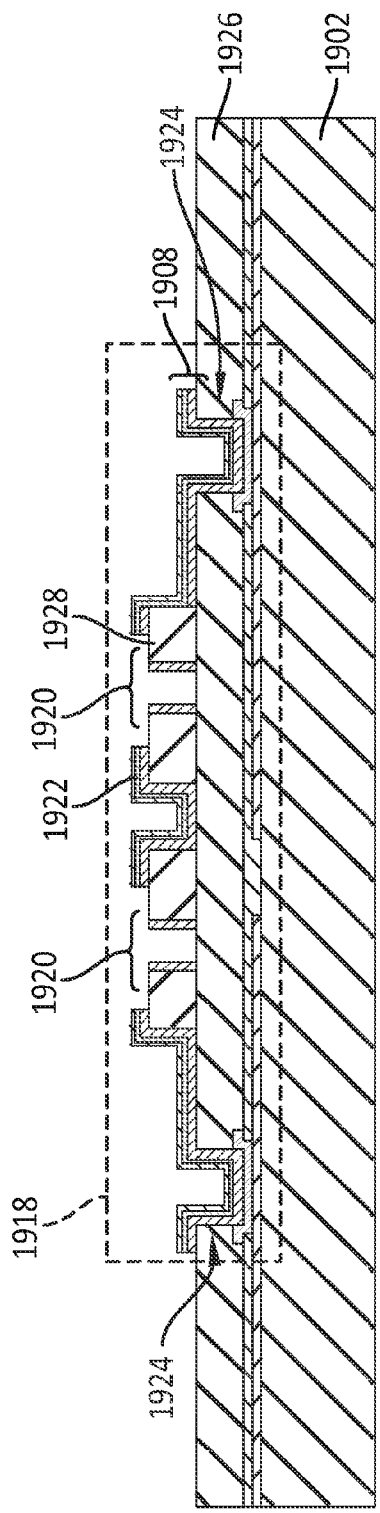
FIGS. 14B and 14C show two stages of the manufacture of the example display apparatus shown in FIG. 14A.
Figure 14C:
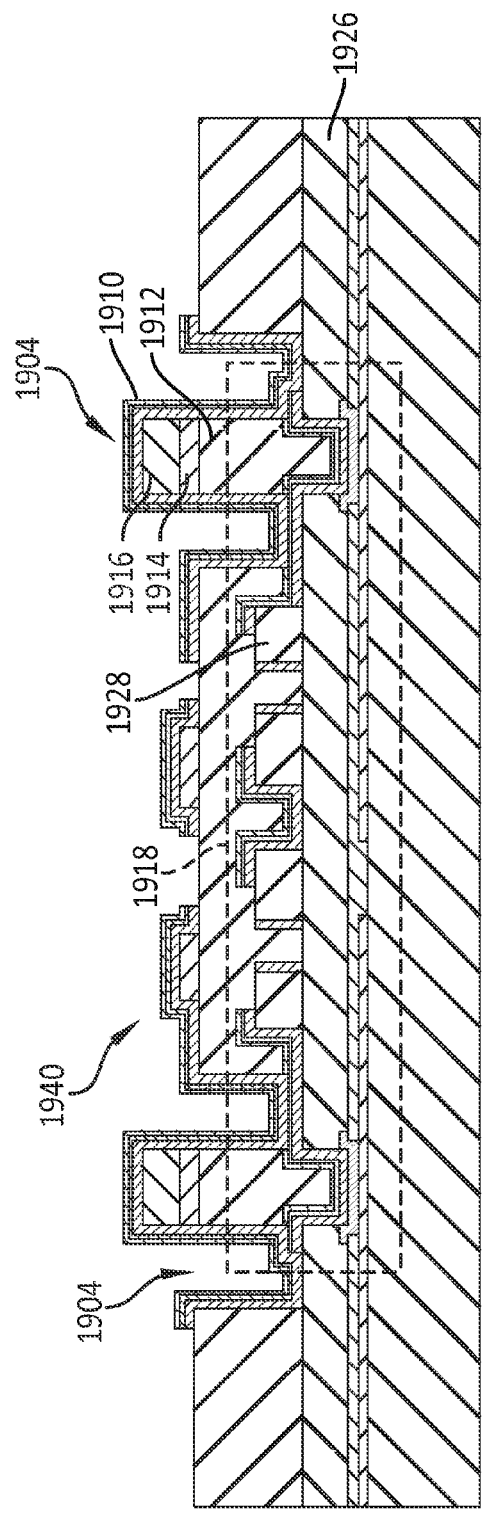

FIGS. 14B and 14C show two stages of the manufacture of the example display apparatus 1900 shown in FIG. 14A. FIG. 14B shows a stage of manufacturing of the display apparatus 1900 after the patterning of the first layer of structural material 1908. The patterned first layer of structural material 1908 forms a shutter assembly 1918, including two actuators 1920, a shutter 1922, and a set of anchors 1924, two of which are shown in FIG. 14B. The two anchors 1924 shown in FIG. 14B will also serve as the lower portions of the extended encapsulated spacers 1904. The shutter assembly is fabricated using two patterned layers of mold material 1926 and 1928 as a mold.

FIG. 14C shows a later stage of the manufacture of the display apparatus 1900, just prior to a release stage. As shown in FIG. 14C, three more layers of mold material 1912, 1914, and 1916 are deposited and patterned to form a mold for the EAL 1940, as well as to serve as the inner core of the extended encapsulated spacers 1904. The second layer of structural material 1910 has also been deposited and patterned, forming the EAL 1940 and sealing the extended encapsulated spacers 1904. The remaining exposed mold material is then removed through a release process, after which a passivation layer is applied, and the substrate 1902 on which the shutter assembly 1918, extended encapsulated spacers 1904, and EAL 1940 are formed is coupled to an opposing aperture plate 1930.

Figure 15:
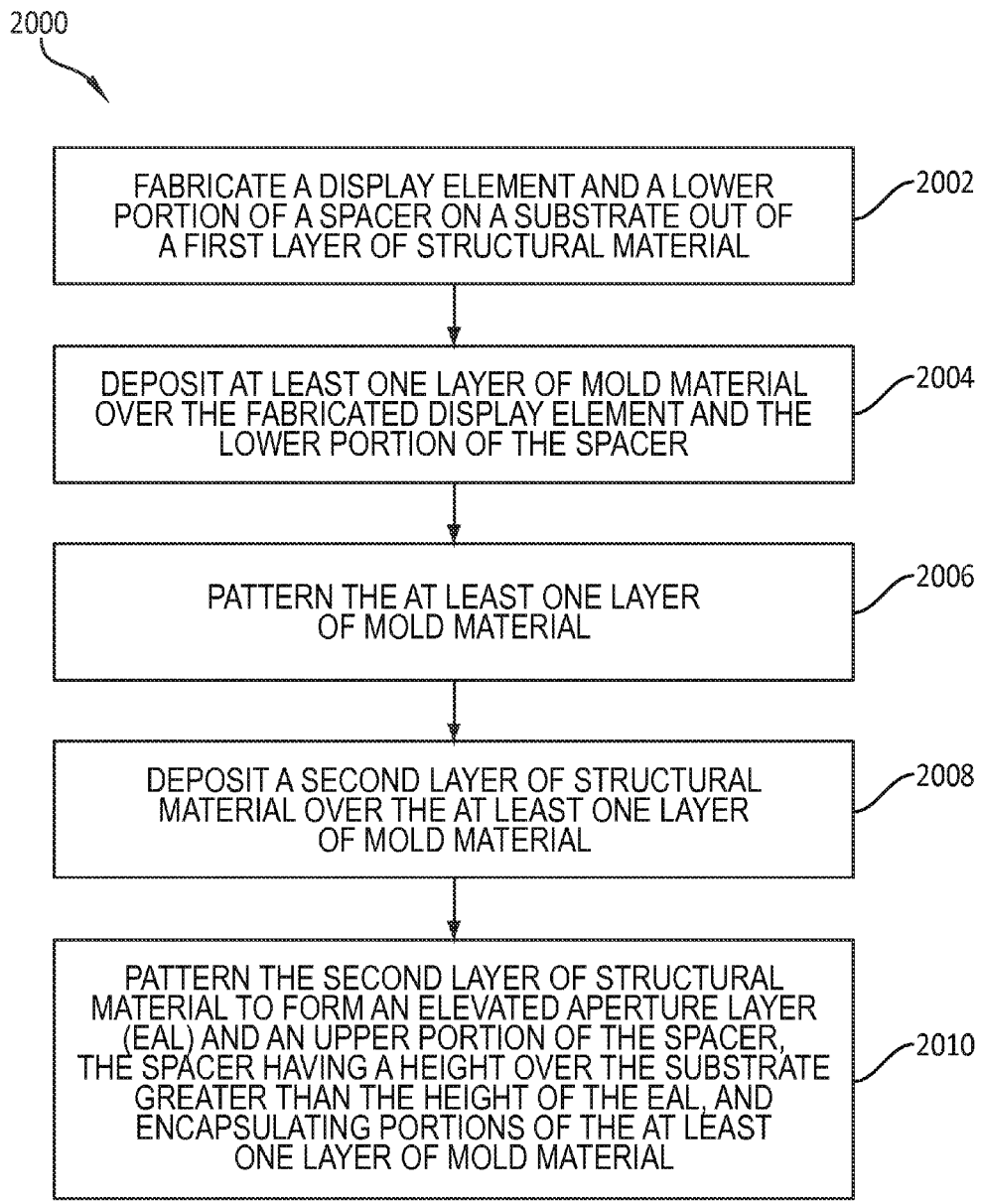
FIG. 15 shows a flow diagram of an example process of fabricating a display apparatus.

FIG. 15 shows a flow diagram of an example process 2000 of fabricating a display apparatus. The display apparatus 1800 and 1900 shown in FIGS. 13A and 14A, for example, can be fabricated according to the process 2000. The process 2000 includes fabricating a display element and a lower portion of a spacer on a substrate out of a first layer of structural material (stage 2002). Examples of such a fabrication process are shown and discussed in relation to FIGS. 13C-13F and in FIG. 14B. The process 2000 further includes depositing at least one layer of mold material over the fabricated display element and the lower portion of the spacer (stage 2004). Examples of the process stage 2004 are shown and discussed in relation to FIGS. 13F-13H and in FIG. 14C. The at least one layer of deposited mold material is then patterned (stage 2006), as also shown and discussed in FIGS. 13F-13H and 14C. A second layer of structural material is then deposited over the at least one layer of mold material (stage 2008) as shown in FIGS. 13I and 14C. The process 2000 further includes patterning the second layer of structural material to form an EAL and an upper portion of the spacer, the spacer having a height over the substrate greater than the height of the EAL, and encapsulating portions of the at least one layer of mold material (stage 2010). Examples of this processing stage are shown and discussed in relation to FIGS. 13J and 14C.

Figure 16A:
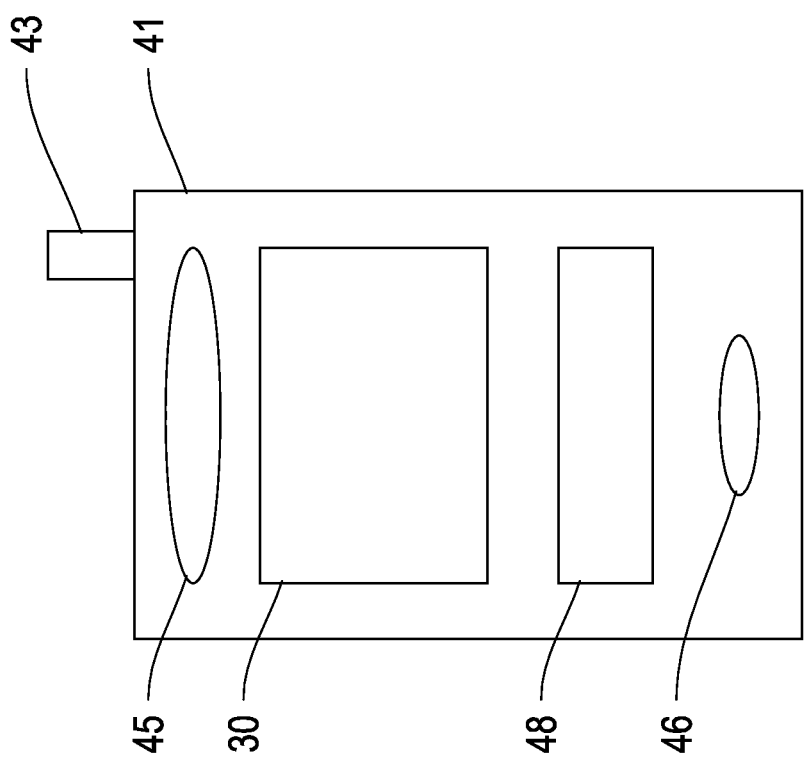
FIGS. 16A and 16B show system block diagrams illustrating an example display device that includes a plurality of display elements.
Figure 16B:
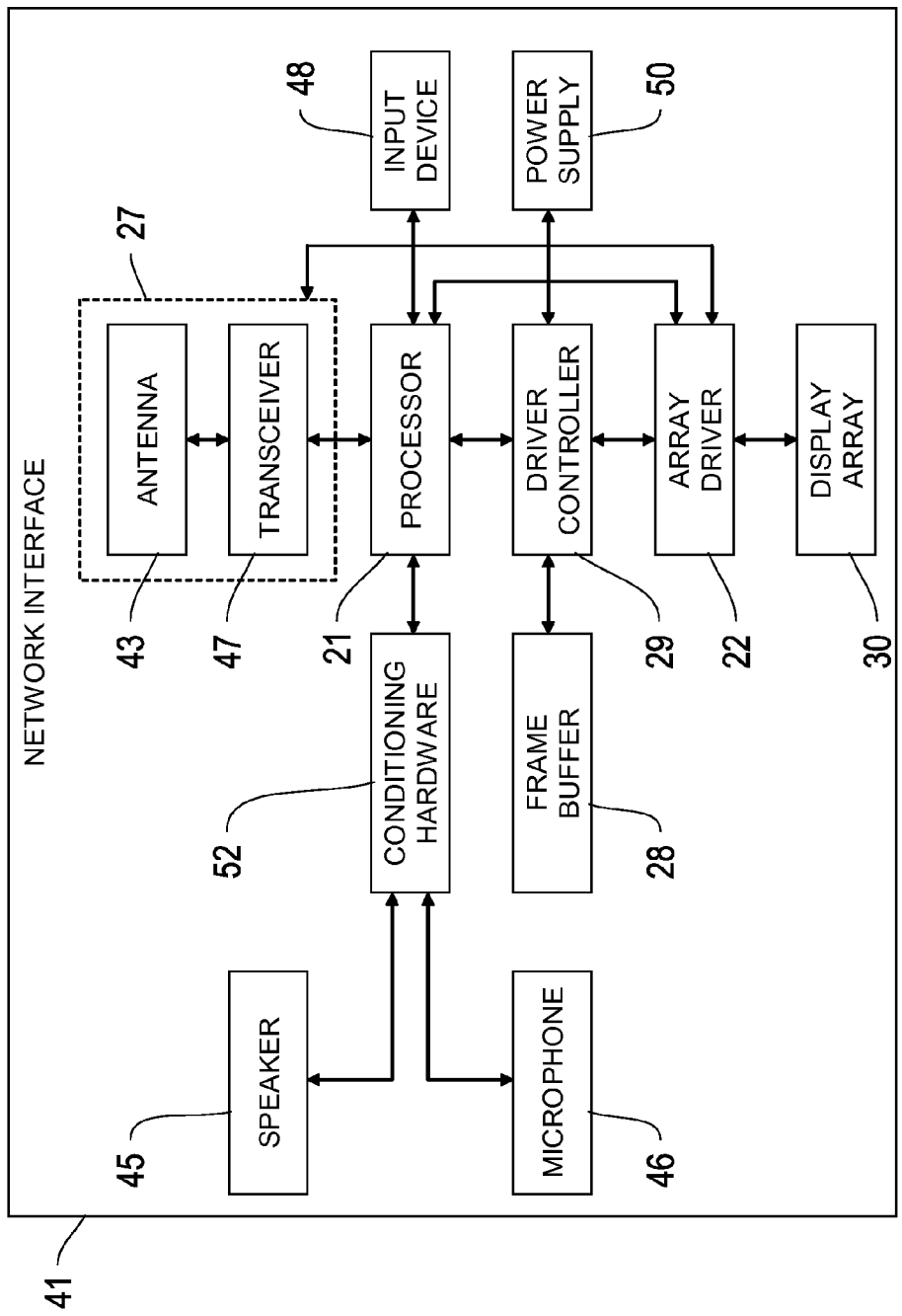

FIGS. 16A and 16B are system block diagrams illustrating an example display device 40 that includes a plurality of display elements. The display device 40 can be, for example, a smart phone, a cellular or mobile telephone. However, the same components of the display device 40 or slight variations thereof are also illustrative of various types of display devices such as televisions, computers, tablets, e-readers, hand-held devices and portable media devices.

The display device 40 includes a housing 41, a display 30, an antenna 43, a speaker 45, an input device 48 and a microphone 46. The housing 41 can be formed from any of a variety of manufacturing processes, including injection molding, and vacuum forming. In addition, the housing 41 may be made from any of a variety of materials, including, but not limited to: plastic, metal, glass, rubber and ceramic, or a combination thereof. The housing 41 can include removable portions (not shown) that may be interchanged with other removable portions of different color, or containing different logos, pictures, or symbols.

The display 30 may be any of a variety of displays, including a bi-stable or analog display, as described herein. The display 30 also can be capable of including a flat-panel display, such as plasma, electroluminescent (EL), organic light-emitting diode (OLED), super-twisted nematic liquid crystal display (STN LCD), or thin film transistor (TFT) LCD, or a non-flat-panel display, such as a cathode ray tube (CRT) or other tube device.

The components of the display device 40 are schematically illustrated in FIG. 16B. The display device 40 includes a housing 41 and can include additional components at least partially enclosed therein. For example, the display device 40 includes a network interface 27 that includes an antenna 43 which can be coupled to a transceiver 47. The network interface 27 may be a source for image data that could be displayed on the display device 40. Accordingly, the network interface 27 is one example of an image source module, but the processor 21 and the input device 48 also may serve as an image source module. The transceiver 47 is connected to a processor 21, which is connected to conditioning hardware 52. The conditioning hardware 52 may be configured to condition a signal (such as filter or otherwise manipulate a signal). The conditioning hardware 52 can be connected to a speaker 45 and a microphone 46. The processor 21 also can be connected to an input device 48 and a driver controller 29. The driver controller 29 can be coupled to a frame buffer 28, and to an array driver 22, which in turn can be coupled to a display array 30. One or more elements in the display device 40, including elements not specifically shown in FIG. 16A, can be capable of functioning as a memory device and be capable of communicating with the processor 21. In some implementations, a power supply 50 can provide power to substantially all components in the particular display device 40 design.

The network interface 27 includes the antenna 43 and the transceiver 47 so that the display device 40 can communicate with one or more devices over a network. The network interface 27 also may have some processing capabilities to relieve, for example, data processing requirements of the processor 21. The antenna 43 can transmit and receive signals. In some implementations, the antenna 43 transmits and receives RF signals according to the IEEE 16.11 standard, including IEEE 16.11(a), (b), or (g), or the IEEE 801.11 standard, including IEEE 801.11a, b, g, n, and further implementations thereof. In some other implementations, the antenna 43 transmits and receives RF signals according to the Bluetooth® standard. In the case of a cellular telephone, the antenna 43 can be designed to receive code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1xEV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless network, such as a system utilizing 3G, 4G or 5G technology. The transceiver 47 can pre-process the signals received from the antenna 43 so that they may be received by and further manipulated by the processor 21. The transceiver 47 also can process signals received from the processor 21 so that they may be transmitted from the display device 40 via the antenna 43.

In some implementations, the transceiver 47 can be replaced by a receiver. In addition, in some implementations, the network interface 27 can be replaced by an image source, which can store or generate image data to be sent to the processor 21. The processor 21 can control the overall operation of the display device 40. The processor 21 receives data, such as compressed image data from the network interface 27 or an image source, and processes the data into raw image data or into a format that can be readily processed into raw image data. The processor 21 can send the processed data to the driver controller 29 or to the frame buffer 28 for storage. Raw data typically refers to the information that identifies the image characteristics at each location within an image. For example, such image characteristics can include color, saturation and gray-scale level.

The processor 21 can include a microcontroller, CPU, or logic unit to control operation of the display device 40. The conditioning hardware 52 may include amplifiers and filters for transmitting signals to the speaker 45, and for receiving signals from the microphone 46. The conditioning hardware 52 may be discrete components within the display device 40, or may be incorporated within the processor 21 or other components.

The driver controller 29 can take the raw image data generated by the processor 21 either directly from the processor 21 or from the frame buffer 28 and can re-format the raw image data appropriately for high speed transmission to the array driver 22. In some implementations, the driver controller 29 can re-format the raw image data into a data flow having a raster-like format, such that it has a time order suitable for scanning across the display array 30. Then the driver controller 29 sends the formatted information to the array driver 22. Although a driver controller 29, such as an LCD controller, is often associated with the system processor 21 as a stand-alone Integrated Circuit (IC), such controllers may be implemented in many ways. For example, controllers may be embedded in the processor 21 as hardware, embedded in the processor 21 as software, or fully integrated in hardware with the array driver 22.

The array driver 22 can receive the formatted information from the driver controller 29 and can re-format the video data into a parallel set of waveforms that are applied many times per second to the hundreds, and sometimes thousands (or more), of leads coming from the display's x-y matrix of display elements. In some implementations, the array driver 22, and the display array 30 are a part of a display module. In some implementations, the driver controller 29, the array driver 22, and the display array 30 are a part of the display module.

In some implementations, the driver controller 29, the array driver 22, and the display array 30 are appropriate for any of the types of displays described herein. For example, the driver controller 29 can be a conventional display controller or a bi-stable display controller (such as the controller 134 described above with respect to FIG. 1B). Additionally, the array driver 22 can be a conventional driver or a bi-stable display driver. Moreover, the display array 30 can be a conventional display array or a bi-stable display array. In some implementations, the driver controller 29 can be integrated with the array driver 22. Such an implementation can be useful in highly integrated systems, for example, mobile phones, portable-electronic devices, watches or small-area displays.

In some implementations, the input device 48 can be configured to allow, for example, a user to control the operation of the display device 40. The input device 48 can include a keypad, such as a QWERTY keyboard or a telephone keypad, a button, a switch, a rocker, a touch-sensitive screen, a touch-sensitive screen integrated with the display array 30, or a pressure- or heat-sensitive membrane. The microphone 46 can be configured as an input device for the display device 40. In some implementations, voice commands through the microphone 46 can be used for controlling operations of the display device 40.

The power supply 50 can include a variety of energy storage devices. For example, the power supply 50 can be a rechargeable battery, such as a nickel-cadmium battery or a lithium-ion battery. In implementations using a rechargeable battery, the rechargeable battery may be chargeable using power coming from, for example, a wall socket or a photovoltaic device or array. Alternatively, the rechargeable battery can be wirelessly chargeable. The power supply 50 also can be a renewable energy source, a capacitor, or a solar cell, including a plastic solar cell or solar-cell paint. The power supply 50 also can be configured to receive power from a wall outlet.

In some implementations, control programmability resides in the driver controller 29 which can be located in several places in the electronic display system. In some other implementations, control programmability resides in the array driver 22. The above-described optimization may be implemented in any number of hardware and/or software components and in various configurations.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, for example, a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are shown in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not shown can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A shutter-based display apparatus, comprising:
   a first substrate;
   a microelectromechanical systems (MEMS) shutter-based light modulator on the first substrate, the shutter-based light modulator including a first layer of structural material; and
   a spacer on the first substrate having a height above the first substrate that exceeds the height of a highest portion of the first layer of structural material, wherein the spacer forms a portion of the shutter-based light modulator and supports the shutter-based light modulator above the first substrate, the spacer including:
      at least two distinct layers of polymer material, the layers of polymer material having a first side nearest to the first substrate and a second side opposite the first side,
      wherein the first layer of structural material is in direct contact with the first side and separates the layers of polymer material from the first substrate, and
      a second layer of structural material in direct contact with the second side, the first layer of structural material and the second layer of structural material covering the layers of polymer material, wherein the first layer of structural material includes the same material as the second layer of structural material.

2. The apparatus of claim 1, wherein the second layer of structural material forms an elevated aperture layer (EAL) over the light modulator.

3. The apparatus of claim 1, further comprising a second substrate positioned opposite the light modulator with respect to the first substrate, wherein the spacer is sufficiently tall to prevent the second substrate from deforming into the light modulator.

4. The apparatus of claim 1, further comprising:
   a display;
   a processor that is capable of communicating with the display, the processor being capable of processing image data; and a memory device that is capable of communicating with the processor.

5. The apparatus of claim 4, further comprising:
a driver circuit capable of sending at least one signal to the display; and wherein
the processor is further capable of sending at least a portion of the image data to the driver circuit.

6. The apparatus of claim 4, further comprising:
an image source module capable of sending the image data to the processor, wherein the image source module includes at least one of a receiver, transceiver, and transmitter.

7. The apparatus of claim 4, further comprising:
an input device capable of receiving input data and to communicate the input data to the processor.

8. The apparatus of claim 1, wherein the first layer of structural material and the second layer of structural material are in contact with and cover the layers of polymer material.

9. A shutter-based display apparatus, comprising:
a first substrate;
a microelectromechanical systems (MEMS) shutter-based light modulator including at least a first shutter on the first substrate;
an elevated aperture layer (EAL) on the first substrate suspended above and spaced away from the first shutter of the shutter-based light modulator, and extending across the first shutter of the shutter-based light modulator such that the first shutter of the shutter-based light modulator is positioned between the EAL and the first substrate; and
a spacer extending up from the first substrate to a height above the elevated aperture layer, wherein the spacer includes a polymer material positioned between a first layer of structural material and a second layer of structural material in a direction normal to the first substrate such that the polymer material is encapsulated by the first layer of structural material and the second layer of structural material, the first layer of structural material separating the polymer material from the first substrate in a direction normal to the first substrate, wherein the first layer of structural material includes the same material as the second layer of structural material and the MEMS shutter-based light modulator,
wherein the portion of the spacer formed from the first layer of structural material physically supports the EAL over the first substrate, and wherein the EAL includes corrugations extending away from the first substrate to a height that is above a majority of the elevated aperture layer, but below the height of the spacer, and
wherein the spacer forms a portion of the shutter-based light modulator and supports the shutter-based light modulator above the first substrate.

10. The display apparatus of claim 9, wherein the polymer material includes at least two layers of polymer material.

* * * * *